(12) United States Patent
Katayama et al.

(10) Patent No.: US 9,055,277 B2
(45) Date of Patent: Jun. 9, 2015

(54) IMAGE RENDERING DEVICE, IMAGE RENDERING METHOD, AND IMAGE RENDERING PROGRAM FOR RENDERING STEREOSCOPIC IMAGES

(75) Inventors: Tomoko Katayama, Osaka (JP); Keiichi Tanaka, Osaka (JP); Hidetaka Oto, Osaka (JP); Osamu Yamaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 371 days.

(21) Appl. No.: 13/638,136

(22) PCT Filed: Mar. 5, 2012

(86) PCT No.: PCT/JP2012/001494
§ 371 (c)(1),
(2), (4) Date: Sep. 28, 2012

(87) PCT Pub. No.: WO2012/132237
PCT Pub. Date: Oct. 4, 2012

(65) Prior Publication Data
US 2013/0100132 A1 Apr. 25, 2013

Related U.S. Application Data

(60) Provisional application No. 61/470,018, filed on Mar. 31, 2011.

(51) Int. Cl.
*H04N 13/00* (2006.01)
*H04N 13/02* (2006.01)
(Continued)

(52) U.S. Cl.
CPC ......... *H04N 13/0022* (2013.01); *H04N 13/004* (2013.01); *H04N 13/0275* (2013.01); *H04N 2213/003* (2013.01)

(58) Field of Classification Search
CPC ....... G06T 17/20; G06T 7/0065; G06T 15/04; G09G 5/14
USPC .............. 345/419–426; 348/36, 139; 382/285
See application file for complete search history.

(56) References Cited

U.S. PATENT DOCUMENTS

2008/0291201 A1 11/2008 Lafon
2008/0291217 A1 11/2008 Vincent et al.
(Continued)

FOREIGN PATENT DOCUMENTS

JP 2005-165614 6/2005
JP 2006-031230 2/2006
(Continued)

OTHER PUBLICATIONS

Andersson, 3D Video Playback: A Modular Cross-Platform GPU-Based Approach for Flexible Multi-View 3D Vdeo Rendering, Nov. 25, 2010, Mid Sweden University, The Department of Information Technology and Media (ITM), pp. 1-76.*
(Continued)

*Primary Examiner* — Xiao M. Wu
*Assistant Examiner* — Matthew D Salvucci
(74) *Attorney, Agent, or Firm* — Greenblum & Bernstein, P.L.C.

(57) ABSTRACT

An image rendering device realizes stereoscopic viewing of composite images generated by compositing background three-dimensional models and foreground three-dimensional models each defined in three-dimensional modeling space. A texture mapping unit converts background image data into two or more viewpoint textures and maps each viewpoint texture to a background three-dimensional model in the three-dimensional modeling space. A viewport conversion unit extracts, for each of the two or more viewpoint textures, a viewport image from the background three-dimensional model mapped with the viewpoint texture and from the foreground three-dimensional model. By comparing a parallax of the foreground three-dimensional model occurring in stereoscopic playback with a parallax of the intra-texture object occurring in stereoscopic playback, the device determines depth relationship between the foreground three-dimensional model and the intra-texture object and adjusts positional relationship between the foreground three-dimensional model and the intra-texture object based on a result of the determination.

14 Claims, 41 Drawing Sheets

(51) Int. Cl.
  *G09G 5/14* (2006.01)
  *G06T 7/00* (2006.01)
  *G06T 15/04* (2011.01)
  *G06T 7/20* (2006.01)

(56) References Cited

U.S. PATENT DOCUMENTS

| | | |
|---|---|---|
| 2008/0292213 A1 | 11/2008 | Chau |
| 2009/0129667 A1 | 5/2009 | Ho et al. |
| 2009/0297061 A1* | 12/2009 | Mareachen et al. .......... 382/285 |
| 2010/0104262 A1 | 4/2010 | Kanamaru et al. |
| 2010/0226628 A1 | 9/2010 | Yamaji et al. |
| 2011/0080462 A1 | 4/2011 | Yamaji et al. |
| 2011/0249887 A1 | 10/2011 | Fujita et al. |
| 2011/0254915 A1 | 10/2011 | Vincent et al. |
| 2012/0169729 A1 | 7/2012 | Yamaji et al. |

FOREIGN PATENT DOCUMENTS

| | | |
|---|---|---|
| JP | 2009-123219 | 6/2009 |
| JP | 2010-531007 | 9/2010 |
| JP | 2011-039358 | 2/2011 |
| JP | 2011-221690 | 11/2011 |

OTHER PUBLICATIONS

Kourogi et al., "A real-time panorama-based technique for annotation overlay on video frames", Technical report of IEICE PRMU99-64~76, Sep. 16, 1999, pp. 1-8.

U.S. Appl. No. 13/580,027 to Germano Leichsenring et al., filed Aug. 20, 2012.

U.S. Appl. No. 13/635,820 to Keiichi Tanaka et al., filed Sep. 18, 2012.

* cited by examiner

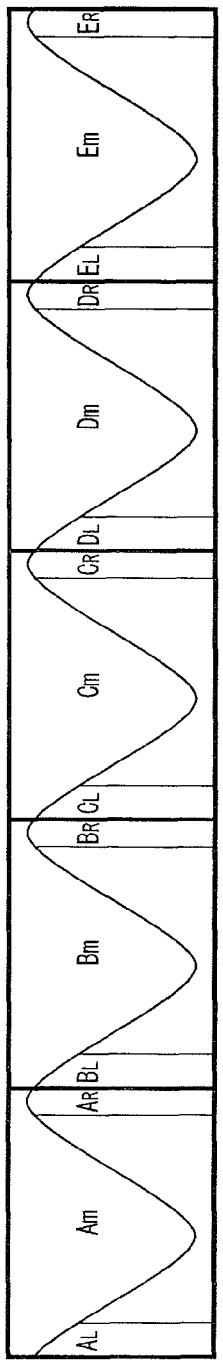
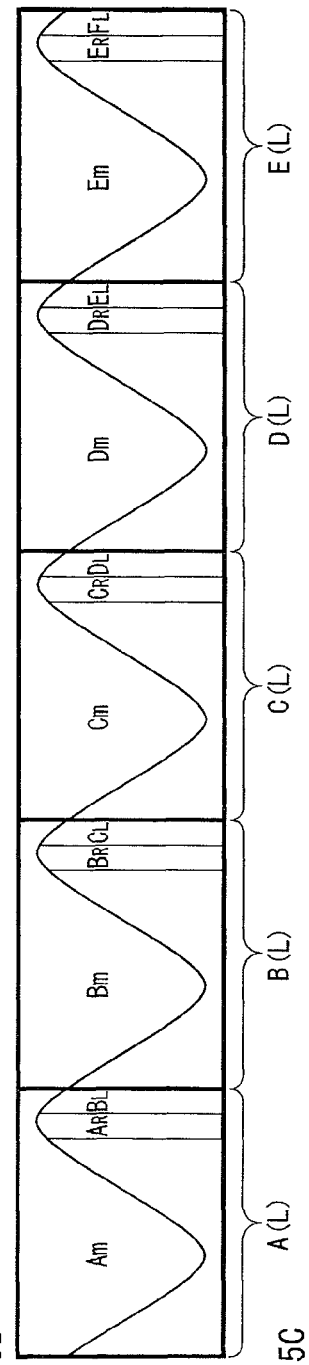
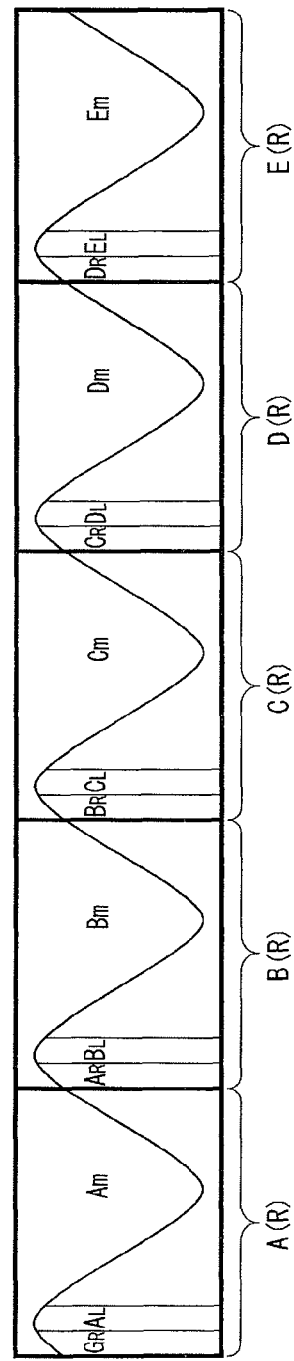
FIG. 5A
FIG. 5B
FIG. 5C

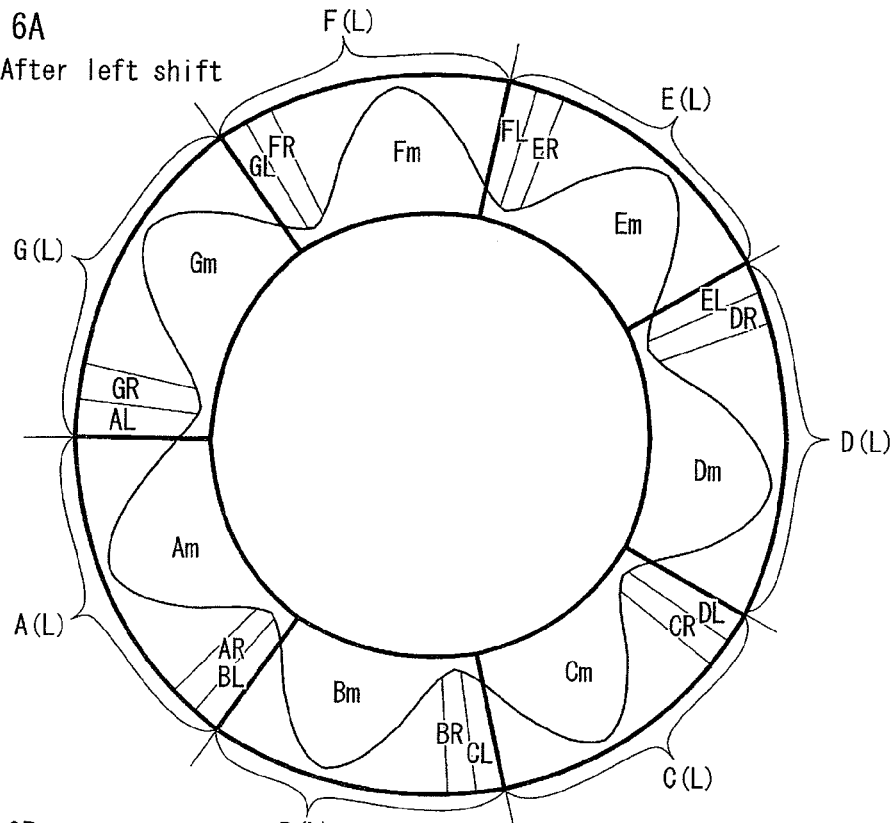
FIG. 6A After left shift
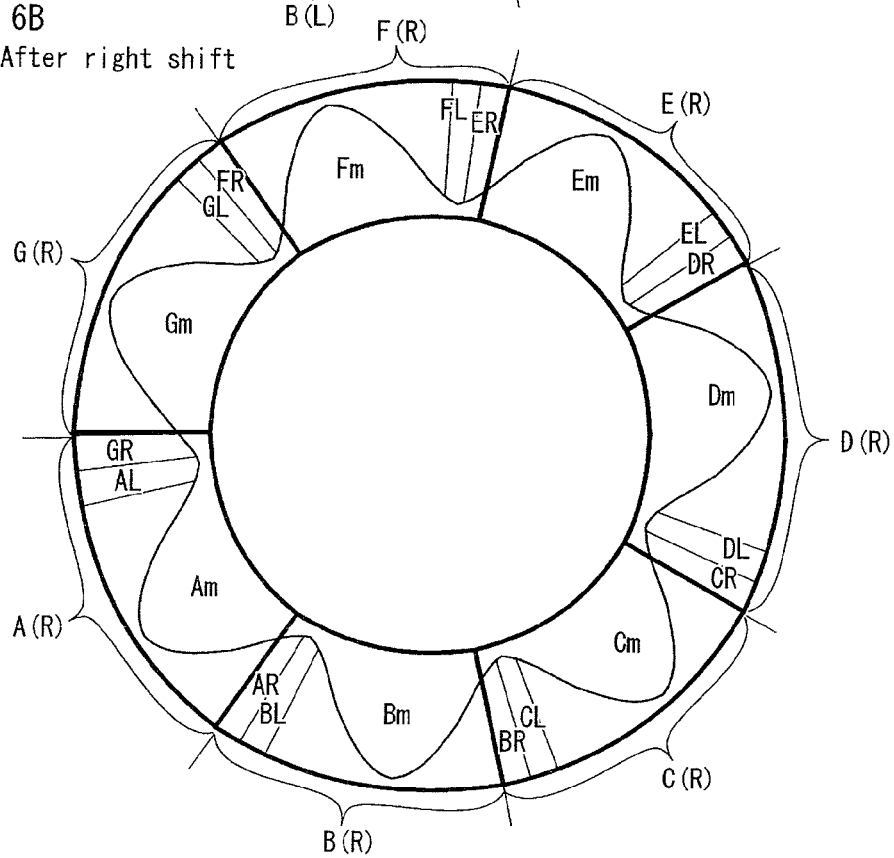
FIG. 6B After right shift

Feature point matching between foreground image and background image applied on sphere Foreground image Center Depth Corrected depth FIG. 23A
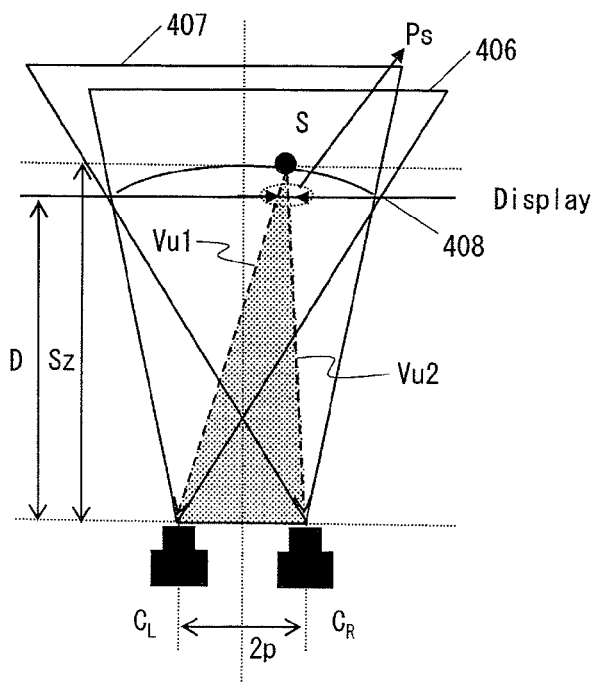
FIG. 23B
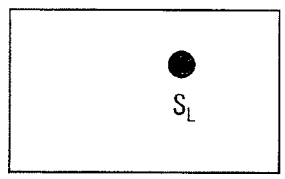
Image of point S projected on display by camera $C_L$
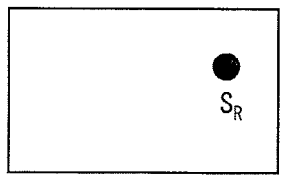
Image of point S projected on display by camera $C_R$
FIG. 23C
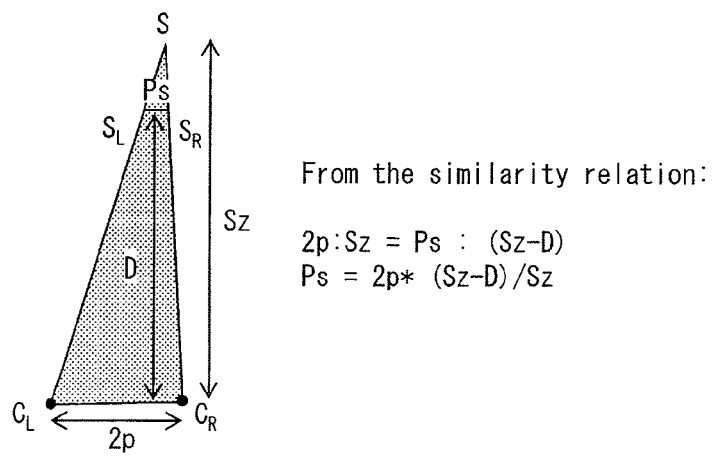
From the similarity relation:
$2p : Sz = Ps : (Sz-D)$
$Ps = 2p * (Sz-D)/Sz$ FIG. 24
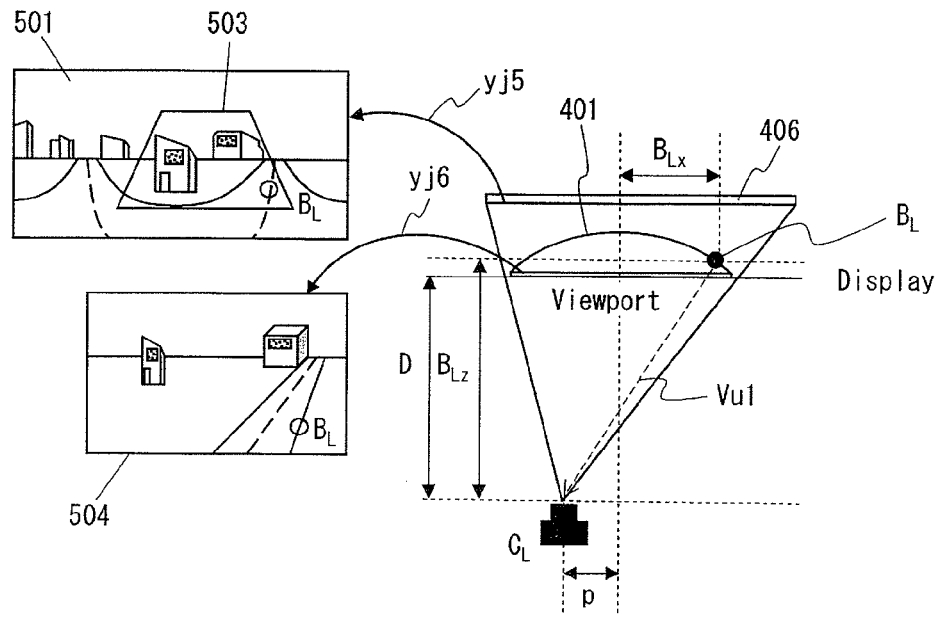
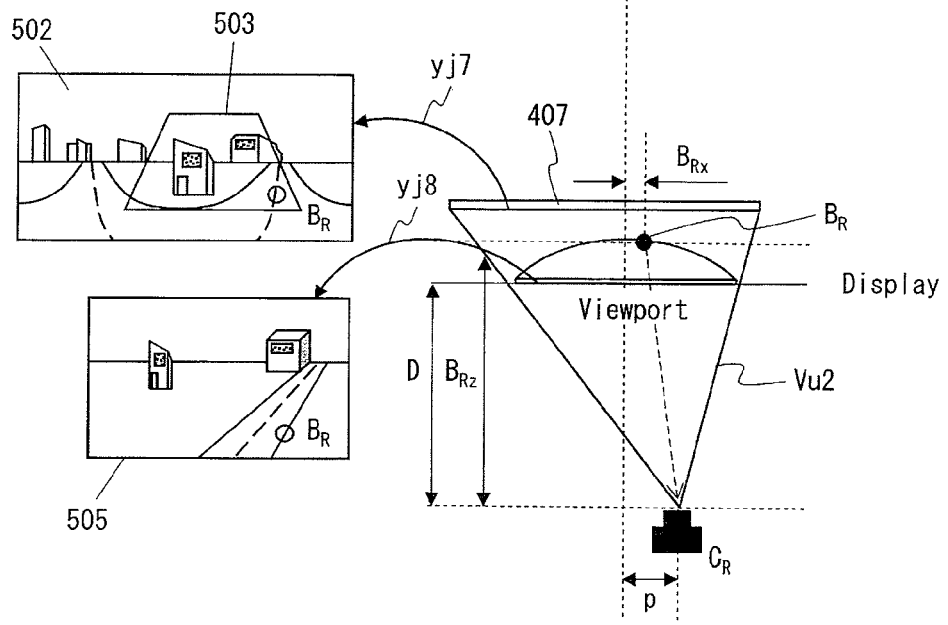

$(P+B_{Lx}):B_{Lz}=P_L:(B_{Lz}-D)$
$P_L=(P+B_{Lx})\times(B_{Lx}-D)/B_{Lz}$ $(P-B_{Rx}):B_{Rz}=P_R:(B_{Rz}-D)$
$P_R=(P-B_{Rx})\times(B_{Rx}-D)/B_{Rz}$ Move object

* $S_{zi}$ satisfies $P_{si} = P_B$ $P_{si} = P_B$

— DIBR based on corrected depth image

FIG. 32A   FIG. 32B
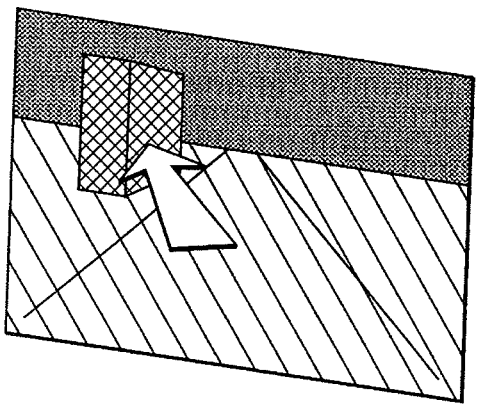
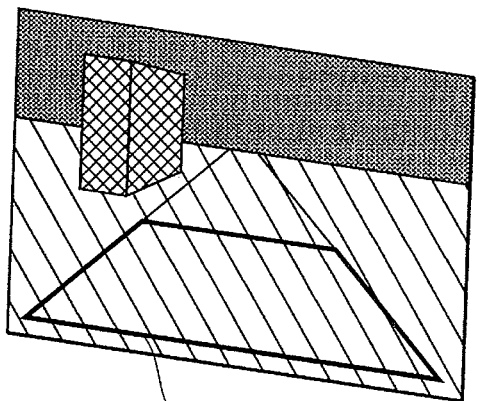
Frame defined at position frontward of intra-texture object
FIG. 32C
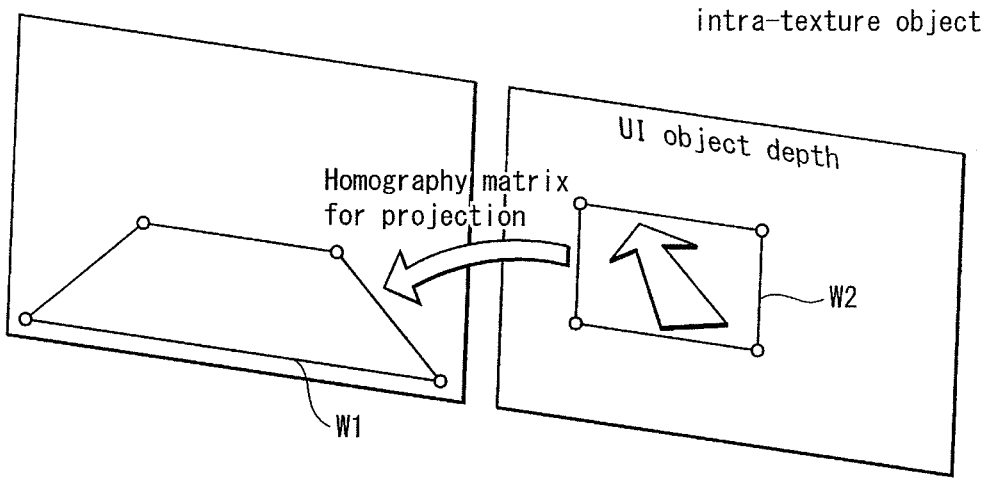
FIG. 32D
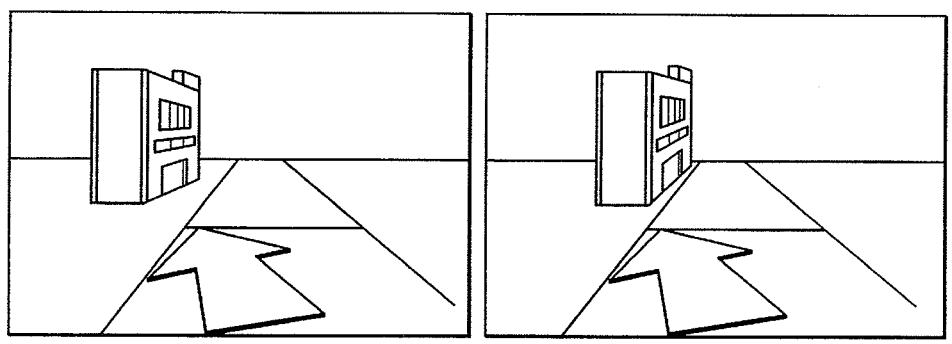
Geometrically transform UI object using homography matrix Q

IMAGE RENDERING DEVICE, IMAGE RENDERING METHOD, AND IMAGE RENDERING PROGRAM FOR RENDERING STEREOSCOPIC IMAGES

RELATED APPLICATIONS

This application is a National Phase application of International Application No. PCT/JP2012/001494, filed Mar. 5, 2012, and claims the benefit of U.S. Provisional application No. 61/470,018, filed Mar. 31, 2011, the disclosures of which are incorporated by reference herein in their entireties.

TECHNICAL FIELD

The related technical field belongs to 3D model composition.

BACKGROUND ART

The technique of 3D model composition is to display a foreground three-dimensional model defined by three-dimensional modeling data, together with a background three-dimensional model to which a background image is applied. Examples of background images applied to a background three-dimensional model include street views. In street view services, 360-degree panoramic images taken along streets are managed on the servers and appropriate images are downloaded via, for example, a WEB browser to enable reproduction of a 360-degree full panoramic view of scenery as seen from a specific location on a street.

Foreground three-dimensional models representing, for example, a graphical arrow indicating a moving direction and a street sign may be overlaid on the street view to enable the user to identify the direction of navigation and the current location of the street view. By switching the street view display in response to user operations made on foreground three-dimensional models being graphical user interface elements, increased interactivity is provided.

The Patent Literature 1 and 2 below disclose conventional technology related to street view.

CITATION LIST

Patent Literature

[Patent Literature 1]
JP Patent Application Publication No. 2010-531007
[Patent Literature 2]
JP Patent Application Publication No. 2005-165614

SUMMARY OF INVENTION

Technical Problem

In recent years, there has been a tendency to composite foreground three-dimensional models defined by three-dimensional modeling data with stereoscopic street views, rather than with monoscopic street views. A scheme for realizing stereoscopic street views involves applying a background image as a texture to a background three-dimensional model defined in three-dimensional modeling space, and projecting the background three-dimensional model to a predetermined viewpoint to obtain a viewport image. Viewport images obtained in this way are used for stereoscopic viewing. Consequently, stereoscopic street views showing the full panorama are realized. Note that foreground three-dimensional models to be used as GUI elements and background three-dimensional models to be applied are defined in three-dimensional modeling space. That is, as long as the positions of foreground three-dimensional models, which are GUI elements, are adjusted within the three-dimensional modeling space, no collision occurs between a foreground three-dimensional model and a background three-dimensional model.

In the case of 3D stereoscopic street views, however, it is not only a sphere in 3D virtual space that has depths. That is, a texture applied to a three-dimensional model also has depths. It is therefore possible that the depth values set in the three-dimensional modeling space differ from the depth values actually presented to the user.

In short, for stereoscopic presentation of street views, the positional adjustment within the three-dimensional modeling space is not sufficient. Consideration needs to be given to the possibility that an object existing in a texture appears to jump out of the screen due to stereoscopic viewing effect to collide with a foreground three-dimensional model. Here, an object included in a background image and to be presented with depths in stereoscopic playback is called an "intra-texture object". Depths of an intra-texture object are defined based on the intensity values of respective pixels in an associated depth image. The coordinates are on a different scale from the coordinates of the three-dimensional modeling space, which means that simple comparison of coordinate values does not give an indication of the depth relationship between the foreground three-dimensional model and the intra-texture object. Therefore, an attempt to present 3D stereoscopic street views in the same manner as monoscopic street views may cause depth disparity between a background image and a CG object overlaid on the background image and thus involves the risk of presenting unnatural looking street views.

JP Patent Application Publication No. 2005-165614 (Patent Literature 2) already discloses a technique for generating natural looking stereoscopic images by compositing CG and actually photographed stereo images. Yet, Patent Literature 2 does not discuss anything about using actually photographed stereo images as textures.

Note that although the technical problem to be solved is introduced on the precondition that that the background three-dimensional model subjected to the composition is a three-dimensional model with a street view applied thereto and that the foreground three-dimensional model is a GUI element, this is merely one familiar example used to explain the technical problem. The technical problem solved by the present invention is not limited to the specific case described above. That is, the technical problem described above may occur commonly in a process of compositing a three-dimensional model having depths with another three-dimensional model and will be inevitably faced by those skilled in the art in applying the above techniques into industry products.

An object of the present invention is to provide an image rendering device for appropriately compositing a foreground three-dimensional model with an intra-texture object existing in a texture applied to a spherical model, even if the intra-texture object has depths.

Solution to Problem

To solve the above problem, an image rendering device is for realizing stereoscopic viewing of composite images generated by compositing background three-dimensional models and foreground three-dimensional models each defined in three-dimensional modeling space and includes: a coordinate converter that performs a coordinate conversion on modeling data defining a geometry of a background three-dimensional model and a geometry of a foreground three-dimensional model, so that coordinates describing vertices of the modeling data are converted into three-dimensional coordinates describing corresponding points in the three-dimensional modeling space; a texture mapper that converts background image data into two or more viewpoint textures and maps each viewpoint texture to a background three-dimensional model in the three-dimensional modeling space; a viewport converter that extracts, for each of the two or more viewpoint textures, a viewport image from the background three-dimensional model mapped with the viewpoint texture and from the foreground three-dimensional model; and a manager that manages the foreground three-dimensional model and the background three-dimensional model. The two or more viewpoint textures include an intra-texture object. The manager determines depth relationship between the foreground three-dimensional model and the intra-texture object, by comparing a parallax of the foreground three-dimensional model occurring in stereoscopic playback with a parallax of the intra-texture object occurring in stereoscopic playback and adjusts positional relationship between the foreground three-dimensional model and the intra-texture object based on a result of the determination.

Advantageous Effect of the Invention

The depth relationship between an intra-texture object and a foreground 3D model is checked by comparing the parallax for the foreground 3D model and the parallax for the intra-texture object. That is, without requiring coordinate conversion, the depth relationship between the intra-texture object and the foreground 3D model is duly determined. By adjusting the depth relationship between the foreground 3D model and the intra-texture object based on the determination result, GUI not colliding with the intra-texture object is realized on a stereoscopic street view.

In the case where a foreground three-dimensional object needs to be moved or deformed in response to an external event, such as user operation or communication event, collision avoidance between the three-dimensional foreground model and any intra-texture object is guaranteed. Consequently, stereoscopic street views ensured to suitably follow user operations during playback are realized.

Note that the invention directed to this image rendering device may achieve additional advantageous effects by adding invention-specifying matters or by replacing the matters specifying the invention pertaining to the image rendering device with other matters to limit a broader or more general concept to a narrower or more specific concept. With such arrangement, the invention pertaining to the image rendering device described above may achieve additional advantageous effects. The variations of adding or narrowing the matters specifying the invention include the following. In the claims, the variations are defined in the dependent claims starting from claim 2.

Optionally, the adjustment of positional relationship may be carried out by causing the coordinate converter to change a position of the foreground three-dimensional model in the three-dimensional modeling space to a position further away from the background three-dimensional model.

With the above configuration, the following screen presentation may be realized. That is, when a building appearing at a distance in a street view provided by a street view service comes closer toward the front as the viewpoint changes, a foreground three-dimensional model correspondingly moves closer toward the front. That is, the above configuration enables an innovative screen presentation that changes responsively to the positional change of a building appearing in a street view.

Optionally, the conversion of the background image data into the two or more viewpoint textures may be carried out by acquiring a depth image associated with the background image data and performing depth image based rendering based on the acquired depth image. The adjustment of positional relationship may be carried out by correcting the depth image data and performing depth image based rendering based on the corrected depth image to newly generate two or more textures.

With the above configuration, the background image is made to appear further in the back by re-generating textures for texture mapping while the depths of the foreground three-dimensional model are fixed unchanged. Consequently, the following screen presentation may be made. That is, as the foreground three-dimensional model comes closer toward the front, the background image retracts to make a wider angle of scenery viewable. This provides product differentiation against competing products.

Optionally, the adjustment of positional relationship may be carried out by masking, among pixels of the foreground three-dimensional model projected in each viewport image, every pixel having a depth greater than a depth of the intra-texture object and rendering unmasked pixels of the foreground three-dimensional model.

With the above configuration, the positional relationship with the intra-texture object is corrected by the masking, which is an extension of masking in the viewport conversion carried out in the field of general computer graphics. This is advantageous for easy software implementation.

Optionally, the two or more viewpoint textures may be generated by acquiring background depth image data and performing depth image rendering based on the acquired background depth image data. The adjustment of positional relationship may be carried out by: converting the intra-texture object into modeling data; storing, into a depth buffer, three-dimensional coordinates describing a geometry of modeling data converted from the intra-texture object, along with three-dimensional coordinates describing the foreground three-dimensional model; and enabling a depth testing function to calculate lighting values based on the sets of three-dimensional coordinates stored in the depth buffer.

With the above configuration, the positional relationship with the intra-texture object is corrected by the lighting value calculation, which is an extension of lighting value calculation with depth testing carried out in the field of general computer graphics. This is advantageous for easy software implementation.

Optionally, of the three-dimensional coordinates describing the modeling data converted from the intra-texture object, a Z coordinate may be calculated based on a parallax between a pixel in one of the two or more viewpoint textures and a corresponding pixel in another one of the two or more viewpoint textures.

With the above configuration, depth based rendering of a background image is performed based on the depth image to generate two or more viewpoint textures and the parallax between the viewpoint textures is calculated. By doing so, the parallax occurring for modeling data converted from an intra-texture object is calculated.

Optionally, when a line-of-sight direction is changed, the viewport converter may: newly extract a viewport image corresponding to the new line-of-sight direction from the background three-dimensional model mapped with one of the two or more viewpoint textures and from the foreground three-dimensional model; and newly acquire two or more viewport images by performing depth image based rendering of the newly extracted viewport image based on background depth image data.

With the above configuration, the positional relationship with the intra-texture object is corrected by re-doing viewport conversion without re-doing coordinate conversion and lighting value calculation (texture mapping). This enables to present stereoscopic display promptly responsive to user operations.

Optionally, the adjustment of positional relationship may refer to a geometry transformation applied to the foreground three-dimensional model by manipulating the coordinates describing vertices defining the geometry of the foreground three-dimensional model.

The above configuration enables a screen presentation in which the foreground three-dimensional model is deformed depending on the positional relationship with other objects appearing in the street view.

Optionally, the extraction of viewport images may be carried out according to a viewpoint position in the three-dimensional modeling space. The adjustment of positional relationship may be carried out by changing the viewpoint position.

With the above configuration, the positional relationship with the intra-texture object is corrected by re-doing viewport conversion in CG processing without re-doing coordinate conversion and lighting value calculation (texture mapping). This enables to present stereoscopic display promptly responsive to user operations.

Optionally, when the parallax of the foreground three-dimensional model refers to a parallax PS between points SL and SR on a precondition that a point S in the foreground three-dimensional model corresponds to a set of coordinates SL on a left-view viewport and to a set of coordinates SR on a right-view viewport, the parallax of the foreground three-dimensional model may be expressed in Equation 1 below, $$PS=2p*(Sz-D)/Sz \qquad \text{Equation 1,}$$

where: Sz denotes a coordinate in depth direction of the foreground image in a view coordinate system; D denotes a distance between a camera position and a display; and 2p denotes a distance between a left-view camera and a right-view camera.

With the above configuration, as long as the coordinate value Sz in the three-dimensional modeling space is known, the parallax for the foreground three-dimensional is obtained using the fixed parameters D and P. Thus, no additional computational load is placed by the determination of depth relationship between objects and the positional adjustment of an object.

Optionally, when the parallax of the intra-texture object refers to a parallax PB between points BL and BR on a precondition that a point B in the intra-texture object applied to an inner surface of the background three-dimensional model corresponds to a set of coordinates (BLx, BLy, BLz) on a left-view viewport and to a set of coordinates (BRx, BRy, BRz) on a right-view viewport, the parallax of the intra-texture object may be expressed in Equation 2 below, $$PB=\{(D*BRx+p*(BRz-D))/BRz\}-\{(D*BLx-p*(BLz-D))/BLz\} \qquad \text{Equation 2,}$$

where: D denotes a distance between a camera position to a display; and p denotes half a distance between a left-view camera and a right-view camera.

With the above configuration, the coordinates BLX and BLZ on the intra-texture object at the time of the left-view image output and the coordinates BRX and BRZ on the intra-texture object at the time of the right-view image are applied to the above equation, so that the parallax PB is calculated with the use of fixed parameters D and P.

Optionally, the image rendering device may further include: a position and direction determiner that determines, in accordance with a user operation, a current viewpoint location on a map and a current line-of-sight direction; and a downloader that generates an image acquisition request using geographic information corresponding to the current viewpoint location on the map and transmits the image acquisition request to an image collection server, thereby to download a street view file. The street view file transmitted from the image collection server may have a location attribute matching the geographic information included in the image acquisition request. The background image data may be contained in the downloaded street view file. As above, a desired street view file is acquired by causing the server to conduct a search for background images, using the geographic information contained in the photograph file as a keyword. Consequently, by integrating the image rendering device into a digital television receiver, a new service is provided through a combined use of the digital television receiver and a stereoscopic camera. This provides product differentiation against competing products when selling digital television receivers packaged with a stereoscopic camera.

Optionally, the image rendering device may further include: a position and direction determiner that determines, in accordance with a user operation, a current viewpoint location on a map and a current line-of-sight direction; and a downloader that generates an image acquisition request using geographic information corresponding to the current viewpoint location on the map and transmits the image acquisition request to an image collection server, thereby to download a street view file. The street view file transmitted from the image collection server may have a location attribute matching the geographic information included in the image acquisition request. The background image data may be contained in the downloaded street view file. This allows the user to freely change the line-of-sight within the angular range covered by the panoramic view image, so that richer past-experience simulation is provided.

BRIEF DESCRIPTION OF DRAWINGS

FIGS. 5A-5C illustrate the process for generating multi-viewpoint images from background images applied to the inner surface of a sphere.

FIGS. 6A and 6B each illustrate the spherical model onto which a left-shifted or right-shifted panoramic image is applied.

FIGS. 23A, 23B, and 23C illustrate an example of settings of a left-view camera CL and a right-view camera CR in three-dimensional modeling space and also of an image projection region.

FIG. 24 illustrates the X-Z plane on which the cameras CL and CR are located.

FIGS. 32A, 32B, 32C, and 32D illustrate the process of geometrical transformation.

DESCRIPTION OF EMBODIMENTS

The invention pertaining to an image rendering device having the means to solve the above problem may be implemented as a digital home appliance for playing back street views, whereas the invention pertaining to an integrated circuit may be implemented as a system LSI embedded in such a digital home appliance. The invention pertaining to an image rendering method may be implemented as a series of steps performed in proper time sequence by such a digital home appliance. The invention pertaining to an image rendering program may be implemented as an executable program that is stored on a non-transitory computer-readable recording medium for installation into a digital home appliance. Prior to the description of the image rendering device, the following describes the overall configuration of a stereoscopic global view search service, which is the environment in which the image rendering device is used.

Figure 1:
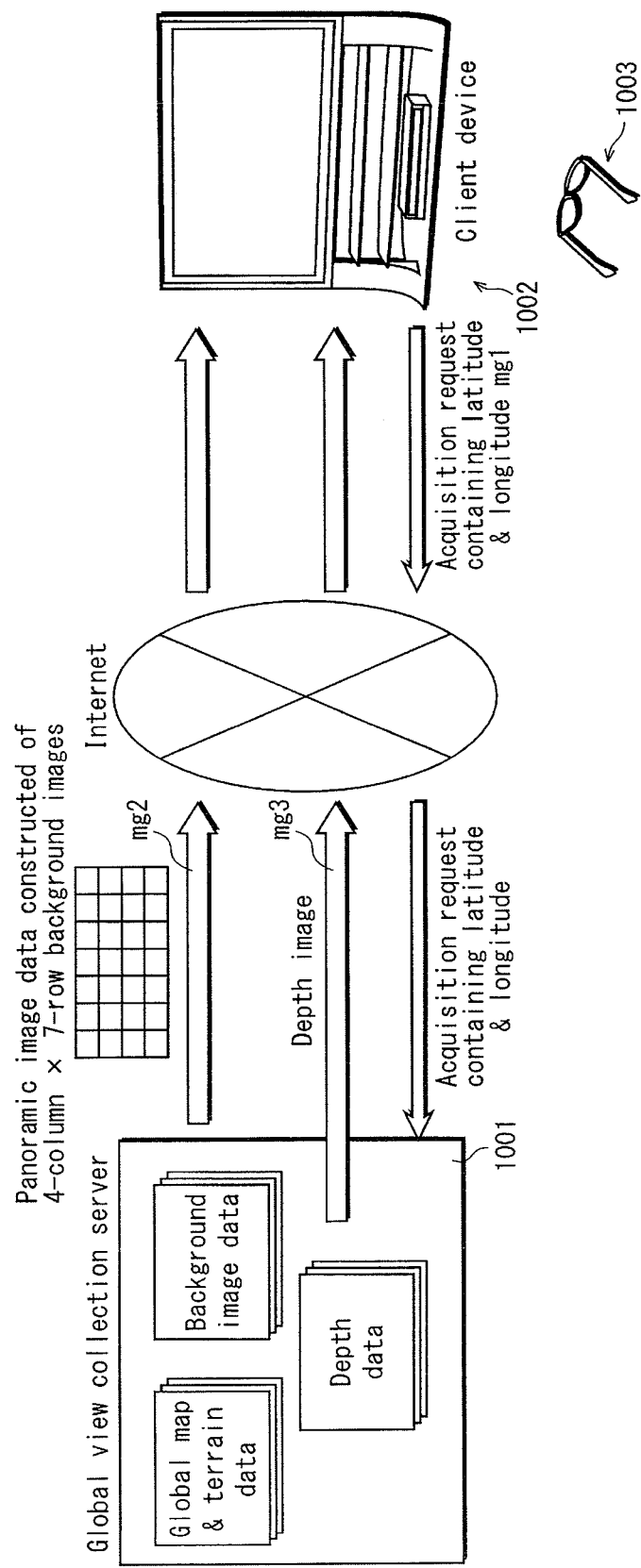
FIG. 1 illustrates the overall configuration of a stereoscopic global view search service.

FIG. 1 illustrates the overall configuration of the stereoscopic global view search service. A global view collection server 1001 stores background images collected around the world, and also stores depth data and terrain data of each background image. Upon request from client devices, the global view collection server 1001 transmits panoramic viewpoint images along with the associated depth images and terrain data. Background images are taken by cameras mounted atop a passing vehicle dedicated for image capturing. Depth data represents the depths to landmarks appearing in a captured image. Panoramic viewpoint images represent a view of surroundings as seen from a geographic location that matches the geographic information specified in an image acquisition request transmitted to the global view collection server 1001. A panoramic viewpoint image presents a view covering a relatively wide angle, such as 90°, 120°, 180°, and 360°, for example. Specifically, a panoramic viewpoint image covering 360° may also be referred to as a full view panoramic image or wraparound image. For the sake of convenience, the following description is given on the assumption that panoramic viewpoint images are 360-degree panoramic images, which are simply referred to as "panoramic images". A vehicle for image capturing is equipped with multiple cameras and captures four images in a vertical direction and seven images horizontally around (4 columns×7 rows) for each current location of the vehicle. A depth image represents depths in a background image by showing pixel luminance in proportion to the distance to surfaces of landmarks from the viewpoint. That is, each pixel in a depth image is a piece of depth information indicating the depth to a corresponding pixel in the background image.

A client device 1002 is a network home appliance, such as a digital television receiver, and transmits a download request mg1 to a server and receives a panoramic image mg2 and a depth image mg3 from the server. With the use of panoramic images, the client device 1002 presents a 3D street view. A download request includes information specifying the latitude, longitude, and altitude of a desired location on the Earth to request a panoramic image of the location to be transmitted.

A pair of eyeglasses 1003 is for use by a user to see street views stereoscopically. Stereoscopic viewing of a street view is realized by using multi-viewpoint images. The multi-viewpoint images refer to a set of viewpoint images as seen from two or more viewpoints for realizing stereoscopic viewing, such as left-, right-, central-, upper-right-, lower-right-, upper-left-, and lower-left-view image. Yet, describing each and every possible combination of multi-viewpoint images is rather complicated. For the sake of brevity, in the following description, multi-viewpoint images are assumed to be a minimal set of viewpoint images, namely a left-view image and a right-view image making up a stereo pair.

Figure 2:
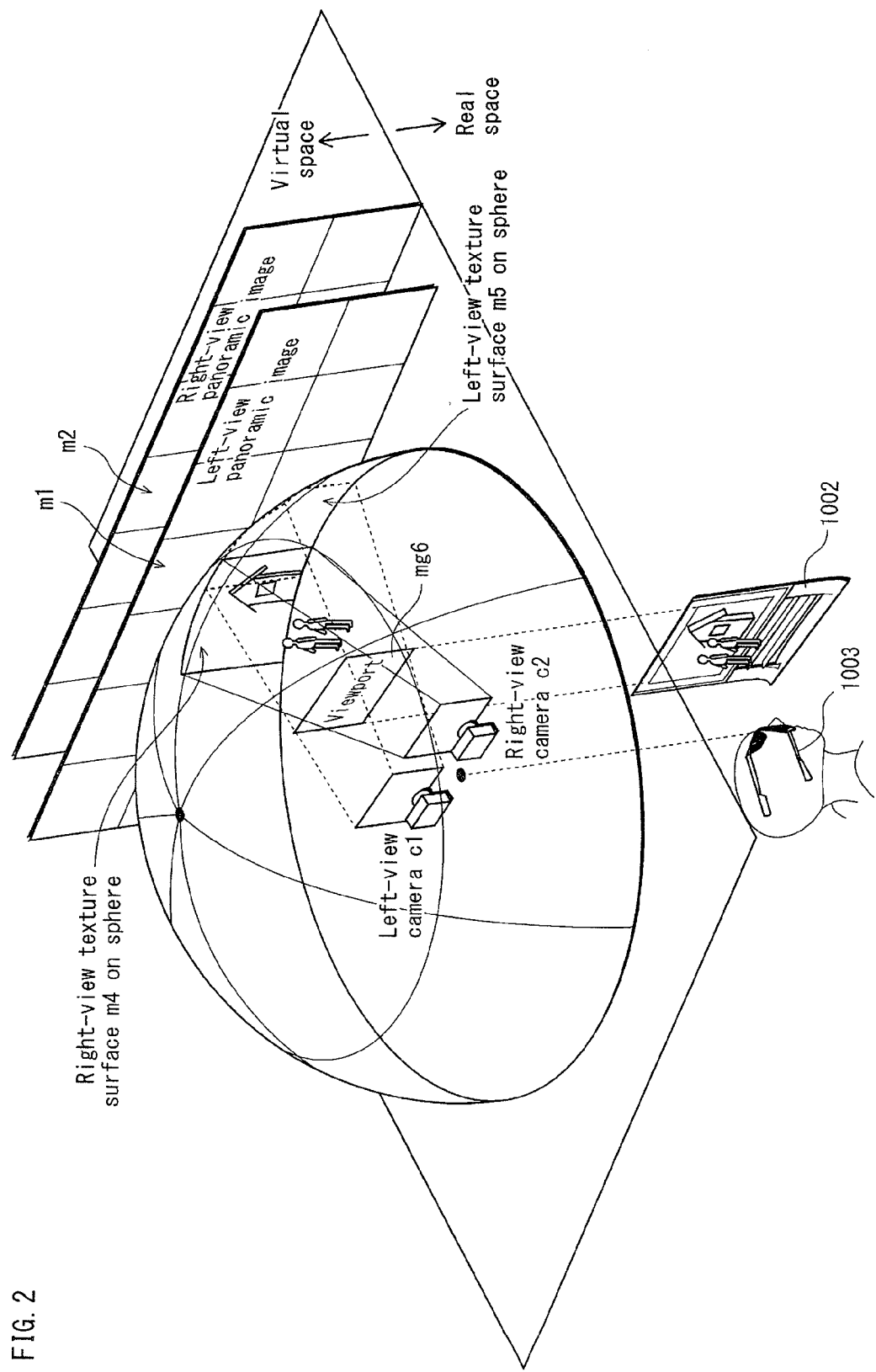
FIG. 2 schematically illustrates a virtual space pertaining to a street view.

FIG. 2 schematically illustrates a stereoscopic street view system. The upper half of the figure represents a virtual space in which a model is present, whereas the lower half of the figure represents a real space in which the client device 1002 and the eyeglasses 1003 are physically present.

First, a description of the virtual space is given. A virtual space is a three-dimensional modeling space defined on a coordinate system for describing the geometric shape of a three-dimensional model. A three-dimensional model may have any shape. A three-dimensional model may be of any shape, including a cylinder, a circular cone, a delta cone, and a spheroid. For purposes of convenience, the following description is given using a spherical model. The center of a sphere, which is a three-dimensional model, coincides with the camera position. For simplicity, the figure illustrates only one spherical model. However, for stereoscopic viewing, separate spherical models are used for the left-view and right-view. In the figure, the camera CL is located at a position offset to the right from the center of the sphere by the distance p. The camera CR is located at a position offset to the left from the center of the sphere by the distance p. Each of the cameras CL and CR is at the center of the corresponding spherical model used when capturing left- or right-view images.

Angularly upwardly from the three-dimensional model, a panoramic image composed of 4 columns×7 rows background images is applied. Panoramic images include a right-view panoramic image m1 and a left-view panoramic image m2, and right-view texture and left-view texture are applied to different locations in the three-dimensional modeling space. Although the figure illustrates only the upper half of the spherical model, the spherical model also has a lower half. Similarly, although the figure illustrates only the upper half of the panoramic image, the panoramic image has a lower half.

The following is a description of the spherical model. The inner surface of the sphere has a region defined as a right-view texture surface m4 and as a left-view texture surface m5. A texture surface in a spherical model refers to a grid defined by four or three intersection points on the spherical model. Such a grid has the same curvature as the spherical model and defined as part or whole of a triangular strip having each vertex at a point specified by the polar coordinates of the spherical model. In texture mapping, graphics are rendered by designating a triangle strip as a geometry type and by assigning the coordinates of the texture buffer storing the background image. A display plane is present at a position closer toward the front than the texture, and a viewport mg6 is defined on the display plane. A viewport indicates the region in the three-dimensional modeling space used for display. Images projected on the viewport are supplied for playback. The viewport is located at the position where the image projection regions of the left-view and the right-view overlap. That is, the viewport for the left-view and the viewport for the right-view are commonly located at the same position.

The texture image applied to the inner surface of the spherical model is a panoramic image, so that a 360-degree panorama is provided. By developing the spherical model in the three-dimensional modeling space into a Mercator image, a panoramic image is obtained. The number of 2 (column)×7 (row) grids in the semi-sphere is equal to the number of 2 (column)×7 (row) background images stitched into the panoramic image. In other words, the texture mapping is carried out on the individual background images making up the panoramic image, by converting each background image into a texture and applies the texture to a corresponding grid in the spherical model.

This concludes the description of the virtual space. The following now describes the real space.

In the figure, the client device 1002 and a user's head with the eyeglasses 1003 on are illustrated directly below the sphere representing the three-dimensional model. The display screen of the client device 1002 is located directly below the viewport in the spherical model. The eyeglasses 1003 are located slightly farther back from the position that is directly below the cameras CL and CR for the following reason. That is, the cameras CL and CR need to coincide in position to the user's right-view and left-view, so that the eyeglasses 1003 need to be located in the vicinity.

As described above, the positions of the cameras CL and CR coincide with the user's right-view and left-view, while the viewport coincides with the screen of the client device 1002. Thus, stereoscopic images appear between the client device 1002 and the user. In the virtual space, a house illustrated as a plane figure. However, in the real space, the house appears as popping out of the screen of the client device 1002.

Figure 3:
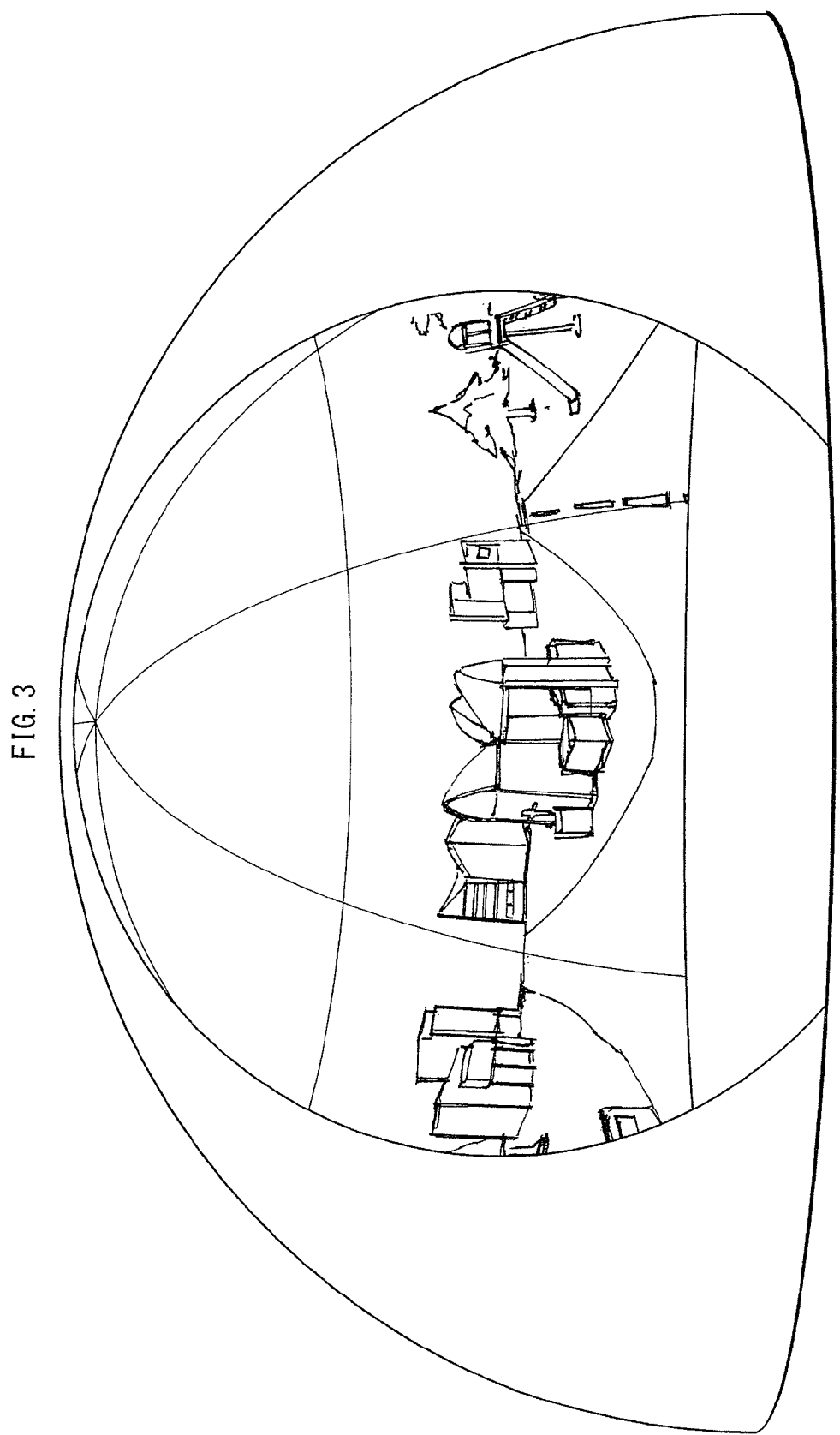
FIG. 3 illustrates a spherical model having background images applied in the row direction on the inner surface.

FIG. 3 illustrates the texture applied to the inner spherical surface, as seen from the center of the spherical model. More specifically, FIG. 3 illustrates the inner surface of the spherical model where a plurality of background images are applied in the row direction. In the background images illustrated in FIG. 3, there is a modern-looking church in the front and a playground slide on the right hand side. Since the background images are applied to the inner surface of the sphere, the background images fully surround the camera when seen from the camera located at the center of the circular cross section. The texture applied to the spherical model varies with the location of the viewpoint that is determined by the latitude, longitude, and altitude on Earth. That it, in response to a user operation for changing the viewpoint, the image rendering device updates the current viewpoint determined by the world's geographic information (latitude, longitude, altitude, and so on), downloads a panoramic image matching the updated current viewpoint, and applies the panoramic image to the spherical model to carry out re-rendering.

Figure 4A:
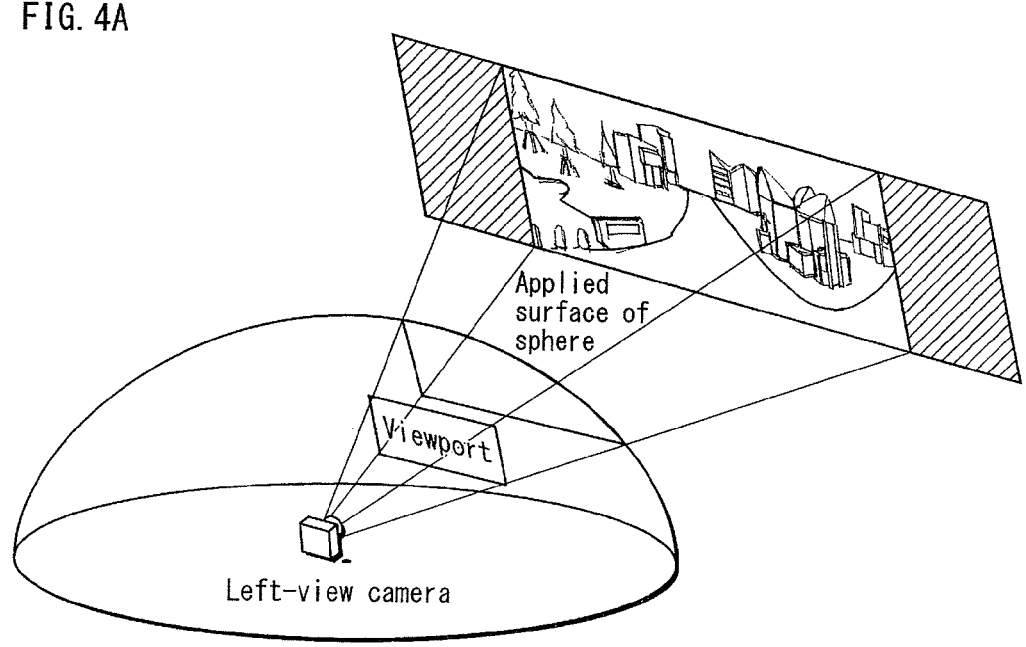
FIGS. 4A and 4B illustrate two spherical models created in three-dimensional modeling space at the time of executing stereoscopic playback.
Figure 4B:
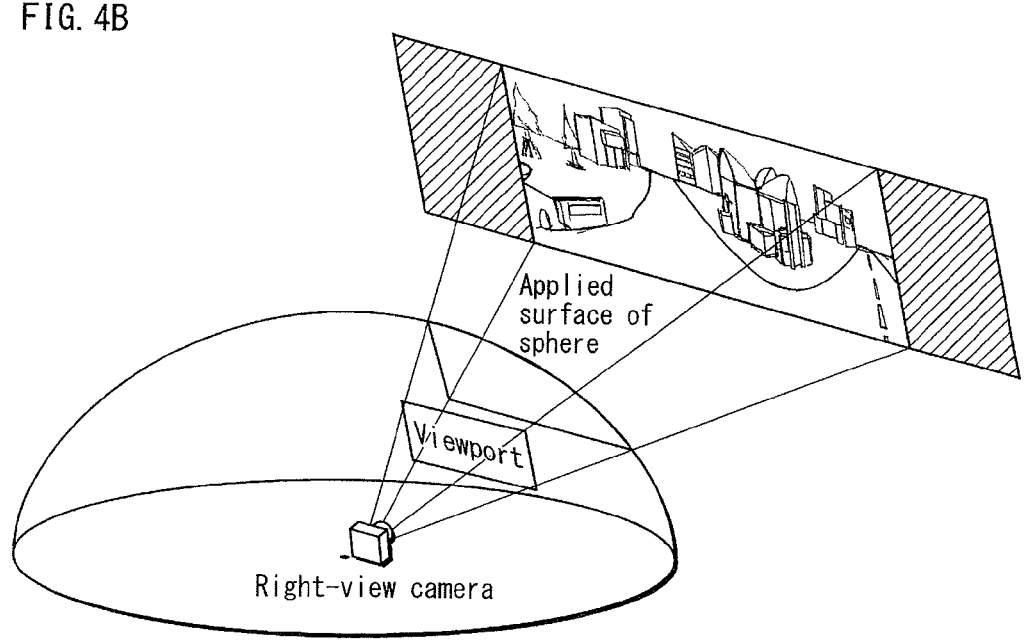

Note that the camera position at the center of the spherical model illustrated in FIG. 2 is for planar viewing and different from the camera position for stereoscopic viewing. For stereoscopic viewing, the camera position is shifted by the distance p from the center of the spherical model, which results in two spherical models in total. FIGS. 4A and 4B illustrate two spherical models created in the three-dimensional modeling space at the time of executing stereoscopic playback. FIG. 4A illustrates a spherical model for left-view. A left-view image generated by DIBR (Depth Image Based Rendering or Depth Image Based Representations) on a joint image constructed of seven background images stitched together in the row direction is applied to the inner surface of the spherical model.

FIG. 4B illustrates a right-view image generated for the image illustrated in FIG. 4A, by depth based rendering using the depth image as a base. The right-view image thus generated by performing depth based rendering of a joint image constructed of seven background images stitched together in the row direction is applied to the inner surface of the spherical model.

Here, images A, B, C, D, E, F, and G denote the seven images arranged in the row direction to constitute a panoramic image. The following describes how right- and left-view textures are generated from the images A-G. FIGS. 5A-5C illustrate the process of generating multiple viewpoint images from the background images placed onto the inner surface of the sphere. FIG. 5A illustrates an example in which five of the seven background images constructing the panoramic image are placed onto seven divided regions of the spherical internal surface. To be more precise, the background images A, B, C, D, and E are sequentially applied in the order of A→B→C→D→E. The following is a description of the images A, B, C, D, and E illustrated in FIG. 5A. In the image A, each of AL, AM and AR denotes a group of pixels which undergo coordinate change as a result of shift by DIBR. In the image B, each of BL, BM, and BR denotes a group of pixels which undergo coordinate change as a result of shift by DIBR. In the image C, each of CL, CM, and CR denotes a group of pixels which undergo coordinate change as a result of shift by DIBR. In the image D, each of DL, DM, and DR denotes a group of pixels which undergo coordinate change as a result of shift by DIBR. In the image E, each of EL, EM, and ER denotes a group of pixels which undergo coordinate change as a result of shift by DIBR. The groups of pixels in each image together define "V" shapes.

To create a left-view texture, the images A-E are stitched together and then DIBR is performed. As a result, the pixels located at the left edge of each image fall outside the display region. Thus, the pixel groups BL, CL, DL, EL, and FL illustrated in FIG. 5A are added to the right edge of a neighboring image, which is a corresponding one of the images A, B, C, D, and E. FIG. 5B illustrates the result. As illustrated in FIG. 5B, the left-view texture is composed of: an image A(L) containing the pixel groups AM, AR, and BL; an image B(L) containing the pixel groups BM, BR, and CL; an image C(L) containing the pixel groups CM, CR, and DL; an image D(L) containing the pixel groups DM, DR, and EL; and an image E(L) containing the pixel groups EM, ER, and FL. For the purpose of convenience in the description, FIG. 5 do not include any figures illustrating the images F and G. Yet, the images F and G are also processed in the same manner.

To create a right-view texture, the images A-E are stitched together and then DIBR is performed. As a result of the image stitching, the pixels located at the right edge of each image fall outside the display region. Thus, the pixel groups GR, AR, BR, CR, DR illustrated in FIG. 5A are added to the left edge of a neighboring image, which is a corresponding one of the images A, B, C, D, and E. FIG. 5C illustrates the result. As illustrated in FIG. 5C, the right-view texture is composed of: an image A(R) containing the pixel groups GR, AL, and Am; an image B(R) containing the pixel groups AR, BL, and Bm; an image C(R) containing the pixel groups BR, CL, and Cm; an image D(R) containing the pixel groups CR, DL, and Dm; and an image E(R) containing the pixel groups DR EL, and Em.

FIG. 6A illustrates the texture placed onto the inner spherical surface, when the image after the left-shift as illustrated in FIG. 5B is used. FIG. 6B illustrates the texture placed onto the inner spherical surface, when the image after the right-shift as illustrated in FIG. 5C is used.

Figure 7A:
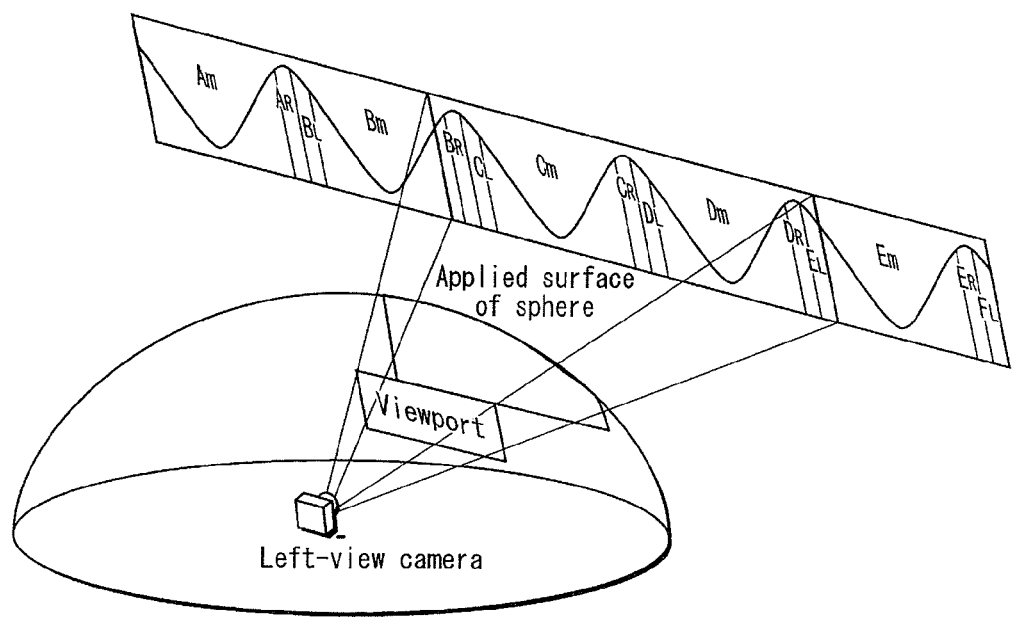
FIGS. 7A and 7B illustrate the left-texture arrangement and the right-view texture arrangement, respectively.
Figure 7B:
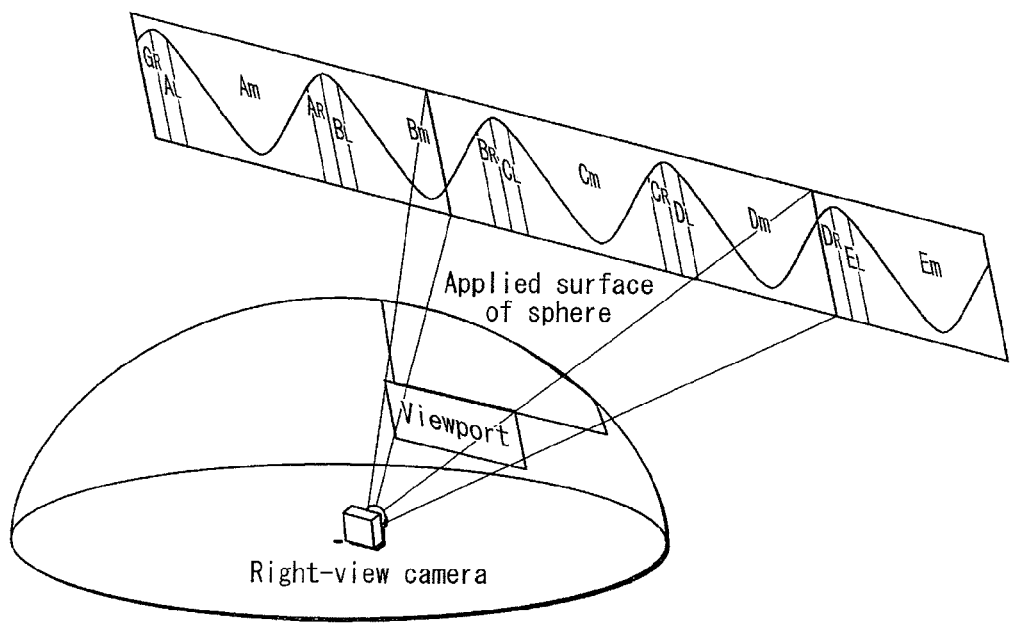

FIG. 7A illustrates the relation between the viewport and the left-view texture or the right-view texture in the three-dimensional modeling space illustrated in FIG. 1. FIG. 7A illustrates the arrangement of the left-view texture. In the figure, the left-view texture is located at a position corresponding to the view vector of the left-view camera and applied to the inner surface of the spherical model. As a result, a portion corresponding to the viewport is used for display. FIG. 7B illustrates the arrangement of the right-view texture. In the figure, the right-view texture is located at a position corresponding to the view vector of the right-view camera and applied to the inner surface of the spherical model. As a result, a portion corresponding to the viewport is used for display.

Figure 8B:
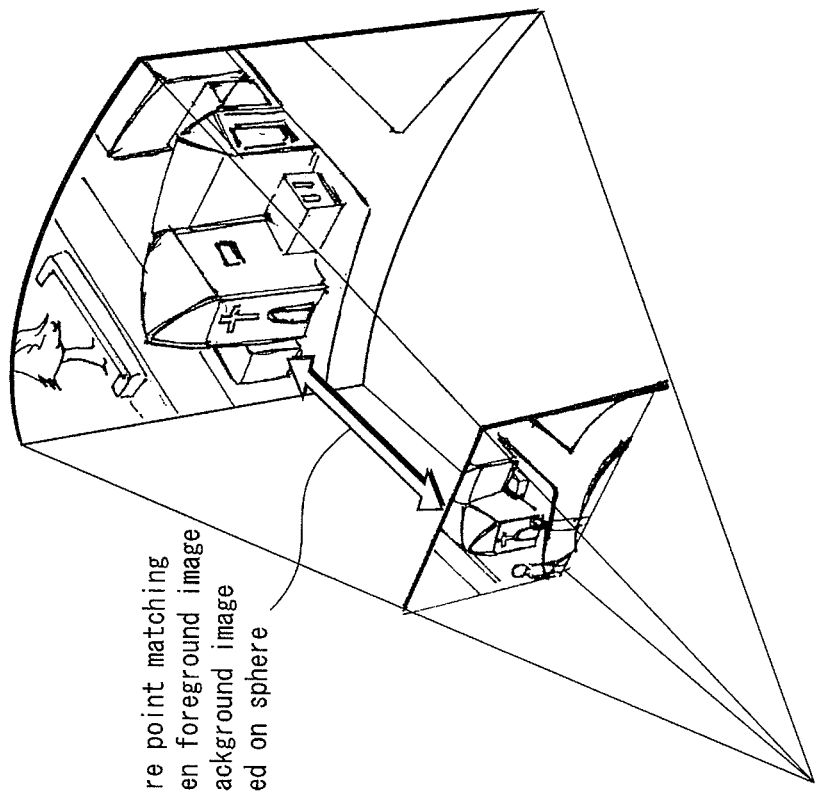
FIG. 8B illustrates image composition with a background image.
Figure 8A:
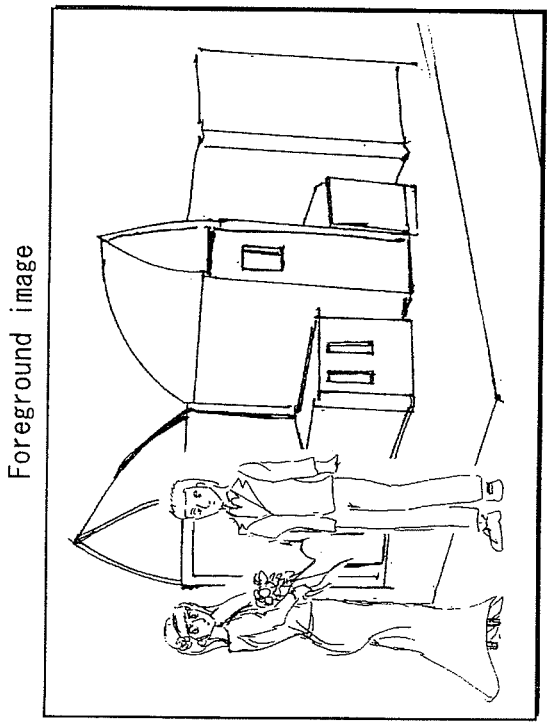
FIG. 8A illustrates a foreground image.

FIGS. 8A and 8B illustrate the composition of a foreground image and a background image. FIG. 8A illustrates the foreground image subjected to the image composition. The foreground image is a snapshot of a bride and groom standing face to face in front of a modern-looking church. Since the modern-looking church is also appears in the background image, the shape defined by the outline of the church is a common feature in both the foreground image and the background image. FIG. 8B illustrates the matching between the foreground image and the background image. By the process of matching, a transformation matrix representing the relation between the background image and the foreground image is obtained. According to the resulting matrix, the depth image for the foreground image is converted prior to DIBR. This ensures that the foreground image is merged into the background image without causing depth disparities.

Figure 9:
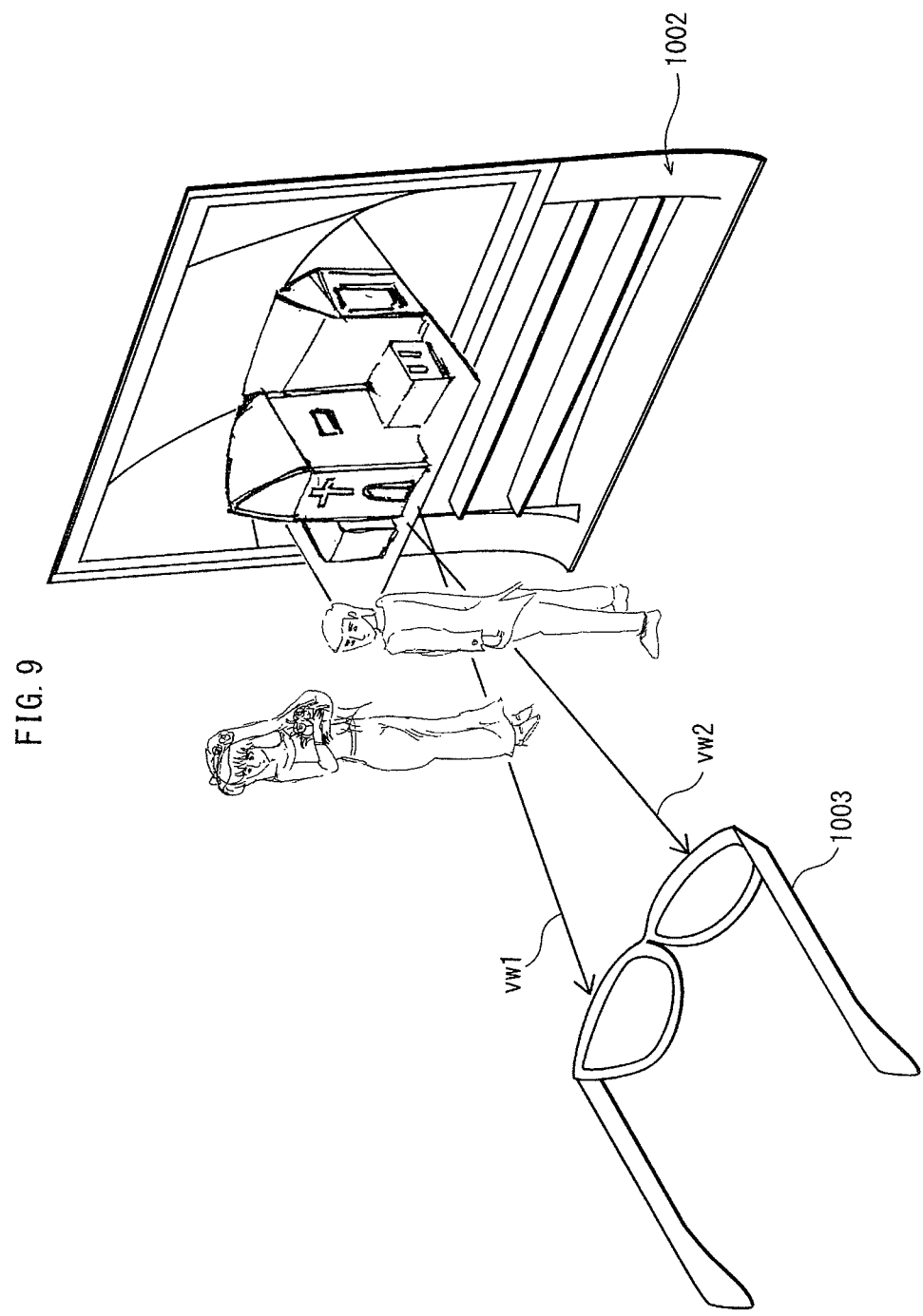
FIG. 9 illustrates one example of a past-experience image.

The image composition illustrated in FIGS. 8A and 8B allows the user to enjoy past experience simulation. FIG. 9 illustrates an example of image composition. A line-of-sight vw1 indicates an image perceived by the user when the eyeglasses 1003 block the right-eye's view. A line-of-sight vw2 indicates an image perceived by the user when the eyeglasses 1003 block the left-eye's view. A left-view image is viewed along the line-of-sight vw1. On the other hand, a right-view image is viewed along the line-of-sight vw2. By wearing the eyeglasses 1003, the user views right- and left-view images alternately one by one, so that stereoscopic images are perceived. The image illustrated in FIG. 9 is a stereoscopic image perceived as a result of compositing the foreground image and the background image obtained on the viewports by following the transformation matrix. Since the image of the people appears with the plurality of background images that are appropriately placed onto the inner spherical surface, rich and realistic stereoscopic images are perceived. As described above, if a panoramic image of a global location matching that of a photograph is obtained from a server, the photograph is ensured to be composited with a panoramic image appropriately matching the photograph.

Figure 10:
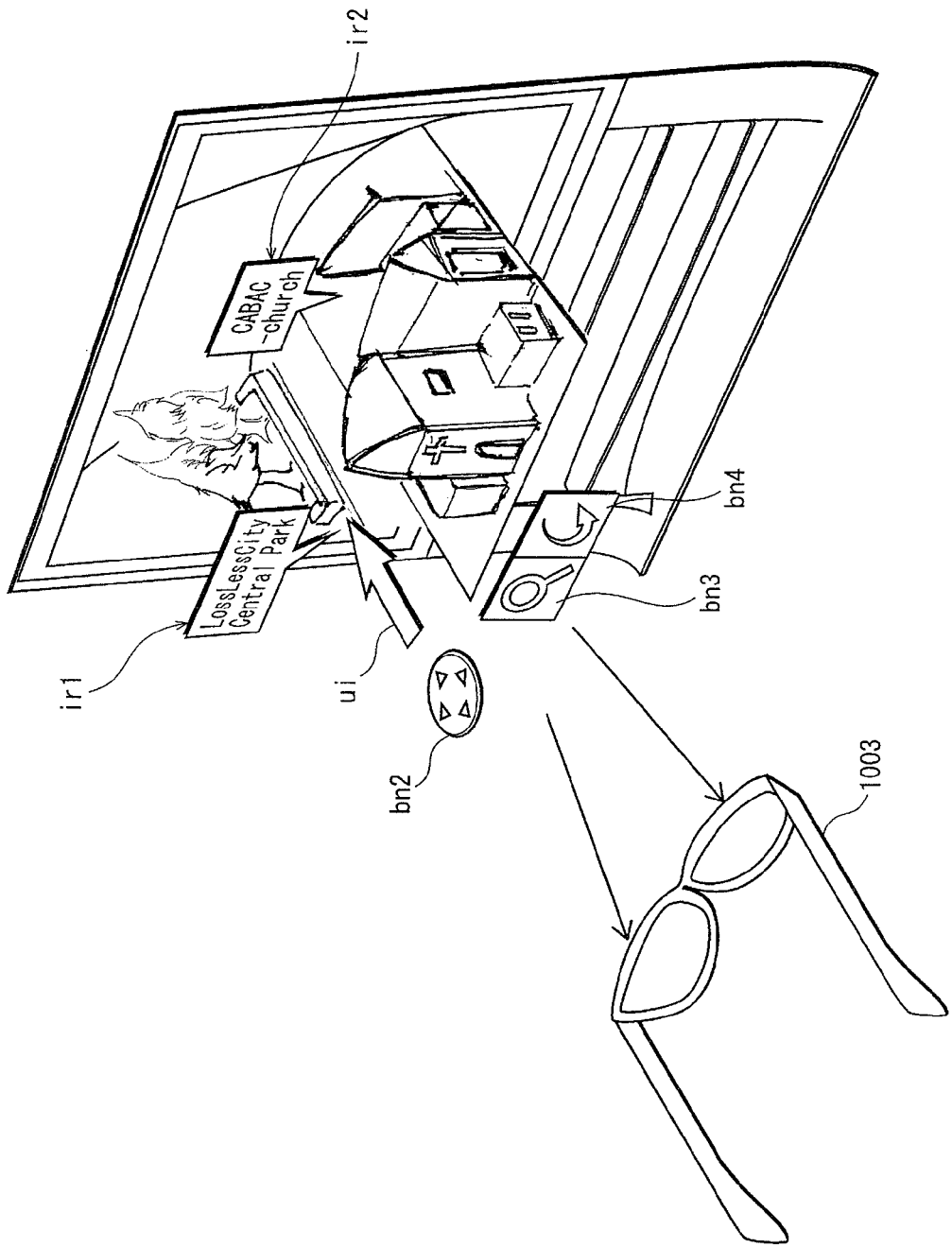
FIG. 10 illustrates one example of a street view navigation screen.

In addition, an UI object may be composited with a street view. FIG. 10 illustrates a street view presented with UI objects. A directional navigator ui is a visual representation of the current line-of-sight direction. Indicators ir1 and ir2 show the place name (such as, loss-Less City central park) and the building name (such as CABAC church) associated with the location of the current viewpoint. A cross button bn2 is for receiving a user operation of selecting a direction in which the current viewpoint is to be moved. A zoom-up button bn3 is used to receive a user operation of selecting a zoom up or down, without changing the viewpoint and the line-of-sight direction. An angle button bn4 is for receiving a user operation of turning the current direction of the line-of-sight to the right or left. These GUI elements are allocated to keys of a remote control, so that user operations on the remote control enable control on street views, such as moving or rotating the street views. This concludes the description of the global view search service.

Embodiment 1

Figure 11:
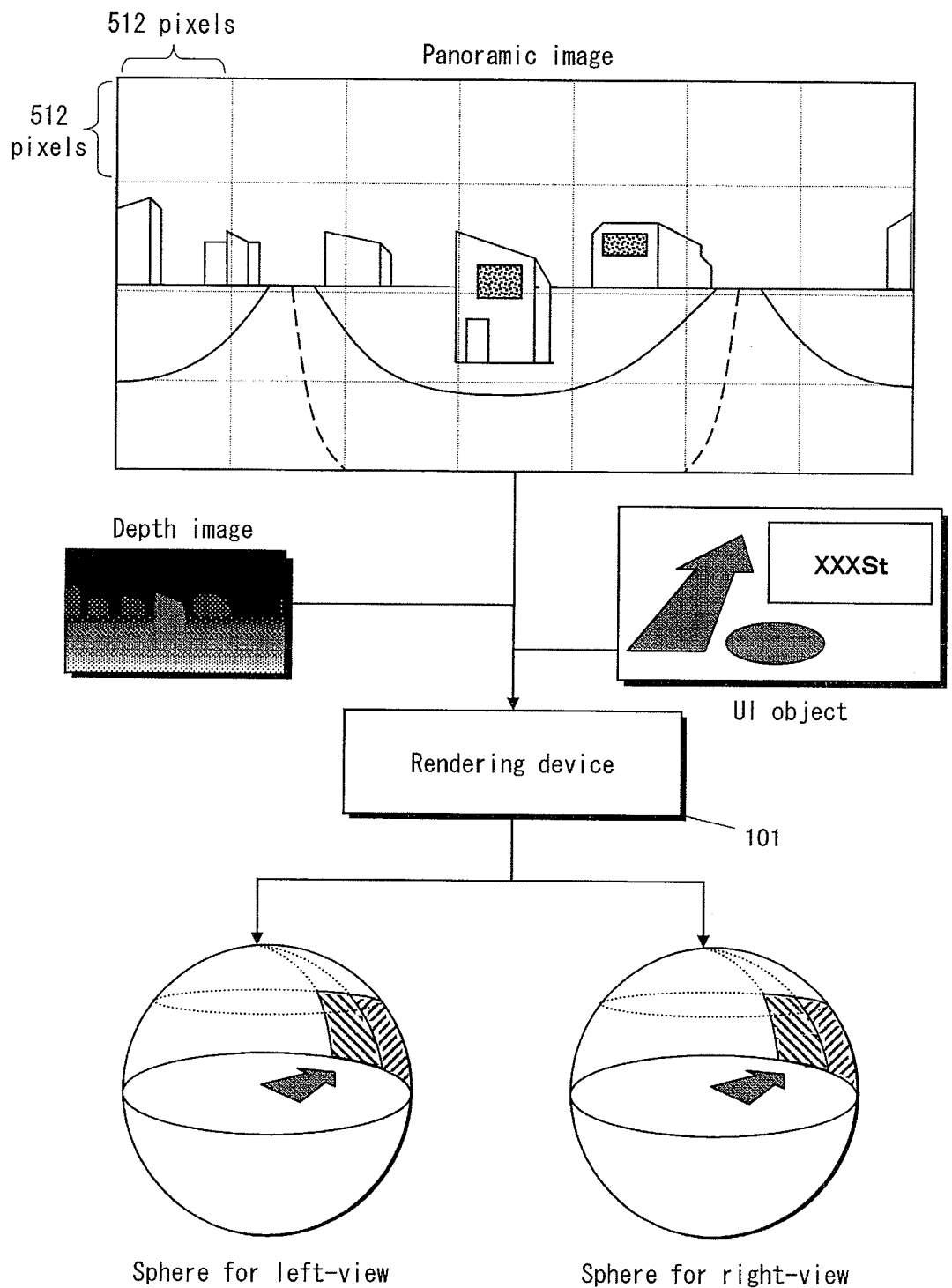
FIG. 11 illustrates one example of input and output of an image rendering device according to Embodiment 1.

Embodiment 1 is directed to an improvement on a technique of avoiding collision between a UI object, which is a GUI element, and an intra-texture object. FIG. 11 illustrates one example of input and output of an image rendering device according to Embodiment 1.

An image rendering device 101 receives, as input, a panoramic image, a depth image associated with the panoramic image, and a UI object and outputs a left-view image and a right-view image. The left- and right-view image that are output are rendered in synchronization on a screen in a stereoscopic compatible display 103 so that a viewer is made to perceive stereoscopic images. A panoramic image from one perspective is four partial images high by seven partial images wide that amount to a total of 28 partial images. One partial image is 512 pixels high by 512 pixels wide. A depth image indicates the depths of an object in three-dimensional space. In the depth image, a darker color indicates a depth to an object surface located further back in a 3D space, whereas a blighter color indicates a depth to an object surface located closer toward the front.

The image rendering device 101 uses a depth image to generate a right-view image and a left-view image from each partial image. That is, as many right-view images and left-view images as the input partial image are generated (28 right-view images and 28 left-view images). Each of the right- and left-view images thus generated are applied to a sphere in the three-dimensional modeling space, and a UI object is placed in the three-dimensional modeling space. A stereoscopic image of a full panoramic view is displayed on the screen by outputting, in synchronization, a left-view image and a right-view image each covering the region as viewed from the center of the sphere towards the surface of the corresponding sphere in the three-dimensional modeling space.

(Usage of Image Rendering Device)

Figure 12:
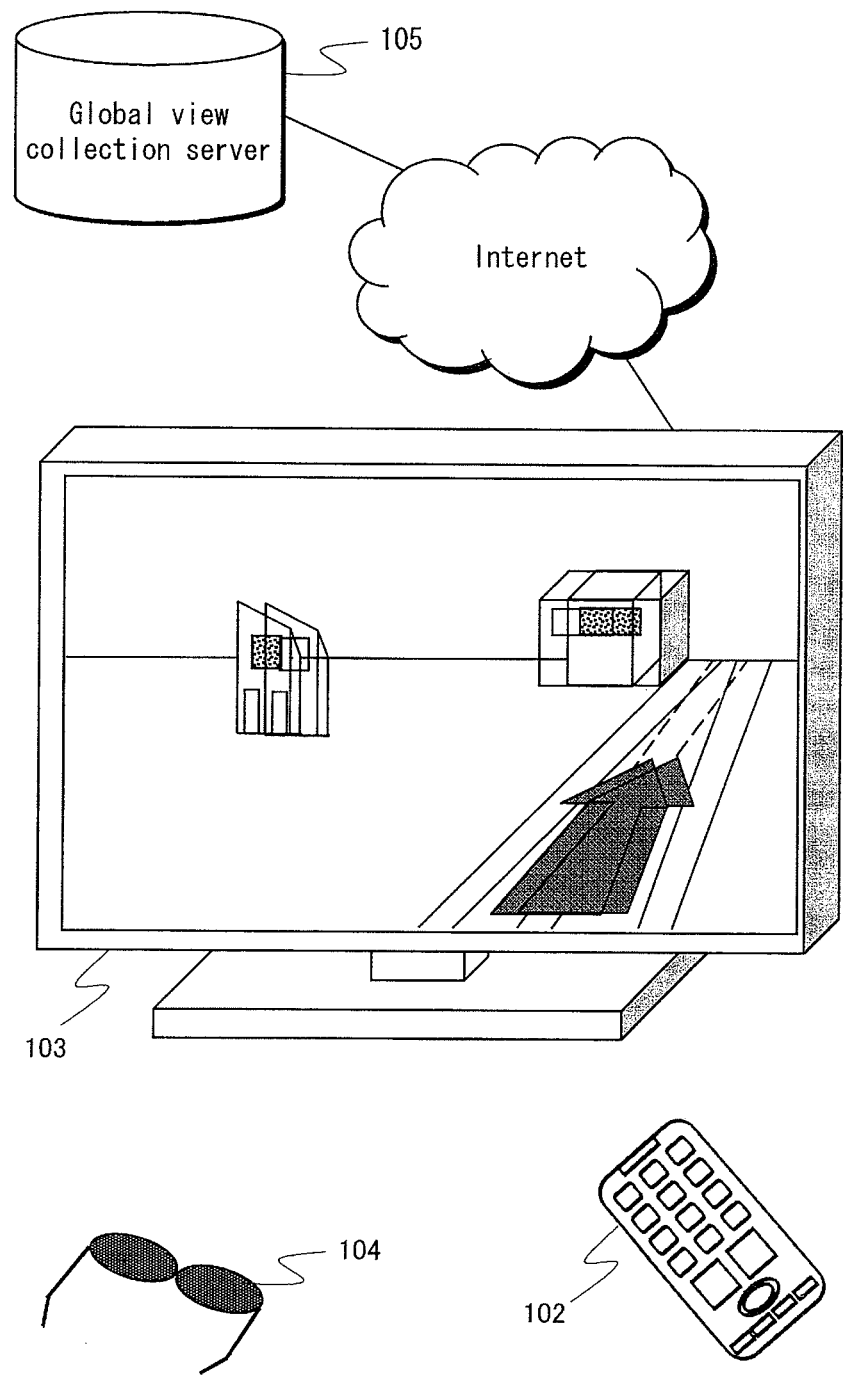
FIG. 12 illustrates an example of usage of the image rendering device.

FIG. 12 illustrates an example usage of the image rendering device. A user can perceive a stereoscopic panorama as seen from any location or angle by designating the desired location and angle using a remote control 102 and viewing the images output on a stereoscopic compatible display 103 through liquid crystal shutter glasses 104. The stereoscopic compatible display 103 is either connected to the image rendering device 101 or has the functions of the image rendering device 101 embedded therein. In the example of usage illustrated in FIG. 12, the stereoscopic compatible display 103 has the functions of the image rendering device 101 embedded therein, and the stereoscopic compatible display 103 is connected to a server 105 over the Internet. The stereoscopic compatible display 103 downloads a panoramic image and a depth image corresponding to the user designated location, generates a right-view image and a left-view image, and displays the right-view image and the left-view in synchronization on a screen.

Figure 13:
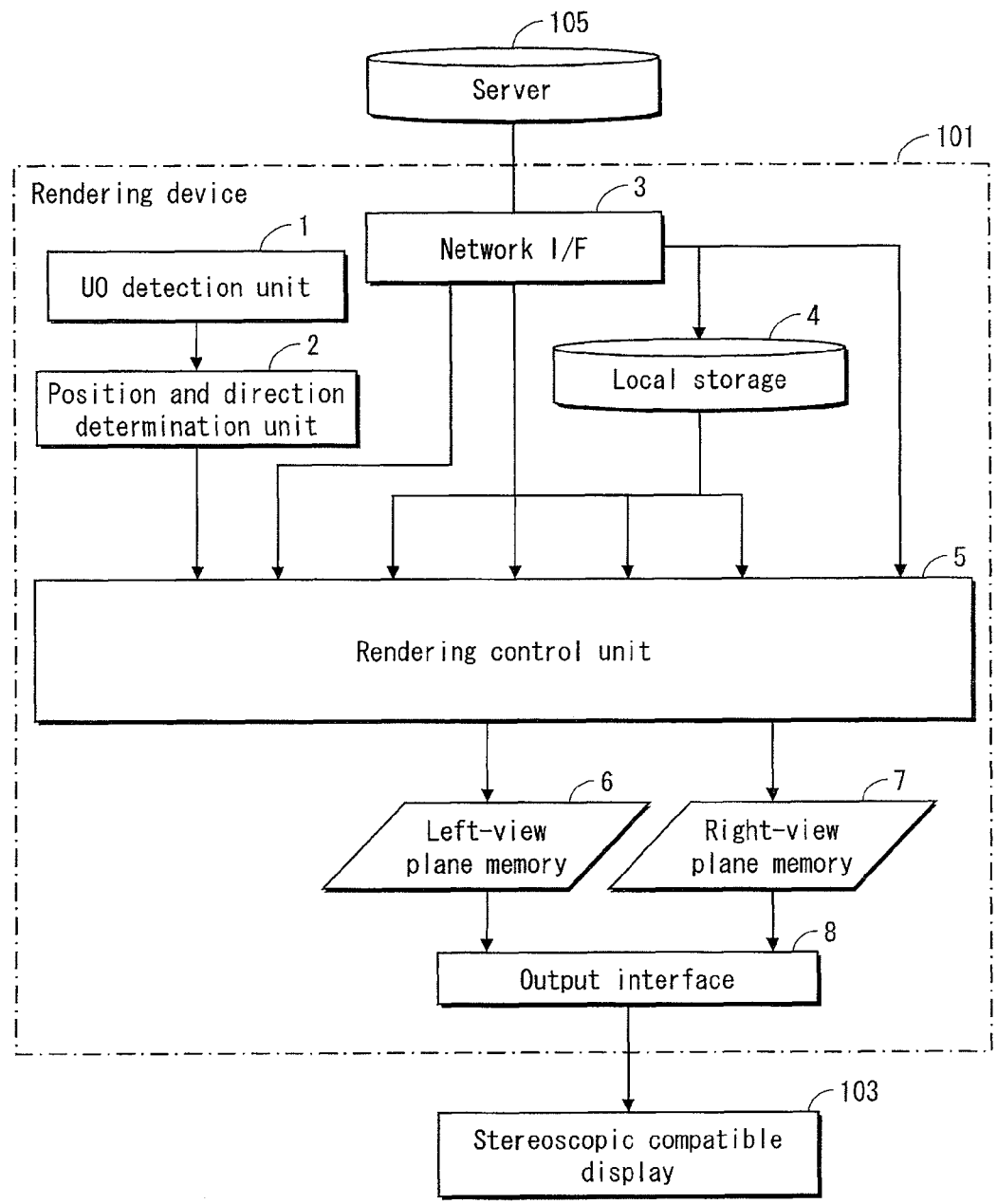
FIG. 13 is a block diagram of the internal configuration of the image rendering device according to Embodiment 1.

FIG. 13 is a block diagram illustrating the internal configuration of the image rendering device according to Embodiment 1. As illustrated in the figure, the image rendering device 101 includes a UO detection unit 1, a position and direction determination unit 2, a network interface 3, a local storage 4, a rendering control unit 5, a left-view plane memory 6, a right-view plane memory 7, and an output interface 8.

(UO Detection Unit 1)

The UO detection unit 1 detects user operation of the remote control, a keyboard, a mouse, or the like and transmits a corresponding key code (a code indicating the user operation such as pressing of an up, down, left or right arrow key, a right click, or the like) to the position and direction determination unit 2.

(Position and Direction Determination Unit 2)

The position and direction determination unit 2 determines, based on the operation code received from the user operation detection unit 1, which position on the map of the panoramic image and which view direction of the image are to be displayed. The position on the map is denoted as the current viewpoint and specified by geographic information that includes the latitude and longitude. In addition, the view direction is denoted as the current view direction and specified by a horizontal angle and a vertical angle. The horizontal angle is represented in a range from 0° to 360°, measured clockwise with north as 0°. The vertical angle is represented in a range from −90° to 90°, with the horizon as 0°, directly above as −90°, and directly below as 90°. The position and direction determination unit 2 specifies the latitude, longitude, horizontal angle, and vertical angle based on the received operation code and transmits the specified values to the rendering control unit 5.

(Network Interface 3)

The network interface 3 has a request sender and a response receiver. The request sender transmits an image acquisition request specifying a global location as the current viewpoint to the global view collection server 1001. Note that the request sender generates an image acquisition request at the time when a user operation on the map image is made and transmits the image acquisition request to the global view collection server 1001. When generating the image acquisition request specifying the current viewpoint, the request sender uses the geographic information corresponding to the user specified location. The response receiver receives a street view file transmitted from the global view collection server 1001 in response to the image acquisition request. The street view file transmitted from the global view collection server 1001 has location attributes matching the geographic information included in the image acquisition request.

The street view file thus downloaded contains a panoramic image and a depth image. The street view file is temporality stored in the local storage 4 of the image rendering device. When the panoramic image and the depth image need to be displayed immediately, the panoramic image downloaded to the memory of the device is passed to a panoramic image acquisition unit 11 without being stored into the local storage 4.

(Local Storage 4)

The local storage 4 is a recording medium attached to the image rendering device, such as a hard disk drive (HDD), USB memory, SD memory card, or the like. The local storage 4 is used to cache a street view file containing a panoramic image and a depth image that are downloaded from the server 105. The local storage 4 is also used, for example, when the image rendering device uses a street view file containing a panoramic image and a depth image that are generated by an external device other than the server.

(Rendering Control Unit 5)

Based on the position on the map indicated by the position and direction determination unit 2 and also on the panoramic image and depth image acquired from the network interface 3 or from the local storage 4, the rendering control unit 5: generates two panoramic images, one for right-view and the other for left-view, applied on a spherical surface in the three-dimensional modeling space; extracts images (viewport images) to be displayed as images viewed from the center of the sphere in the line-of-sight direction indicated by the position and direction determination unit 2; and outputs the left-view image to the left-view plane memory 6 and the right-view image to the right-view plane memory 7.

(Left-View Plane Memory 6)

The left-view plane memory 6 is for storing one frame of a viewport image to be presented to the left eye for realizing stereoscopic display.

(Right-View Plane Memory 7)

The right-view plane memory 7 is for storing one frame of a viewport image to be presented to the right eye for realizing stereoscopic display.

(Output Interface 8)

The output interface 8 outputs, in synchronization, images stored in the left-view plane memory 6 and the right-view plane memory 7 frame by frame to the stereoscopic compatible display 103. Specifically, images are read alternately from the left and right plane memories at 120 Hz, and left and right images are transmitted to the display at 60 frames per second. The user viewing the images wears the liquid crystal shutter glasses 104, which repeatedly open and close at 120 Hz. The user thus sees 60 frames per second of the left view in the left eye and 60 frames per second of the right view in the right eye, thereby perceiving depth due to the parallax between the left and right images.

Figure 14:
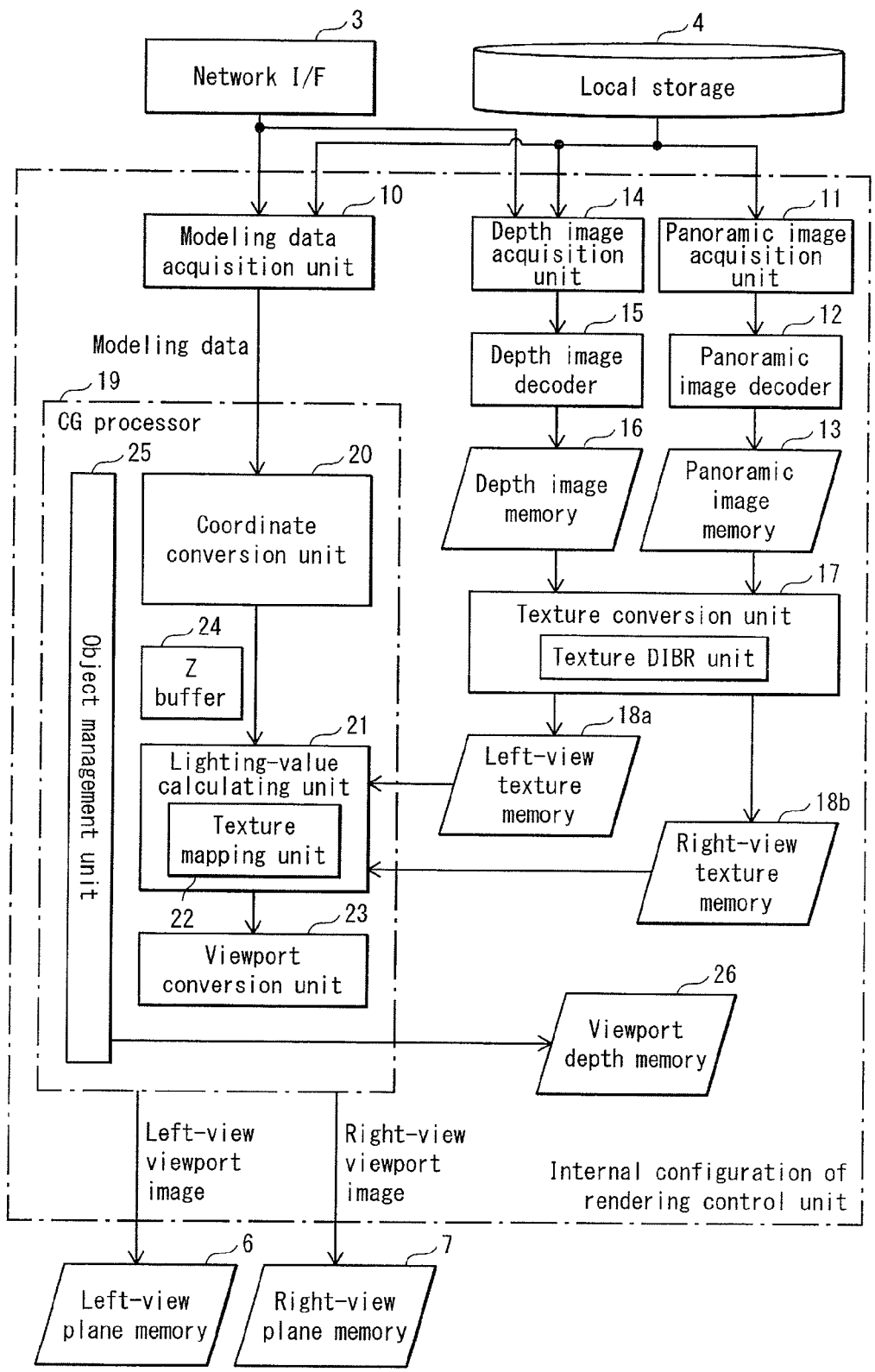
FIG. 14 illustrates the internal configuration of a rendering control unit 5.

This concludes the description of the image rendering device. Next, the details of the rendering control unit 5 are described. FIG. 14 illustrates the internal configuration of the rendering control unit 5. As shown in the figure, the rendering control unit 5 includes a modeling data acquisition unit 10, the panoramic image acquisition unit 11, a panoramic image decoder 12, a panoramic image memory 13, a depth image acquisition unit 14, a depth image decoder 15, a depth image memory 16, a texture conversion unit 17, a left-view texture memory 18a, a right-view texture memory 18b, a CG processor 19 (which in turn includes a coordinate conversion unit 20, a lighting-value calculating unit 21, a texture mapping unit 22, and a viewport conversion unit 23), an object management unit 25, and a viewport depth memory 26.

(Modeling Data Acquisition Unit 10)

The modeling data acquisition unit 10 acquires information about UI objects related to the specified panoramic image from the network I/F or from the local storage. A UI object (user interface objet) is an element of GUI and to be displayed as a foreground image. The data format of a UI object is the same as the data format of the modeling data for 3D computer graphics.

(Panoramic Image Acquisition Unit 11)

Figure 15A:
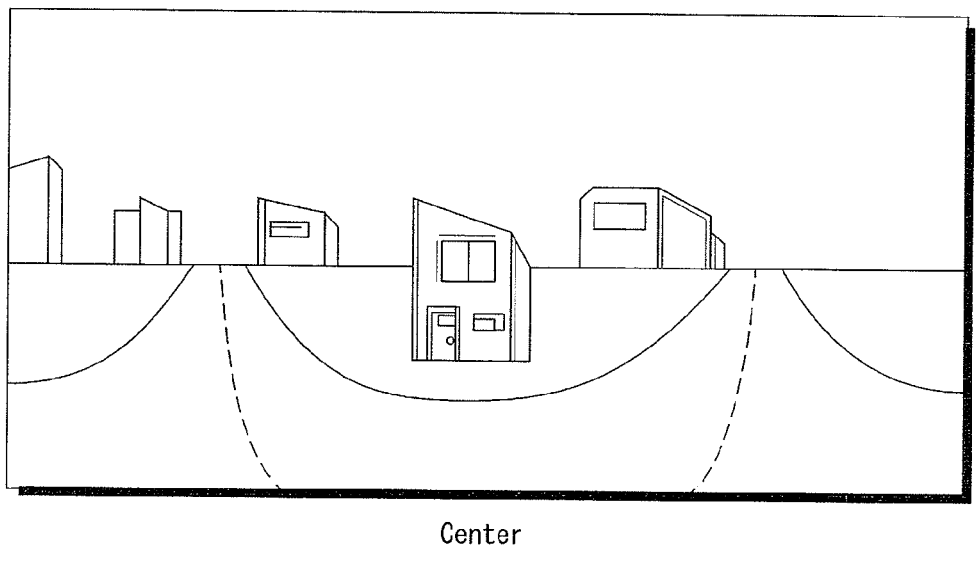
FIG. 15A illustrates an example panoramic image.

The panoramic image acquisition unit 11 acquires, either by downloading from the server 105 over the network interface 3 or from the local storage 4, the panoramic image corresponding to the position (specified as a latitude and a longitude) on the map indicated by the position and direction determination unit 2. A panoramic image from one viewpoint is constructed of four partial images high by seven partial images wide, for a total of 28 partial images, and each partial image is 512 pixels high by 512 pixels wide. FIG. 15A illustrates an example panoramic image.

(Panoramic Image Decoder 12)

The panoramic image decoder 12 is a JPEG decoder for developing a compressed Mercator image and storing resulting uncompressed data to the panoramic image memory 19.

(Panoramic Image Memory 13)

The panoramic image memory 13 stores a Mercator image developed by the panoramic image decoder 12.

(Depth Image Acquisition Unit 14)

Figure 15B:
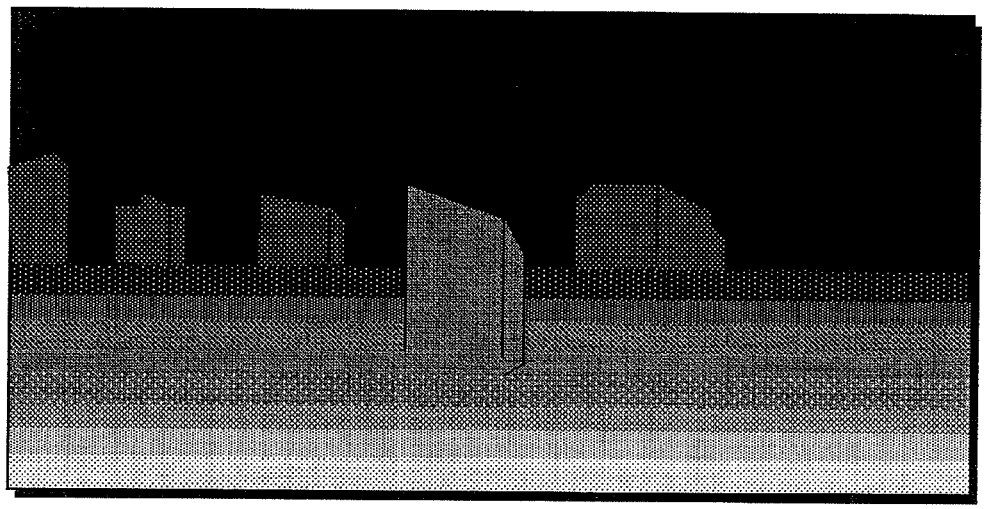
FIG. 15B illustrates an example depth image generated for the panoramic image.

The depth image acquisition unit 14 acquires, either by downloading from the server 105 over the network interface 3 or from the local storage 4, a depth image associated with the panoramic image acquired by the panoramic image acquisition unit 11. The depth image shows the depth of each pixel in three-dimensional space, representing the depth of each pixel by an eight-bit intensity value. A luminance of zero (black) indicates that the corresponding pixel is farthest away, and a luminance of 255 (white) indicates that the corresponding pixel is closest. That is, while a panoramic image appears as a color image, a depth image is recognized as a grayscale image expressed only in terms of luminance. FIG. 15A illustrates an example panoramic image, and FIG. 15B illustrates an example depth image generated for the panoramic image. Similarly to a panoramic image, a grayscale image being a depth image for one location is constructed of a total of 28 partial images (i.e., 4 partial images in the vertical direction and 7 partial images in the row direction) and each partial image is 512 pixels high by 512 pixels wide (where each pixel only holds a 8-bit intensity value).

(Depth Image Decoder 15)

The depth image decoder 15 is a PNG decoder for developing the compressed Mercator depth contained in a street view file and stores the resulting data to the depth image memory 16.

(Depth Image Memory 16)

The depth image memory 16 is a memory for storing Mercator depth generated by the depth image decoder 15.

(Texture Conversion Unit 17)

The texture conversion unit 17 includes a texture DIBR unit and performs depth image based rendering (DIBR), using the depth image acquired by the depth image acquisition unit 14 as the base. As a result, a left-view texture and a right-view texture are generated. More specifically, the texture DIBR horizontally shifts the individual pixels of the panoramic image acquired by the panoramic image acquisition unit 11, so that the left-view texture and the right-view texture are obtained. In the present embodiment, a description is given based on the assumption that the base image acquired by the panoramic image acquisition unit 11 is for left view and the viewpoint image generated based on the depth information is for right view. However, the structure and the advantageous effects of the image rendering device remain the same, even if the base image acquired by the panoramic image acquisition unit 11 is for right view, and the viewpoint image generated based on the depth information is for left view.

The following describes the parallax settings to be made for each pixel through depth image based rendering. Suppose that the depth from the viewpoint to a pixel located at the coordinates (x, y) in a depth image is denoted as Depth(x, y), then the conversion from the intensity Y(x, y) to Depth(x, y) of the pixel is made by the following formula, for example.

(Equation)

$$Y(x,y) = 255 - (\log(\text{Depth}(x,y)+1) \times 100)$$

The thus obtained Depth(x, y) is then converted into the number of pixels denoted as offset(x, y) correspondingly to the screen size of a display, which enables the intensity values of pixels to be converted to appropriate parallax values.

Figure 16:
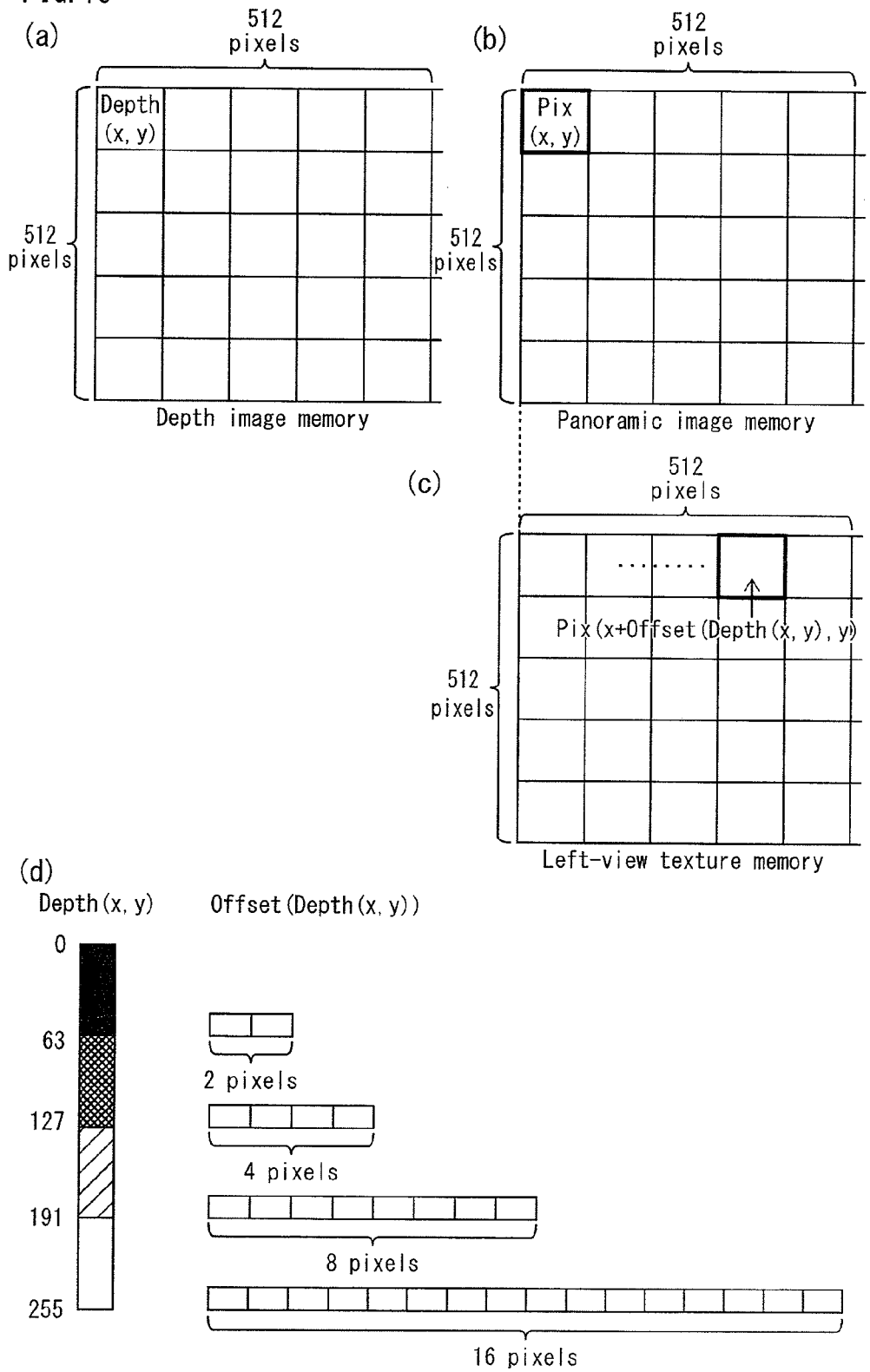
FIG. 16 illustrates a pixel Pix(x, y) located at the coordinates (x, y) in an image, and a pixel depth(x, y) located at the coordinates (x, y) in an associated depth image.

In depth image based rendering, a viewpoint image as seen from another viewpoint is obtained by shifting each pixel of the target image by an appropriate shift amount in the following manner. That is, to shift a pixel located at given coordinates (x, y), an offset(Depth(x, y), y) is calculated uniquely for the coordinates (x, y) from the Depth(x, y) derived from the intensity Y(x, y) of the pixel located, in the associated depth image, at the coordinates (x, y). The thus derived offset (Depth(x, y), y) is used as the shift amount. FIG. 16(*a*) illustrates the depth Depth(x, y) of the pixel located at the coordinates (x, y) in the depth image. Note that Depth(x, y) corresponds in position to Pix(x, y) illustrated in FIG. 16(*b*). FIG. 16(*b*) illustrates a pixel Pix(x, y) located at the coordinates (x, y) in the image memory. FIG. 16(*c*) illustrates the amount of shift made to the pixel Pix(x, y) for generating a left-view texture. In FIG. 16(*c*), Pix(x, y) is shifted horizontally in the panoramic image memory 13 by the amount shown by Offset (Depth(x, y)). Therefore, the pixel Pix after the shift is located at the confidantes (x+Offset (Depth(x, y)), y). Offset(Depth(x, y) denotes an offset that is unique to a pixel at the coordinates x, y in a panoramic image and is set according to Depth(x, y) derived from the intensity value of a corresponding pixel in the depth image.

To prepare images as seen from two or more different viewpoints, the amount of horizontal shift to be made to generate an image as seen from a viewpoint differs for each pixel in the image. The relation between the intensity level of a pixel in a depth image and the number of pixels serving as a corresponding shift amount is given by the equation listed above. In one example of the relation, the settings illustrated in FIG. 16(*c*) are possible.

FIG. 16(*c*) illustrates the intensity levels of a pixel Y(x, y) ranging from 0 to 255, each along with a corresponding offset indicated by the number of pixels ranging from 1 to 16. In the figure, the offset range from 0 to 2 pixels is assigned to the intensity range from 0 to 63, the offset range from 3 to 4 pixels is assigned to the intensity range from 64 to 127, the offset range from 5 to 8 pixels is assigned to the intensity range from 128 to 191, and the offset range from 9 to 16 pixels is assigned to the intensity range from 192 to 255. That is, non-linear correspondence is established such that the intensity range corresponding to brighter pixels are assigned with a larger parallax, and the indentify level range corresponding to darker pixels are assigned with a smaller parallax.

Figure 17:
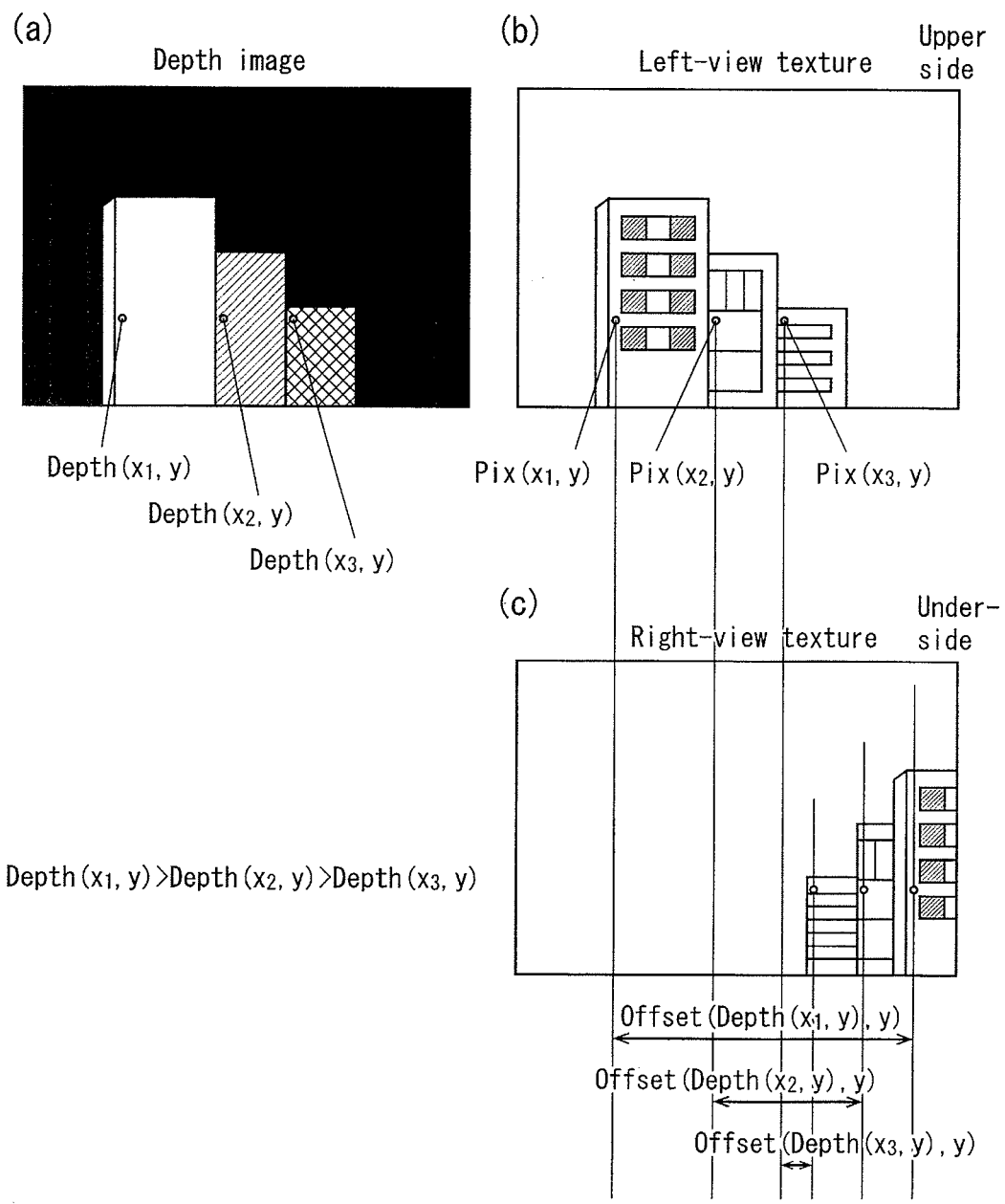
FIG. 17 illustrates the parallax provided between the left-view texture and the right-view texture as a result of pixel shifting.

FIG. 17 illustrates the parallax provided between the left-view texture and the right-view texture as a result of pixel shifting. FIG. 17(*a*) illustrates a depth image, FIG. 17(*b*) illustrates the stored content of the left-view texture memory, and FIG. 17(*c*) illustrates the stored content of the right-vie texture memory.

In FIG. 17(*b*), Pix(x1, y) is a pixel that belongs to the building appearing closest toward the front out of the three buildings in the image. Pix(x2, y) is a pixel that belongings to the second building, out of the three buildings. Pix(x3, y) is a pixel that belongings to the third building, out of the three buildings.

FIG. 17(*a*) is an example of a depth image and illustrates the depths to respective pixels Pix(x1, y), Pix(x2, y), and Pix(x3, y) in the left-view texture. Depth(x1, y) indicates the depth to Pix(x1, y) in the left-view texture. Depth(x2, y) indicates the depth to Pix(x2, y) in the left-view texture. Depth(x3, y) indicates the depth to Pix(x3, y) in the left-view texture.

At the bottom, FIG. 17(*c*) illustrates the offset given to each pixel in DIBR. Specifically, Offset(Depth(x1, y), y) indicates the offset given to Pix(x1, y) in the left-view texture. Similarly, Offset(Depth(x2, y), y) indicates the offset given to Pix(x2, y) in the left-view texture, and Offset(Depth(x3, y), y) indicates the offset given to Pix(x3, y) in the left-view texture.

As shown in the figure, the relation Depth(x1, y)>Depth(x2, y)>Depth(x3, y) is true, so that pixels of the building closest toward the front are given the largest parallax. As a result, the building appears to largely pop out of the screen. This concludes the description of the texture conversion unit 17.

(Left-View Texture Memory 18*a* and Right-View Texture Memory 18*b*)

The pair of texture memories, namely, the right-view texture memory 18*a* and the left-view texture memory 18*b*, respectively store the left-view texture and the right-view texture obtained through DIBR performed by the texture conversion unit 17.

Figure 18D:
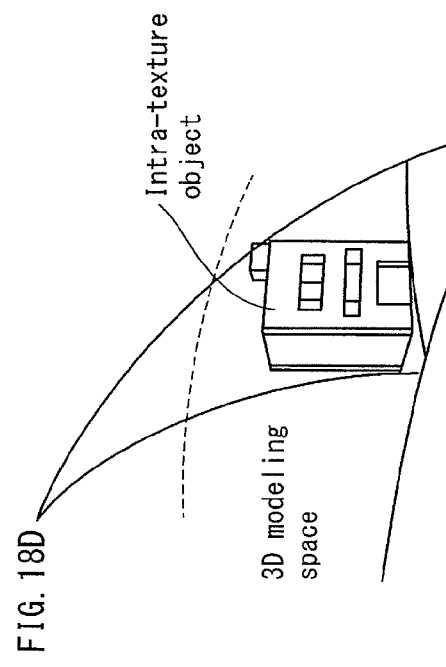
FIGS. 18A, 18B, 18C, 18D, and 18E illustrate, in contrast, (i) three-dimensional modeling space in which spherical models each having a left-view texture or a right-view texture applied thereto exists and (ii) a depth space.
Figure 18E:
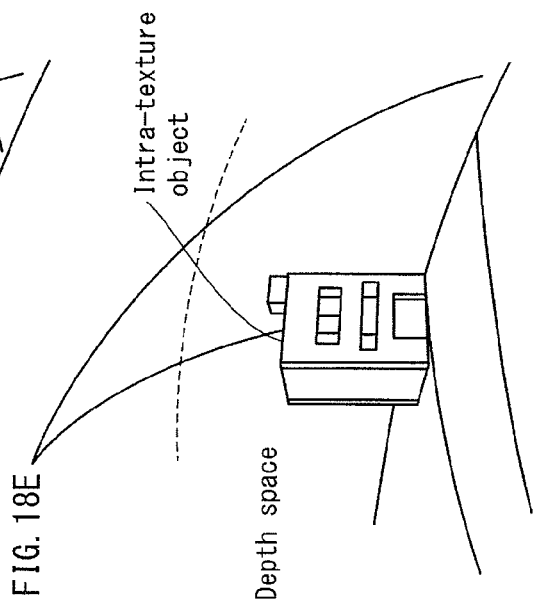
Figure 18C:
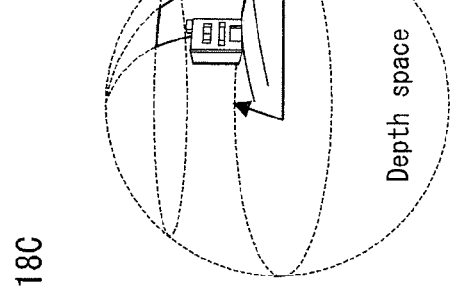
Figure 18A:
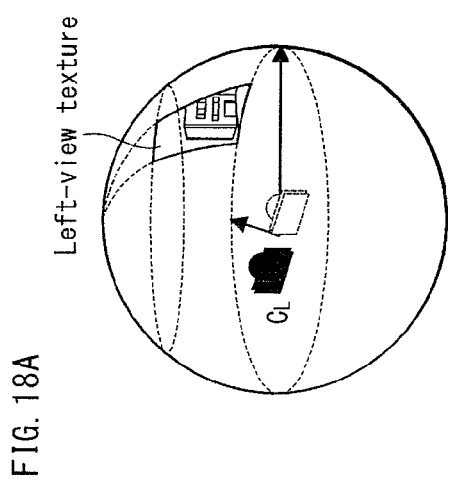
Figure 18B:
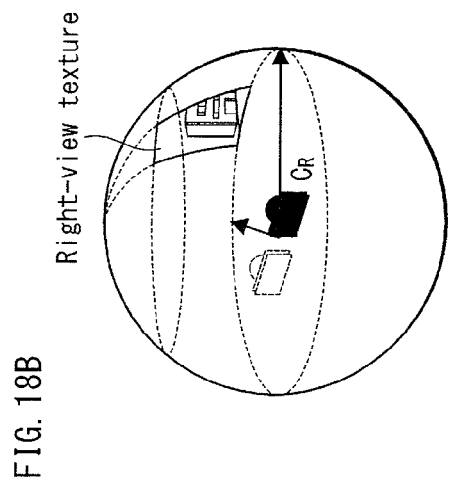

FIGS. 18A, 18B, 18C, 18D, and 18E illustrate, in contrast, (i) three-dimensional modeling space in which spherical models, one mapped with a left-view texture and another with a right-view texture exist and (ii) depth space. FIG. 18A illustrates the three-dimensional modeling space in which the spherical model mapped with the left-view texture exists. FIG. 18B illustrates the three-dimensional modeling space in which the spherical model mapped with the right-view texture exists. FIG. 18C illustrates the depth space. Depth space refers to space obtained by adding the depths of an intra-texture object to the three-dimensional modeling space. That is, in the three-dimensional modeling space, an intra-texture object exists as a planar object on the surface of a spherical model. In the depth space, on the other hand, the intra-texture object pops out of the surface of the spherical model and thus coexists with the UI object. FIGS. 18D and 18E show the difference between the object in the three-dimensional modeling space and in the depth space. In FIG. 18D, the building, which is the intra-texture object, exists merely as a surface pattern on the spherical model. In FIG. 18E, however, the building, which is the intra-texture object, appears a three-dimensional object projecting out of the spherical model.

(CG Processor 19)

The CG processor 19 allocates the three-dimensional coordinates describing modeling data to their corresponding coordinates in the three-dimensional modeling space and projects the three-dimensional coordinates in the three-dimensional modeling space onto a viewport. The processing by the CG processor 19 involves coordinate conversion, lighting value calculation (texture mapping process), and viewport processing.

(Coordinate Conversion Unit 20)

The coordinate conversion unit 20 specifies the camera direction and zoom level for determining a screen for projecting three-dimensional objects as seen from the viewpoint which is where the camera is located. Thereafter, coordinate conversion is performed to convert the three-dimensional coordinates describing the modeling data of the UI object or the spherical model to world coordinates in the three-dimensional modeling space. The coordinate conversion is to convert the three-dimensional coordinates describing the modeling data into the coordinates in the world coordinate system as seen from the camera and having its origin at the camera position in the three-dimensional modeling space.

(Lighting-Value Calculating Unit 21)

The lighting-value calculating unit 21 calculates lighting values at each vertex of a three-dimensional object as a result of ray casting from a light source position set in the three-dimensional modeling space.

(Texture Mapping Unit 22)

The texture mapping unit 22 prepares two spheres, one for the left-view and the other for the right-view, in the three-dimensional modeling space and applies the left-view texture and right-view texture generated by converting a background image onto the inner surface of the respective spherical models.

(Viewport Conversion Unit 23)

The viewport conversion unit 23 performs coordinate conversion according to display information that includes information about the display resolutions and so on, so that the coordinates describing vertex positions in the three-dimensional modeling space are converted into two-dimensional screen coordinates. In this way, the viewport conversion unit 23 extracts viewport images. The images extracted include a left-view viewport image and a right-view viewport image. The viewport conversion unit outputs the extracted images to a corresponding one of the left-view plane memory 6 and the right-view plane memory 7. An instruction given by the position and direction determination unit 2 to the rendering control unit 5 may be for changing the current line-of-sight direction without changing the current viewpoint. In that case, the texture mapping unit skips the texture mapping process, whereas the viewport conversion unit operates to re-do the process of extracting viewport images in order to reflect the change in the line-of-sight direction and outputting the results to the plane memories. The following describes the extraction of a viewport image by the viewport conversion unit 23.

Figure 19A:
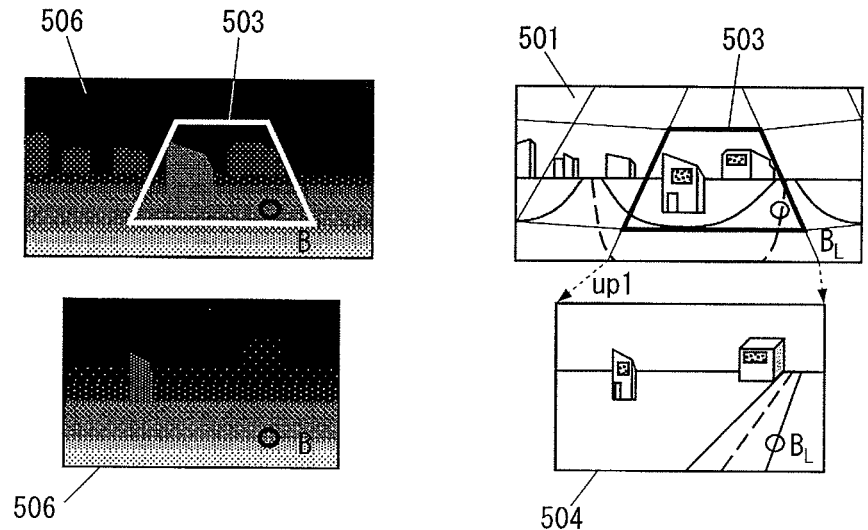
FIGS. 19A, 19B, and 19C illustrate viewport depth, a left-view viewport image, and a right-view viewport image.
Figure 19B:
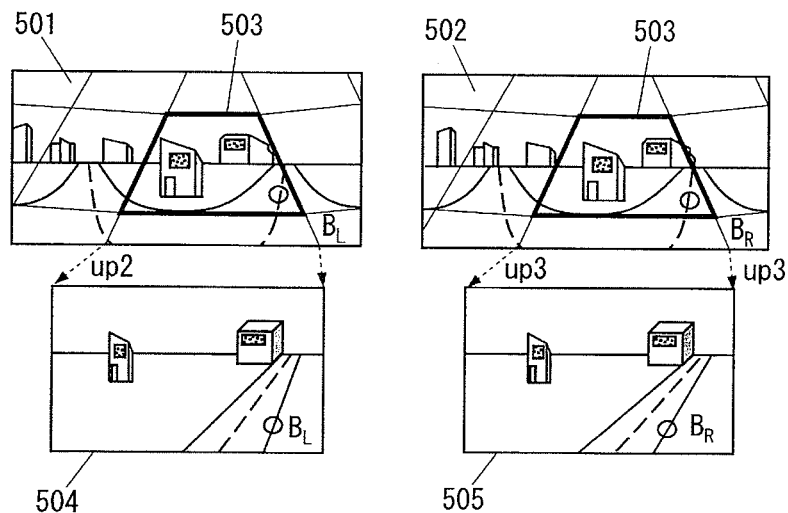
Figure 19C:
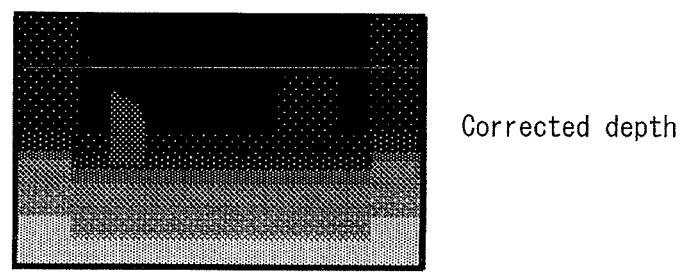

The following describes a left-view viewport image and a right-view viewport image obtained from the image shown in FIG. 15A. FIGS. 19A, 19B, and 19C illustrate viewport depth and a left-view viewport image. In the figures, the left-view panoramic image 501 is the same image as that shown in FIG. 15A, and the depth image 506 is the same as that shown in FIG. 15B. In the viewport image extraction by the viewport conversion unit 23, a portion of the left-view panoramic image 501 and a portion of the depth image 506 each corresponding to an extraction region 503 are extracted. As a result, the viewport depth 506 and the left-view depth image 504 are obtained.

FIG. 19B illustrates an example of the left-view viewport image 504 and the right-view viewport image 505. The viewport images 504 and 505 are obtained by extracting a portion corresponding to the extraction region 503 from each of the left-view panoramic image 501 and the right-view panoramic image 502 applied as textures onto the respective spherical models. In the viewport conversion by the viewport conversion unit 23, a projected image of the UI object is composited with each of the left-view viewport image and the right-view viewport. This concludes the description of the UI object projection by the viewport conversion unit 23.

(Z Buffer 24)

A Z buffer (depth buffer) 24 stores the three-dimensional coordinates obtained by the conversion.

(Object Management Unit 25)

The object management unit 25 manages UI objects which are subjected to the processing by the coordinate conversion unit 20, the texture mapping unit 21, and the viewport conversion unit 23.

(Viewport Depth Memory 26)

The viewport depth memory 26 stores viewport depth generated by a depth relationship determination unit 36. FIG. 19C is an example of viewport depth generated based on the parallaxes calculated for the UI object and for the intra-texture object. The parallax occurring for the panoramic image when it is applied as a texture onto the spherical models is normalized as an 8-bit depth value ranging from 0-255.

This concludes the description of the viewport depth memory 26.

Figure 20:
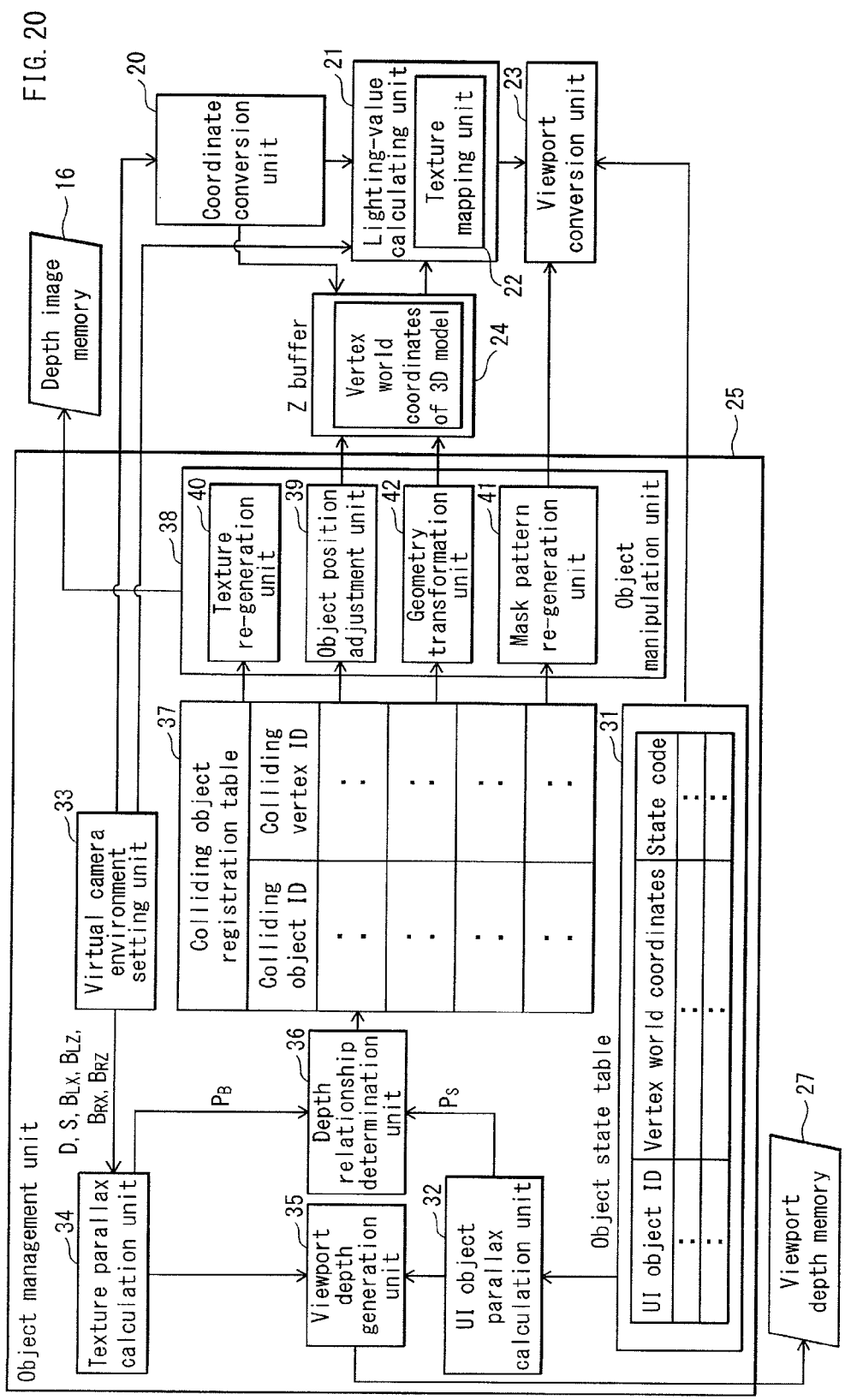
FIG. 20 illustrates the internal configuration of an object management unit 25.

This concludes the description of the internal configuration of the image rendering device. Among the components of the illustrated internal configuration, the object management unit 25 is a component specifically created for solving the technical problem of the present invention. The other components are components commonly used for providing the functionality of an existing device. The following describes the internal configuration of the object management unit 25. FIG. 20 illustrates the internal configuration of the object management unit 25. As shown in the figure, the object management unit 25 includes an object state table 31, a UI object parallax calculation unit 32, a virtual camera environment setting unit 33, a texture parallax calculation unit 34, a viewport depth generation unit 35, the depth relationship determination unit 36, a colliding object registration table 37, an object manipulation unit 38, an object position adjustment unit 39, a texture re-generation unit 40, a mask pattern re-generation unit 39, and a geometry transformation unit 42.

<Object State Table 31>

The object state table 31 shows the state of each UI object, by showing the ID, the world coordinates of vertices, and the state code of the UI object. The state code specifies the state of the UI object, such as whether the UI object is active or inactive.

<UI Object Parallax Calculation Unit 32>

The UI object parallax calculation unit 32 calculates, for each UI object managed in the object state table, the amount of parallax of each vertex of the UI object. Once the amount of parallax is calculated for each vertex of the UI object, the amount of parallax between an image of the UI object projected on the left-view viewport and an image of the UI object projected on the right-view viewport is calculated for each pixel. In this way, the amount of parallax is calculated for every pixel of the projected image of the UI object. Since the principle of the parallax calculation by the UI object parallax calculation unit 32 is of great importance, a more detailed description is given with reference to FIGS. 21-23.

Figure 21A:
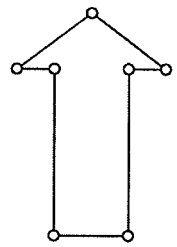
FIGS. 21A and 21B illustrate a projected image of a UI object on a viewport.
Figure 21B:
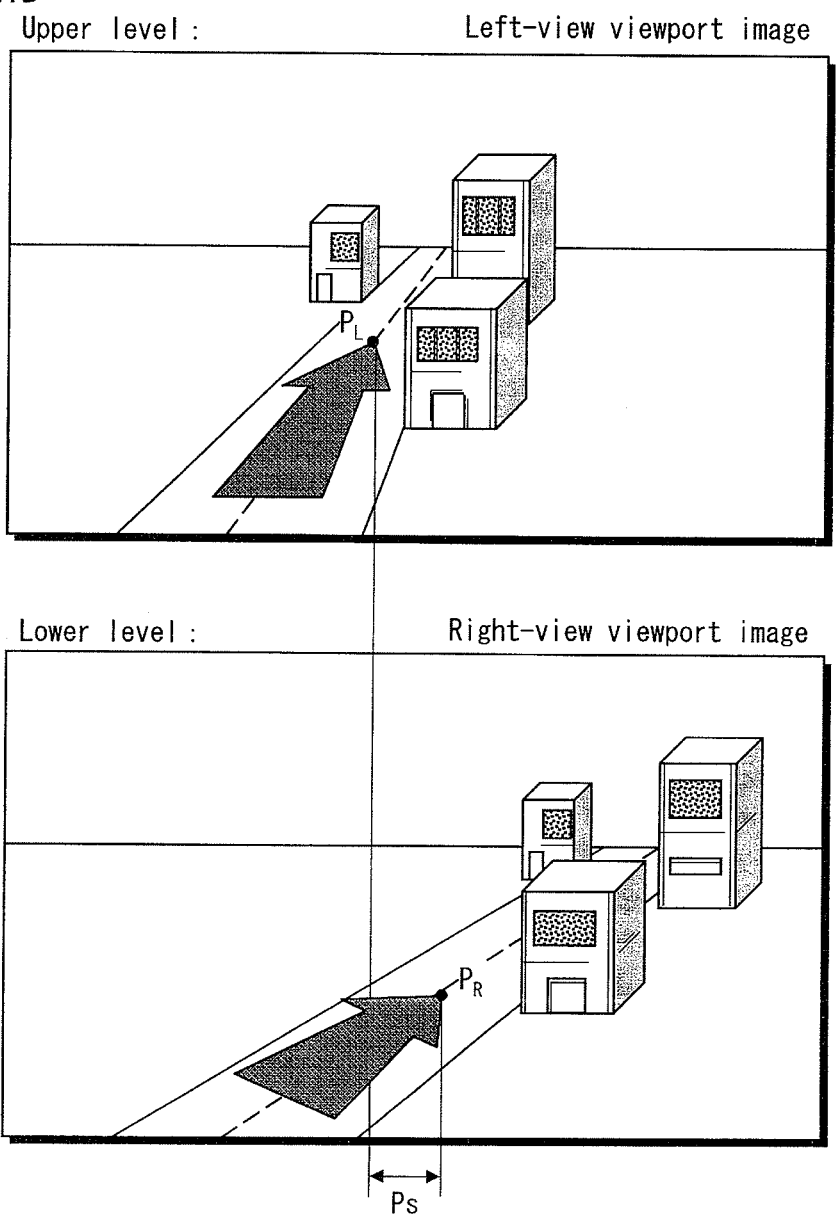

FIG. 21A illustrates an example modeling data constituting a UI object. The modeling data represents the geometry of a UI object with the coordinates describing each vertex of the UI object. FIG. 21B illustrates projected images of the UI object, one on the left-view viewport and one on the right-view viewport. The upper level of FIG. 21B illustrates the UI object written on the left-view viewport. On the left-view viewport, a street view is drawn as seen from the angle matching the view vector of the left-view camera. Therefore, the UI object is deformed to the shape matching the view vector of the left-view camera.

The lower level of FIG. 21B illustrates the UI object written on the right-view viewport. On the right-view viewport, a street view is drawn as seen from the angle matching the view vector of the right-view camera. Therefore, the UI object is deformed to the shape matching the view vector of the right-view camera. The UI object has the shape of an arrow and the tip of the arrow is located at the coordinate PL on the left-view viewport. On the right-view viewport, the tip of the arrow is located at the coordinate PR. The two points located at the coordinates PR and PL determines the parallax Ps.

Figure 22A:
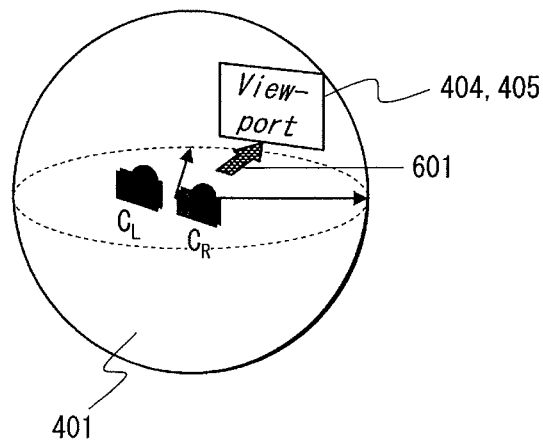
FIGS. 22A, 22B, and 22C are oblique views of three-dimensional modeling space.
Figure 22B:
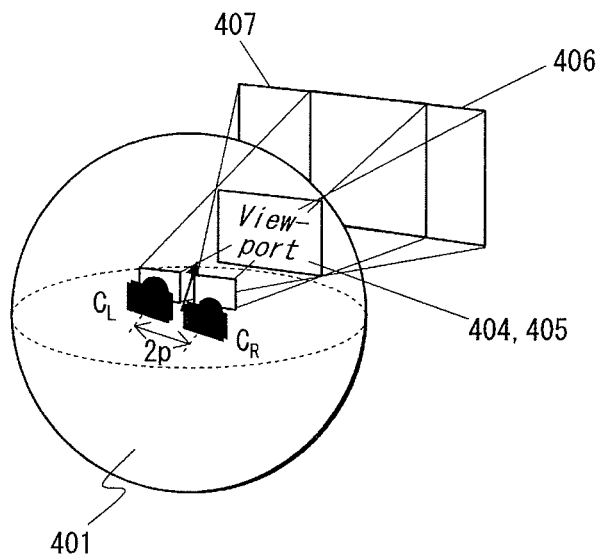
Figure 22C:
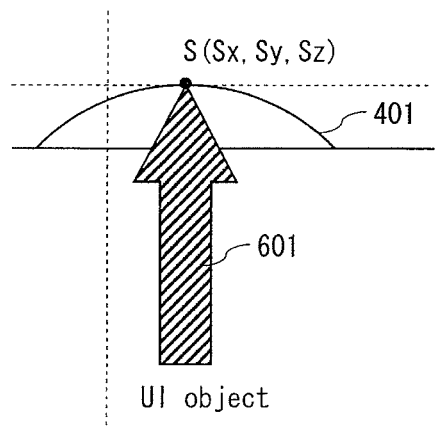

FIG. 22A is an oblique view of the three-dimensional modeling space in which the left-view camera CL, the right-view camera CR, the left-view viewport 404, and the right-view viewport 405 are set. FIG. 22B illustrates a left-view projection region 406 and a right-view projection region 407 set in the three-dimensional modeling space illustrated in FIG. 22A. FIG. 22C illustrates the coordinates of a point at which the tip of the UI object is located. It is assumed that the tip of the UI object is to be located at the point S specified by the three-dimensional space coordinates (Sx, Sy, Sz) on the spherical surface 401.

FIG. 23A illustrates the layout of the camera CL and CR in the X-Z coordinate system of the three-dimensional modeling space. The camera CL is located at the point away from the camera CR by the base distance of 2p. The paths vu1 and vu2 indicated by the broken lines starting from the point S on the spherical surface reach the camera CL and the camera CR, respectively. The left-view projection region 406 is viewable from the camera CL, whereas the right-view projection region 407 is viewable from the camera CR. A display 408 is a common projection screen for the left view and the right view. The left-view camera CL and the right-view camera CR are both have the common view vector e(0,0,1).

FIG. 23B illustrates points SL and SR which are the projected images of the point S on the left-view viewport and the right-view viewport, respectively. FIG. 23C illustrates a triangle which has geometric similarity with what is illustrated in FIG. 24(b). The similarity relation found in FIG. 23(b) is between the triangle having vertices S, SL, and SR and the triangle having vertices S, CL, and CR.

Based on this similarity relation, the following equation is true.

$$2p:Sz=Ps:(Sz-D)$$

By modifying the above equation for Ps, the following equation is obtained.

$$PS=2p*(Sz-D)/Sz \qquad \text{Equation (1)}$$

As the parallax P increases in the positive direction, depth increases, whereas an increasingly negative value of the parallax indicates a position further forward. To judge the depth relationship between a GUI and a building appearing in a background image, a comparison needs to be made between the parallax PS for the GUI described above and the parallax PB occurring at a point B on the panoramic image. This concludes the description of the UI object parallax calculation unit 32.

<Virtual Camera Environment Setting Unit 33>

The virtual camera environment setting unit 33 stores information regarding the camera, viewport, and spherical model in the three-dimensional modeling space. The information stored in the virtual camera environment setting unit 33 is used for the coordinate conversion by the coordinate conversion unit 20 and the lighting value calculation by the lighting-value calculating unit 21. The virtual camera environment setting unit 33 also stores the three-dimensional coordinates of the grid on the spherical model for texture mapping.

<Texture Conversion Unit 34>

The texture parallax calculation unit 34 calculates the parallax between the left-view texture and the right-view texture on a pixel-by-pixel basis, according to the three-dimensional coordinates of each spherical model surface, the base distance between the cameras, and the depth position of each spherical model. Since the principle of the parallax calculation by the UI object parallax calculation unit 32 is especially important, a more detailed description is given with reference to a series of FIGS. 24-26.

The point B on the panoramic image is inside the projection region and the parallax PB occurs between the left-view background image and the right-view background image to be output. FIG. 24(a) illustrates the relationship between the left-view camera, viewport, and projection region in the three-dimensional modeling space. The camera CL is located at the position that is offset from the origin by the distance −p along the x axis. The point at the coordinates BL on the spherical surface 401 is offset from the camera CL by the distance BLz along the Z axis and by the distance BLx along the X axis. The viewport is located at the position that is offset from the camera CL by the distance D. The leader line yj5 indicates that the projection region 406 in the spherical model is shown in close-up. The projection region illustrated in FIG. 24(a) includes the panoramic image 501 illustrated in FIG. 19A. Of this panoramic image, the region in which the grid 503 of the spherical model is set is subjected to display. The leader line yj6 indicates that what is encompassed in the viewport is shown in close-up. In the viewport illustrated in FIG. 24(a), the viewport image 504 illustrated in FIG. 19A is included.

Figure 25A:
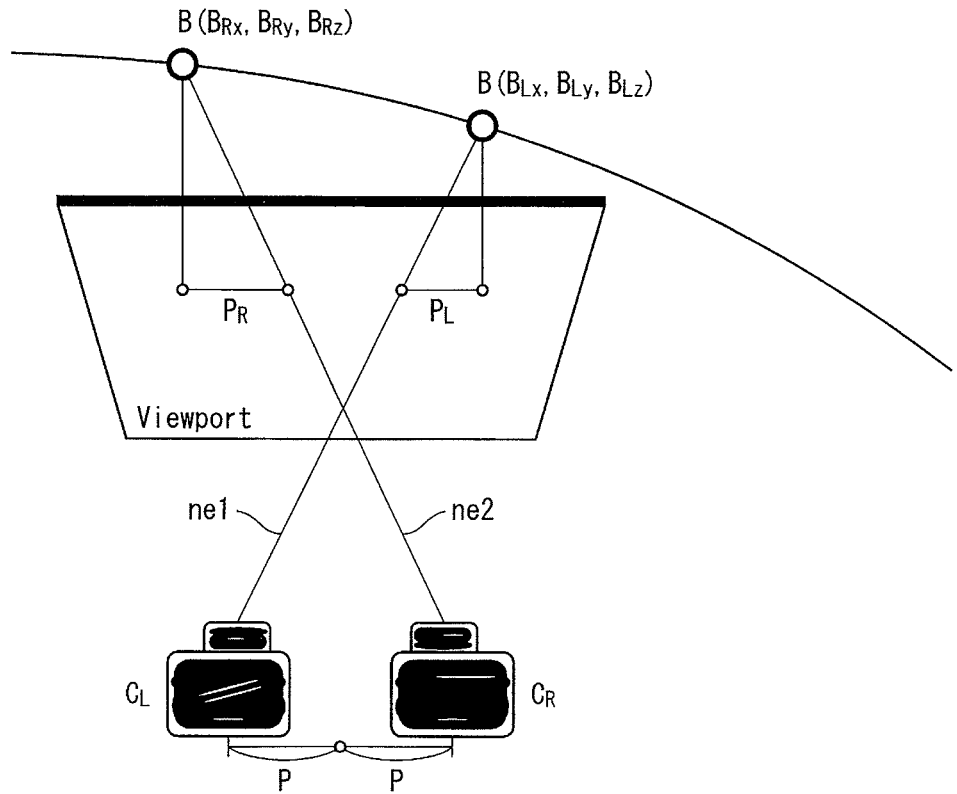
FIGS. 25A and 25B illustrate the relationship between a viewport and the left-view camera CL, the right-view camera CR in three-dimensional modeling space.

FIG. 24(b) illustrates the relation between the right-view camera, viewport, and projection region in the three-dimensional modeling space. The camera CR is located at the position that is offset from the origin by the distance p along the x axis. The point at the coordinates BR on the spherical surface 401 is offset from the camera CL by the distance BRz along the Z axis and by the distance BRx along the X axis. The viewport is located at the position that is offset from the camera CR by the distance D. The leader line yj7 indicates that what is encompassed in the projection region 407 is shown in close-up. In the projection region shown in FIG. 24(b), the panoramic image 502 illustrated in FIG. 19B is included. Of this panoramic image, the region in which the grid 503 of the spherical model is set is subjected to display. The leader line yj8 indicates that what is encompassed in the viewport image is shown in close-up. The viewport illustrated in FIG. 24(b) includes the viewport image 505 illustrated in FIG. 19B. FIG. 25A illustrates how the pixel B, which is one of the pixels constituting an intra-texture object, appears on the viewport. Here, the coordinates of the pixel B in the left-view texture are defined as (BLx, Bly, BLz), whereas the coordinates of the pixel B in the right-view texture are defined as (BRX, BRY, BRZ). As illustrated in the figure, the coordinate BRX, which is the X coordinate of the pixel B in the spherical model, is shifted by PR on the viewport. Similarly, the coordinate BLX, which is the X coordinate of the pixel B in the left-view texture is shifted by PL on the viewport.

Figure 25B:
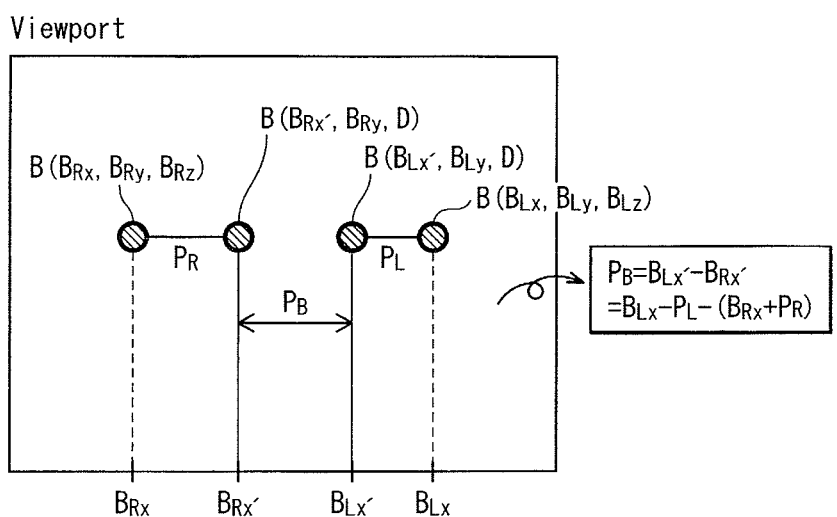

The following describes the values that PL and PR take. FIG. 25B is a plan view of the viewport taken along XY plane. In the figure, the coordinates (BLX', BLY, D) describe the point that is shifted to the left by the distance PL from the pixel at (BLX, BLY, BLZ), whereas the coordinates (BRX', BRY, D) describe the point that is shifted by the distance p from the pixel at (BRX, BRY, BRZ). Then, the parallax PB for the intra-texture object projected in the respective viewports is expressed by BLX'−BRX'. The following describes the values that PL and PR will take.

Figure 26A:
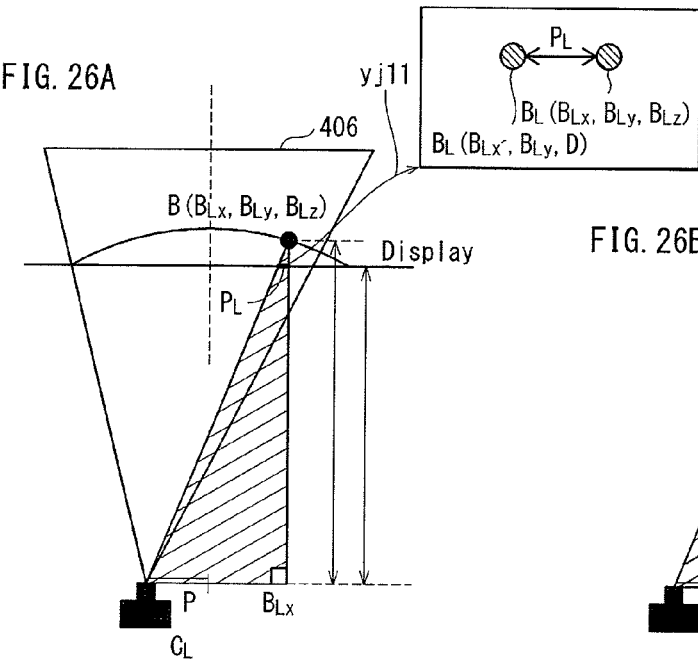
FIGS. 26A, 26B, 26C, and 26D illustrate how the pixel B, which is one of pixels constituting an intra-texture object, appears on a viewport.
Figure 26B:
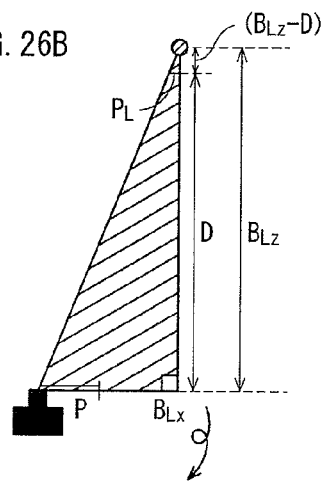
Figure 26C:
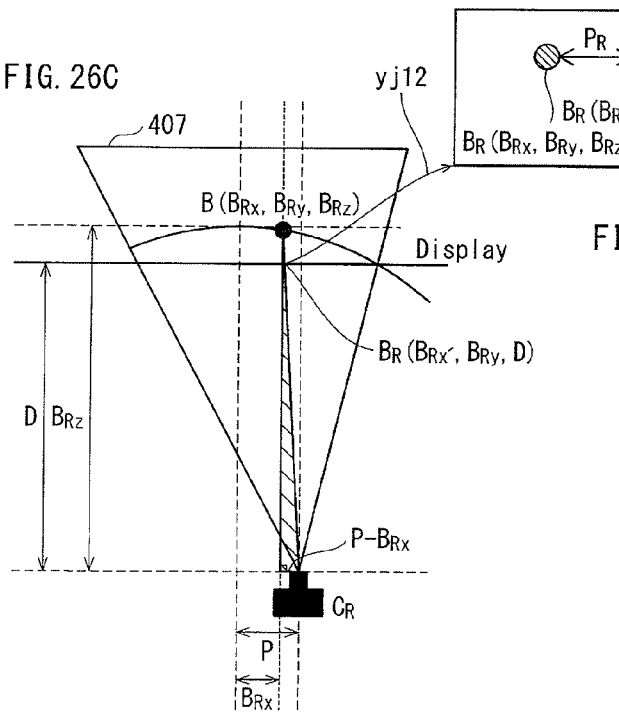

FIGS. 26A-26C illustrate the process for deriving BR'. FIG. 26A illustrates the left-view projection region 406, viewport, and the left-view camera CL on the X-Y coordinate plane in the three-dimensional modeling space. On the spherical surface mapped with the left-view panoramic image, the point BL corresponding to the point B is placed at the coordinates (BLx, Bly, BLz). The arrow yj11 indicates that the coordinates of the pixel BL in the viewport are shown in close-up. FIG. 26B is a triangle defined for parallax calculation. The triangle is a right-angled triangle which is BLZ high and P+BLx wide. A triangle which is geometrically similar to this triangle is BLZ-D high and PL wide.

From the similarity relation between the two triangles, the following equation can be derived.

$$(p+BLx):BLz=PL:(BLz-D)$$

By modifying the above equation for PL, the following is obtained.

$$PL=(p+BLx)*(BLz-D)/BLz$$

Thus, the value of BLx' is given as follows.

$BLx'=BLx-PL=BLx-(p+BLx)*(BLz-D)/BLz=[D*BLx-p*(BLz-D)/BLz].$

Figure 26D:
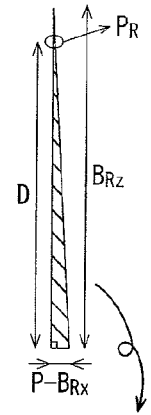

FIG. 26C is a view illustrating the right-view projection region 407, viewport, and right-view camera CR on the X-Z coordinates plane in the three-dimensional modeling space. On the spherical surface illustrated in FIG. 26C, the point BR corresponding to the point B is located at the coordinates (BRx, BRy, BRz). The arrow yj12 indicates that the coordinates of the pixel BL on the spherical surface 401 are shown in close-up. FIG. 26D is a triangle defined for parallax calculation. The triangle is a right-angled triangle which is BRZ high and P-BRx wide. A triangle which is geometrically similar to this triangle is BRZ-D high and PR wide.

From the similarity relation between the two triangles, the following equation is derived.

$(p-BRx):BRz=PR:(BRz-D)$

By modifying this equation for PR, the following is equation is given.

$PR=(P-BRx)*(BRz-D)/BRz$

Thus, the value of BRx' is given as follows.

$BRx'=BRx+PR=BRx+(p-BRx)*(BRz-D)/BRz=[D*BRx+p*(BRz-D)/BRz]$

Here, the parallax PB occurring between the points BL and BR is given by the following equation (2).

$PB=\{(D*BRx+p*(BRz-D))/BRz\}-\{(D*BLx-p*(BLz-D))/BLz\}$  Equation (2)

The texture parallax calculation unit 34 calculates the parallax between the textures by performing Equations (1) and (2) above for each coordinates of the spherical model surface that falls within the projection region. This concludes the description of the texture conversion unit 34.

<Viewport Depth Generation Unit 35>

The viewport depth generation unit 35 generates the viewport depth indicating, with the pixel-level accuracy, the depths of each intra-texture object and UI object appearing in the viewport based on the parallax PB of the intra-texture object and the parallax PS of the UI object. The viewport depth generation unit 35 stores the thus generated viewport depth in the viewport depth memory 26. The viewport depth generation unit 35 then merges the parallax calculated by the texture parallax calculation unit 34 for each pixel between the left-view texture and right-view texture, with the parallax calculated by the UI object parallax calculation unit 32 for a corresponding pixel of the projected images. As a result of merging the parallaxes, the viewport depth generation unit 35 generates the viewport depth of the pixels to be obtained on the viewport. The viewport depth generation unit 35 writes the depths generated for the respective pixels to the viewport depth memory 26.

<Depth Relationship Determination Unit 36>

The depth relationship determination unit 36 compares the parallax calculated by the virtual camera environment setting unit 33 for each pixel of the projected image of the UI object with the parallax calculated by the texture parallax calculation unit 34 for a corresponding pixel in the left-view texture and the right-view texture to see which of the parallaxes is larger or smaller. Through the comparison, the depth relationship determination unit 36 determines whether any UI object has a vertex whose Z coordinate is greater than the Z coordinate of a corresponding pixel in the left-view texture and the right-view texture. If any UI object has a vertex having a depth greater than the depth of the intra-texture object, such a UI object is determined as a colliding UI object and thus registered in the colliding object registration table 37. The reason why the depth relationship determination unit 36 as described above is necessary largely relates to the general nature of modeling data used in CG processing. In the three-dimensional modeling space, a UI object is placed at a location between the viewpoint and the inner spherical surface. With this placement, part of the inner spherical surface occluded by the UI object is discarded and not displayed due to the nature of depth testing. The depth testing is one of CG rendering functions and specifies a depth to be stored in the z buffer to cause any pixel that exceeds the specified depth not to be displayed.

As a consequence, in the projected image obtained by 3D model rendering, the UI object always appears closer toward the front (in foreground) whereas the texture always appears further in the back (in background). However, in the stereoscopic playback, the texture applied to the spherical surface has depths. Therefore, an intra-texture object may appear frontward of a UI object rather than rearward, which results in a collision between the two objects.

The term "collision" refers to awkward-looking composition of an intra-texture object and a UI object resulting from that the intra-texture object appears to jump out of the spherical model due to the stereoscopic viewing effect. Examples of a collision include the case where the intra-texture object appears to overlap with, or stick into the UI object and the case where the UI object appears to be occluded by the intra-texture object. The depth relationship determination unit 36 determines the depth relationship between the background image and the UI object in order to see if a collision between a UI object and an intra-texture object has occurred.

Figure 27C:
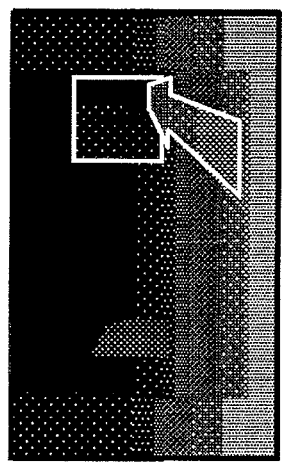
FIGS. 27A, 27B, 27C, 27D, and 27E illustrate an example in which an UI object written on a left-view viewport and a right-view viewport appears deepest at its tip portion and the parallax of in the tip portion is greater than the parallax of the intra-texture object.
Figure 27E:
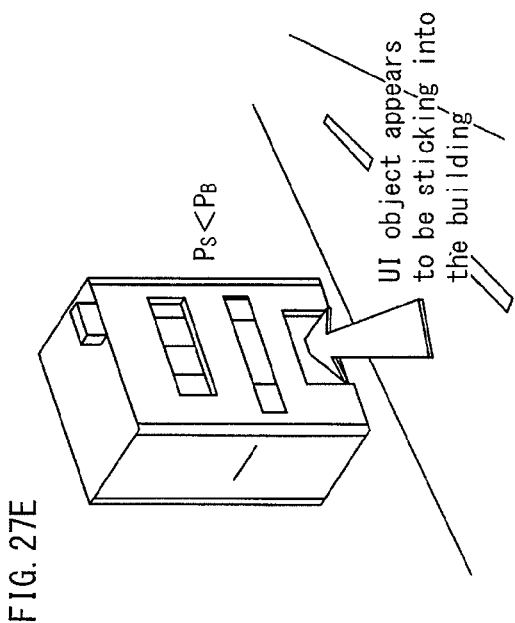
Figure 27B:
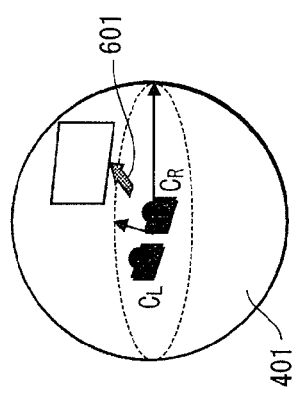
Figure 27D:
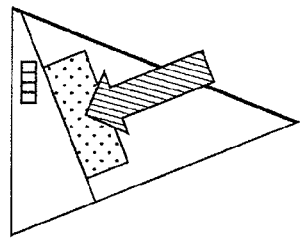
Figure 27A:
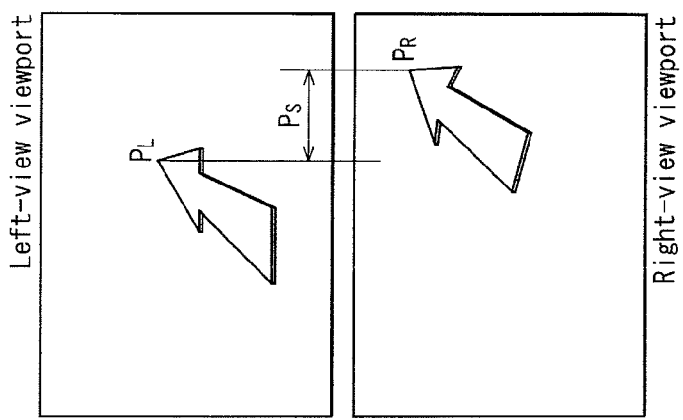

FIG. 27A illustrates an example in which a UI object written on the left-view viewport and on the right-view viewport appears deepest at its tip portion and the parallax of the tip portion is greater than the parallax of the intra-texture object. FIG. 27B illustrates an example of the state where the UI object 601 is placed within the three-dimensional modeling space.

The viewport depth illustrated in FIG. 27C represents the parallax distribution in a pair of viewport images, one of which is projected by the left-view camera CL and another by the right-view camera CR. FIG. 27D illustrates the X-Z coordinate system layout, which is a bird's-eye view of an example of parallax depths as seen from the user in the case where the viewport depth illustrated in FIG. 27C is obtained. In this X-Z coordinate system layout, a UI object is rendered over the background image which introduces inconsistency in the depth relationship.

Figure 28C:
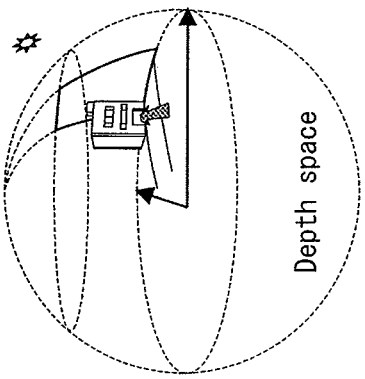
FIG. 28C illustrates associated depth space.
Figure 28B:
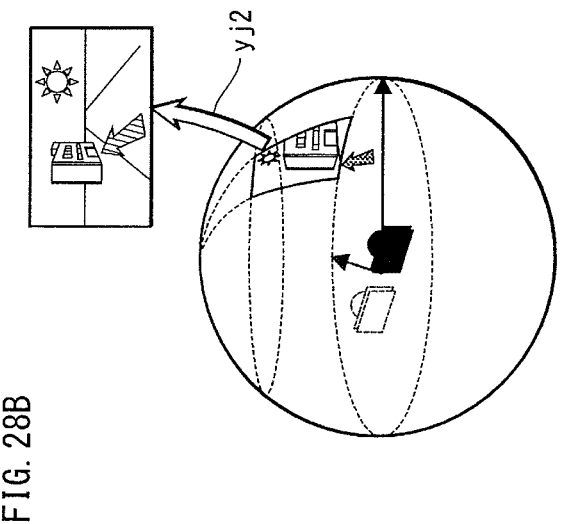
FIG. 28B illustrates a three-dimensional modeling space in which a spherical model having a right-view texture applied thereto exists.
Figure 28A:
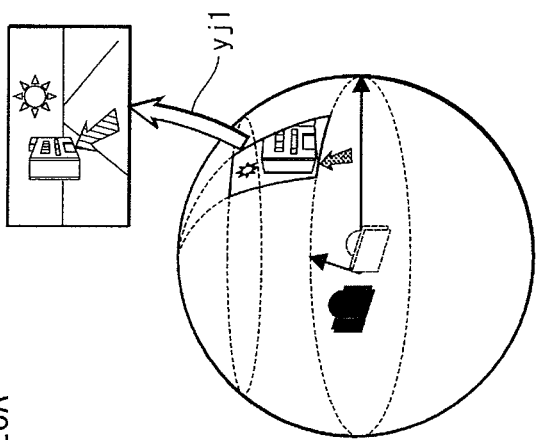
FIG. 28A illustrates a three-dimensional modeling space in which a spherical model having a left-view texture applied thereto exists.

FIG. 28A illustrates a three-dimensional modeling space containing a left-view spherical model to which a left-view texture is placed. FIG. 28B illustrates a three-dimensional modeling space containing a right-view spherical model to which a right-view texture is applied. FIG. 28C illustrates a depth space. In FIG. 28A, the leader line yj1 indicates that the viewport image in the viewport is shown in close-up. In FIG. 28B, the leader line yj2 indicates that the viewport image in the viewport is shown in close-up. FIG. 27E illustrates one example of stereoscopic image presented to the user in the case where there is inconsistency in depth relationship. When depth inconsistency occurs, the user perceives an image in which the UI object 601 appears to be buried in the background image, so that is it difficult to view the image stereoscopically.

Since the three-dimensional modeling space and the depth space differ in their coordinate systems, the coordinate conversion is necessary to avoid a collision between an UI object and an intra-texture object. However, the converting all 3D coordinates describing the UI object and the intra-texture object is computationally too expensive, so that an approximation is used. It is noted that stereoscopic viewing is realized by the following way: a right-view texture and a left-view texture are obtained by performing DIBR using a panoramic image and an associated depth image, and each of the thus obtained right-view texture and left-view texture is placed onto a spherical model and then projected. Therefore, by calculating the parallax occurring between the respective viewports on a pixel-by-pixel basis and comparing the calculated parallax with the parallax of a UI object, the depth relationship between the respective objects in the depth coordinate system is duly judged without having to conduct coordinate conversion. Through the comparison of parallaxes as described above, the depth relationship determination unit 36 duly detect any collision between objects. This concludes the description of the depth relationship determination unit 36.

<Colliding Object Registration Table 37>

The colliding object registration table 37 shows each UI object colliding with an intra-texture object along with its vertex causing the collision.

<Object Manipulation Unit 38>

The object manipulation unit 38 performs a manipulation for correcting the positional relationship between an intra-texture object and a UI object in the depth coordinate system to achieve depth consistency. The manipulations performed for correcting the depth relationship include: object position adjustment, texture re-generation, mask pattern re-generation, and geometric transformation of an object. The object manipulation unit 38 includes the following components for realizing the manipulations for correcting the depth relationship namely, the object position adjustment unit 39, the texture re-generation unit 40, the mask pattern re-generation unit 41, and the geometry transformation unit 42.

<Object Position Adjustment Unit 39>

The object position adjustment unit 39 operates when the object position adjustment is designated as the manipulation process for collision avoidance for UI object. When operated, the object position adjustment unit 39 adjusts the depth relationship by adjusting the position of the UI object registered in the colliding object registration table 37 as having a colliding vertex.

As described above, the depth relationship between an intra-texture object and a UI object in the depth coordinate system depends on the parallax occurring for the UI object and the parallax occurring for the intra-texture object UI object between the left-view texture and the right-view texture each applied to a spherical model. Thus, with the object position adjustment carried out by changing the depths of the UI object while the depths of the intra-texture object are kept unchanged, the positional relationship between the respective objects is corrected to achieve depth consistency.

The "object position adjustment" is carried out by changing the position of the UI object in the three-dimensional modeling space to a position that is further from the spherical model. The collision between objects occur when PS>PB. Thus, by selecting a position for locating the UI object having the z coordinate satisfying PS≤PB, occurrence of a collision is avoided.

Figure 29C:
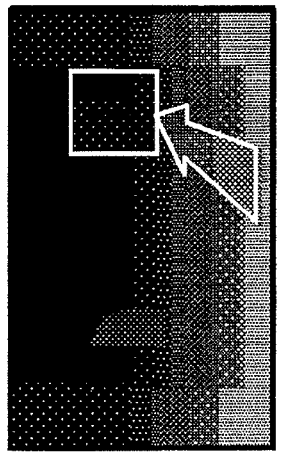
FIGS. 29A, 29B, 29C, 29D, and 29E illustrate the process of position adjustment of a UI object.
Figure 29E:
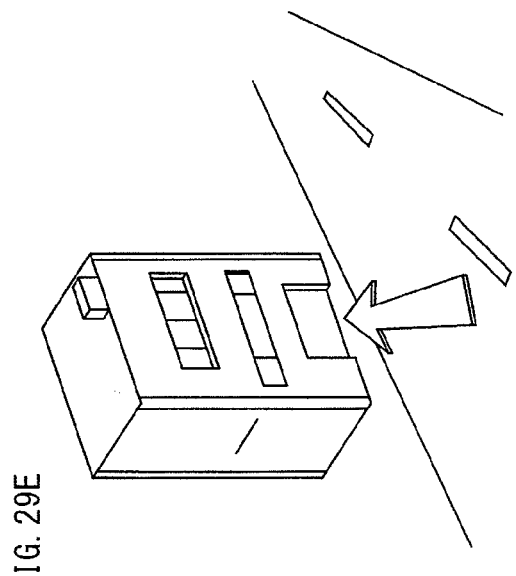
Figure 29B:
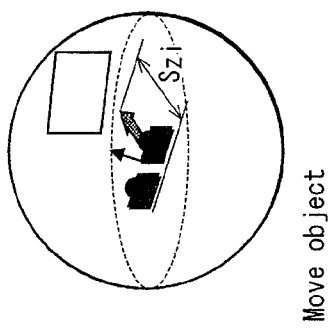
Figure 29D:
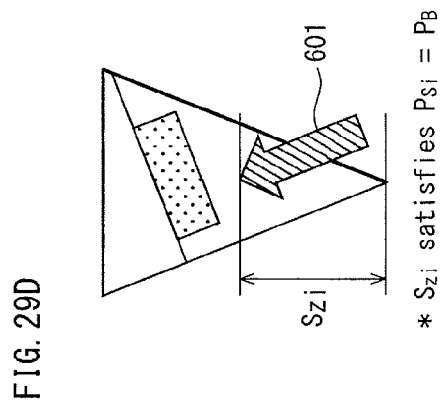
Figure 29A:
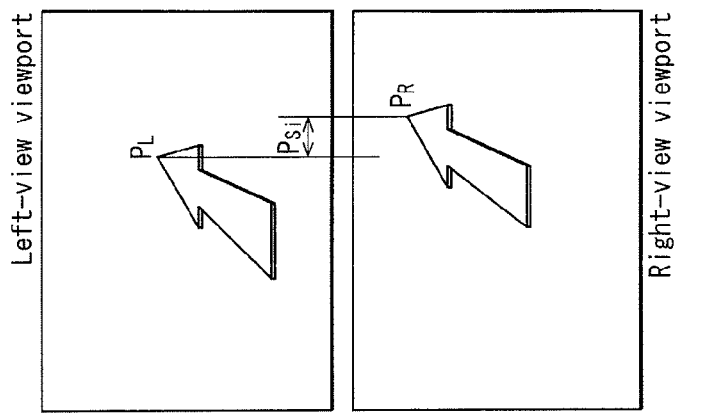

FIGS. 29A, 29B, 29C, 29D, and 29E illustrate the position adjustment of a UI object. FIG. 29A illustrates the right-view image of the UI object projected on the left-view viewport and on the right-view viewport. In FIG. 29A, the tip of the UI object projected on the respective viewports is apart from each other by the distance PSi. Thus, in the object adjustment, the coordinate Szi satisfying PSi=PB is calculated and places the tip of the UI object at the coordinate Szi in the three-dimensional modeling space. FIG. 29B illustrates the UI object located at the coordinate Szi in the three-dimensional modeling space. FIG. 29C illustrates the viewport depth in the case where the UI object is located as above, and FIG. 29D illustrates the X-Z coordinate system layout in the depth space in the case where the UI object is located as above. Since the coordinate Szi satisfies PSi=PB, it is ensured that the UI object does not collide with the intra-texture object in the depth space.

FIG. 29E illustrates a stereoscopic image displayed as a result of placing the UI object as illustrated in FIG. 29D. The tip of the UI object appears slightly before the intra-texture object in the depth direction, so that no collision has occurred. This concludes the description of the UI object position adjustment unit 39.

<Texture Re-Generation Unit 40>

The texture re-generation unit 40 operates when the texture re-generation is designated as the manipulation process for collision avoidance for UI object. When operated, the texture re-generation unit 40 adjusts the depth relationship through texture re-generation which is carried out by causing the texture conversion unit 17 to re-do DR after correcting the pixel intensity values of the depth image stored in the depth image memory 16. The following now describes the texture re-generation. In the UI object position adjustment, the position of the intra-texture object is fixed. In the texture re-generation, however, the position of UI object is fixed and the depths of the intra-texture object are adjusted to avoid collision. More specifically, the texture re-generation is carried out by correcting the brightness and darkness of the depth image and again performing DIBR based on the corrected depth image. In the correction of the depth image, the depth of each pixel in the depth image is adjusted to ensure that the UI object appears frontward.

When the depth relationship determination unit 36 determines that the UI object will appear rearward of the intra-texture object, the texture re-generation unit 40 subtracts the offset from the intensity value of each pixel of a depth image associated with the panoramic image and stores the resulting depth image back into the depth image memory 16. The texture conversion unit 17 performs DIBR based on the depth image resulting from the offset subtraction from the intensity value of each pixel. By subtracting the offset from each pixel of the depth image, the background image is moved further in the back, so that the depth relationship with the UI object is maintained without disparity.

Figure 30A:
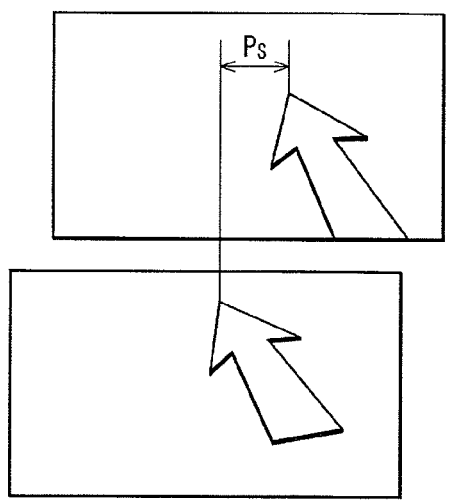
FIGS. 30A, 30B, 30C, 30D, 30E, and 30F illustrate the process of texture re-generation.
Figure 30B:
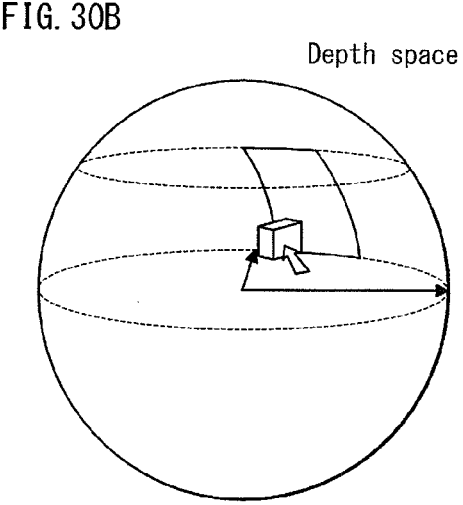
Figure 30C:
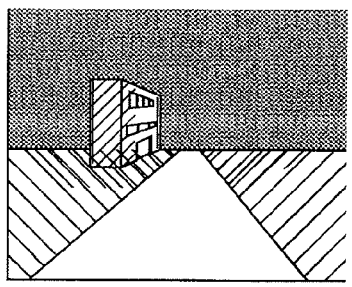
Figure 30D:
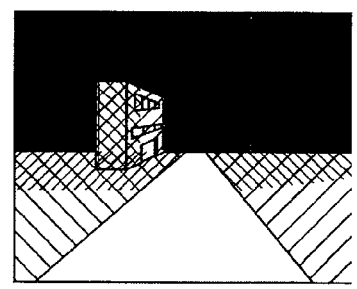

FIG. 30A illustrates a pair of a left-view viewport image and a right-view viewport image which introduces the parallax Ps. This parallax satisfies the relation PS>PB. FIG. 30B illustrates the depth space model when DIBR of the viewport right-view image involving the parallax is performed. When the relation PS>PB is true, the intra-texture object appears frontward, so that the UI object appears to stick into the intra-texture object. Therefore, in the texture re-generation, the associated depth image is corrected by subtracting a predetermined offset from the intensity value of each pixel in the depth image. FIG. 30C illustrates the depth image before the offset subtraction from the intensity value of each pixel, whereas FIG. 30C illustrates the depth image after the offset subtraction from the intensity value of each pixel. Illustrated below each of FIGS. 30C and 30D is the indication of the range occupied by the intensity values of the pixels in the corresponding depth image. Since the offset is subtracted from each pixel of the depth image, the depth image after the correction shows a considerably lower range for the intensity values for the pixels of the intra-texture object.

Figure 30E:
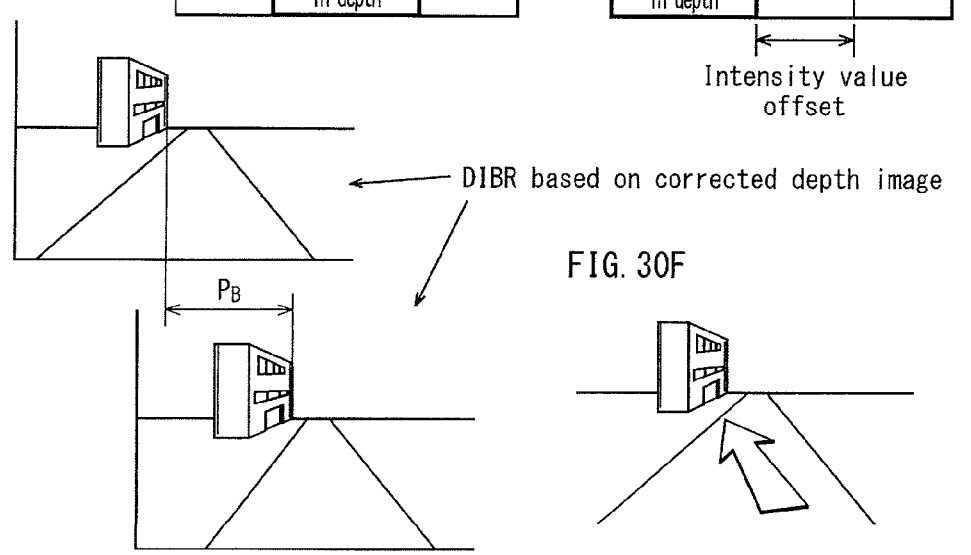
Figure 30F:
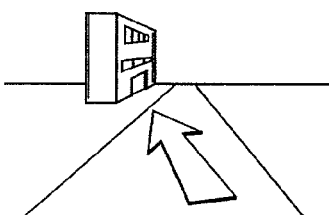

FIG. 30E illustrates the left-view texture and right-view texture that are generated through DIBR based on the corrected depth image. Since the intra-texture object in the left-view texture and in the right-view texture have the amount of parallax PB, the intra-texture object will appear further in the back than before the depth correction. FIG. 30F illustrates the composite image presented as a result of compositing the texture illustrated in FIG. 30E with the intra-texture object. This concludes the description of the texture conversion unit 40.

<Mask Pattern Re-generation Unit 41>

The mask pattern re-generation unit 41 operates when the mask pattern re-generation is designated as the manipulation process for collision avoidance for UI object. When operated, the mask pattern re-generation unit 41 adjusts the depth relationship by re-generating a mask pattern for the UI object registered in the colliding object registration table 37 as having a colliding vertex. The following describes the "mask pattern re-generation". The mask pattern re-generation refers to the depth relation adjustment carried out at the time of viewport conversion. In the mask pattern re-generation, among the pixels of the UI object projected in the viewport images, any pixel leading to a larger depth than the depths of the intra-texture object is masked and only the remaining pixels are rendered. Similarly to the UI object position adjustment, this mask pattern re-generation is also carried out by fixing the depths of the intra-texture object. However, a difference from the UI object position adjustment lies in that the pixels of the UI object to be rendered are limited to only a subset of the pixels at the stage of the viewport conversion performed by the CG processor 19.

Figure 31C:
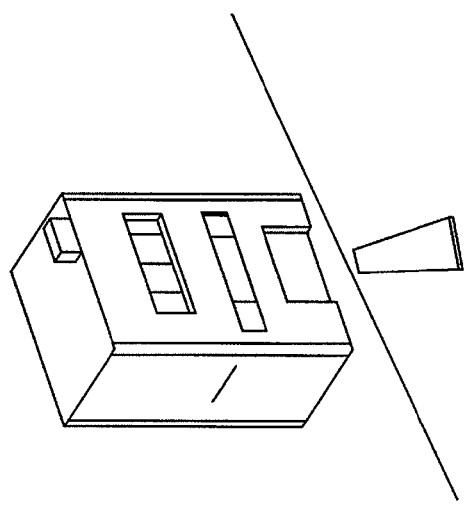
FIGS. 31A, 31B, and 31C illustrate the process of mask pattern re-generation.
Figure 31B:
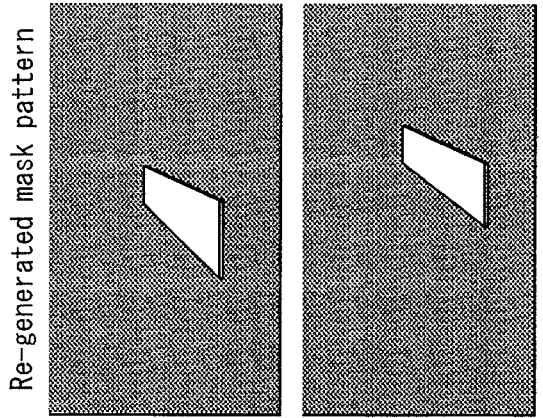
Figure 31A:
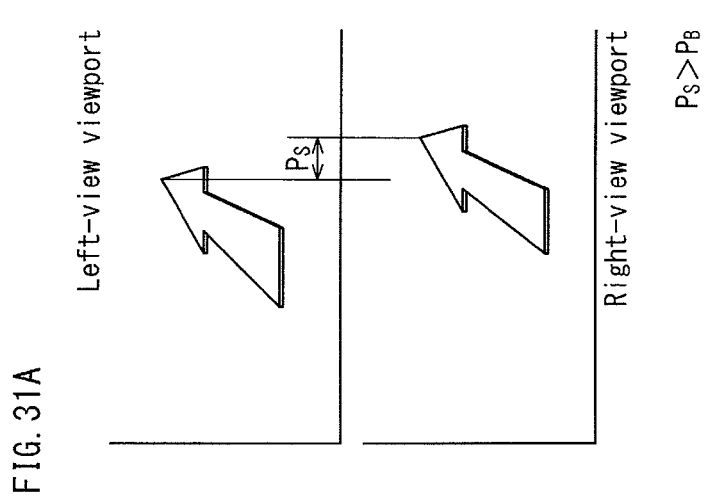

With reference to FIGS. 31A, 31B, and 31C, a description is given of collision avoidance for UI object by mask pattern re-generation. The mask pattern is applied to the pixels that are in improper depth relationship. FIG. 31A illustrates the right-view viewport image having a parallax. It is assumed that the parallax of the tip of the UI object satisfies the relation Ps>Pb. FIG. 31B illustrates a pair of mask patterns corresponding to the UI object illustrated in FIG. 31A. The tip portion of the arrow is presented by black pixels, while the rear portion is presented by white pixels. By taking XOR between the mask pattern and the UI object, the portion with the black pixels are discarded and thus not displayed so that the portion with the white pixels remains to be displayed. FIG. 31C illustrates a stereoscopic image generated by using the mask pattern. As illustrated in the figure, the tip portion of the UI object is no longer displayed, it is avoided that the UI object appears to stick into the intra-texture object. This concludes the description of the mask pattern re-generation unit 41.

<Geometry Transformation Unit 42>

The geometry transformation unit 42 operates when the geometry transformation is designated by the virtual camera environment setting unit 33 as the manipulation process for collision avoidance for UI object. When operated, the geometry transformation unit 42 adjusts the depth relationship by applying the geometry transformation to the UI object registered in the colliding object registration table 37 as having a colliding vertex. The following describes the detail of the geometry transformation of an object. The geometry transformation of an object is a scheme preformed at the coordinate conversion level to avoid collision. More specifically, the geometry transformation unit 42 obtains a transformation matrix for applying a rotation to the UI object in the viewport depth and applies geometric transform the UI object according to the transformation matrix.

FIG. 32A illustrates the viewport depth. The viewport depth is obtained by merging, on a pixel-by-pixel basis, the intensity values of the UI object depth to those of the background depth. FIG. 32B illustrates a trapezoidal frame defined frontward of the intra-texture object in the viewport depth. The trapezoidal frame is selected to be used because it has a shape defined by a shorter upper base and a longer lower base. By deforming the UI object to fit within the trapezoidal frame, the UI object is presented in perspective. Thus, by projecting the UI object into the trapezoidal frame, the UI object is shifted away from the intra-texture object.

To project a UI object into the trapezoidal frame, a transformation matrix is necessary. FIG. 32C illustrates the transformation matrix. The right-hand side of the figure illustrates a viewport image, and the left-hand side illustrates a trapezoidal frame. In a viewport image, a rectangular frame W2 circumscribes the UI object, and a transformation matrix for transforming the rectangular frame W2 into a frame w1 needs to be obtained. This transformation matrix is a homography matrix. Lastly, the UI object is geometrically transformed using the homography matrix, so that the UI object is projected into the above-mentioned frame in the viewport depth.

FIG. 32D illustrates the left-view viewport image and the right-view viewport image both resulting from the geometrically transformed UI object by using the matrix. This concludes the description of the geometry transformation unit 42.

By performing any of the position adjustment, texture re-generation, mask pattern re-generation, or object geometric transformation for a UI object, the depth relationship between the intra-texture object and the UI object is duly adjusted without requiring the coordinate conversion from the three-dimensional modeling space to the depth space.

<Guidelines for Selecting One of Object Position Adjustment, Texture Re-generation, Mask Pattern Re-generation, and Geometry Transformation>

Each of the above processes, namely the object position adjustment, texture re-generation, mask pattern re-generation, and geometry transformation, has its merits and demerits. In the standpoint of display quality, the ranking will be "object position adjustment=texture re-generation>geometry transformation>mask pattern re-generation". Both the object position adjustment and the texture re-generation retain the original shape of the UI object, so that the display quality is maintained. The geometry transformation involves deformation of the UI object but without losing notable features of the original shape. Thus, the geometry transformation ensures a high display quality following that ensured by the object position adjustment and by the texture re-generation. The mask pattern re-generation applies a mask for rendering when there is a colliding vertex. Consequently, the masked vertex is no longer visible and thus the resulting display quality is rather low.

In the standpoint of the quickness, the ranking will be "mask pattern re-generation>geometry transformation>texture re-generation>object position adjustment". The mask pattern re-generation is carried out at the stage of the viewport conversion. That is, the CG process required to be re-done for depth relationship correction is from the viewport conversion to the masking. Therefore, the mask pattern re-generation can be done quickly. The geometry transformation is the process of transforming a UI object projected in a viewport image and therefore can be done at the quickness that is next to the quickness at which the mask pattern re-generation is done. The texture re-generation requires re-doing of processes as far as from the lighting-value calculation. Therefore, the quickness of the texture re-generation is second to the mask pattern re-generation.

Similarly, the object position adjustment requires re-doing of processes as far as from the lighting-value calculation. Therefore, the quickness of the object position adjustment is second to the mask pattern re-generation.

As has been described above, it is preferable to select an appropriate process for the depth relationship correction from one the four options ranging from the object position adjustment to the geometry transformation, depending on various factors including the total number of vertices in a UI object, the number of colliding vertices, and whether the rendering is for effecting a change of the current viewpoint or of the current line-of-sight direction. Also, a preferable depth relationship correction process may be specified for the modeling data of each UI object.

The image rendering device according to this embodiment can be industrially manufactured by implementing the components of the image rendering device with hardware components. Yet, the image rendering device may be realized by software implementation. That is, the present device may be industrially manufactured by embodying the code ROM with a program written in computer code describing the processing steps performed by the above components and causing a single processing unit (CPU) out of the hardware components of the device to execute the processing steps of the program. The following describes the processing steps necessary for software implementation of the device, with reference to the flowcharts.

Figure 33:
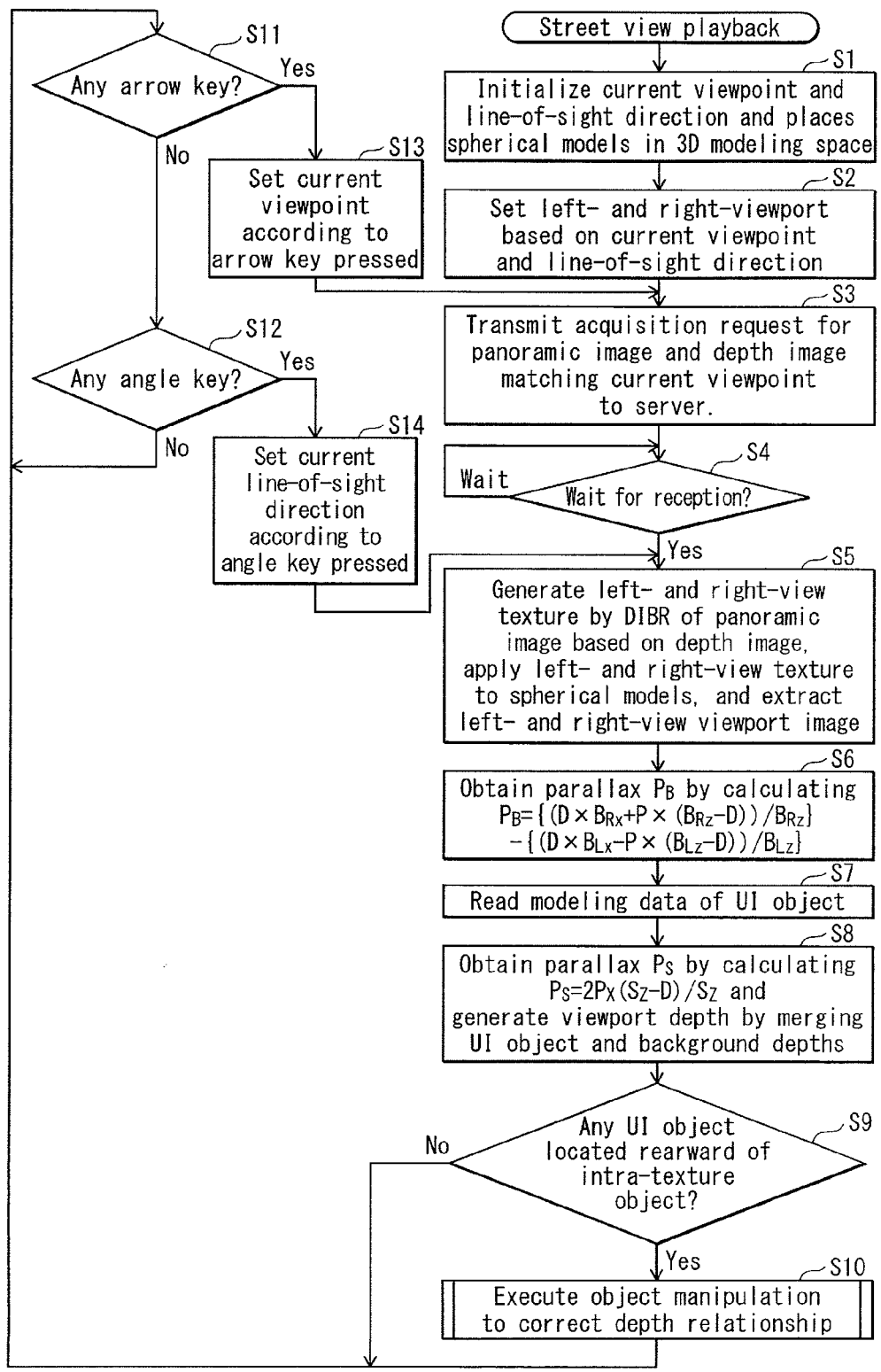
FIG. 33 is a flowchart illustrating processing steps of street view playback.

FIG. 33 is a flowchart illustrating the processing steps for playback of a street view according to Embodiment 1. This flowchart relates to the highest level processing, i.e., the main routine. The flowchart shown in FIG. 33 relates to a subroutine of this main routine. The following describes the processing steps of the main routine.

The current viewpoint and the current line-of-sight direction are initialized and spherical models are placed in three-dimensional modeling space (Step S1), and a left-view viewport 404 and a right-view viewport 405 are set with the use of the information about the current viewpoint and the current line-of-sight direction that is received from the position and direction determination unit (Step S2).

Nest the depth image acquisition unit transmits to a server an acquisition request for acquiring a street view file containing a panoramic image data corresponding to the current viewpoint and a depth image associated with the panoramic image (Step S3). Then, in Step S4, the processing is placed in wait state for reception of the street view file. Upon receipt of the street view file, the processing moves onto Step S5.

In Step S5, the panoramic image contained in the street view file is subjected to depth image based rendering by using the depth image also contained in the street view file, so that a left-view texture and a right-view texture are obtained. Each of the thus obtained left-view texture and right-view texture is applied on a spherical surface and a left-view viewport image and a right-view viewport image are extracted.

Next, the parallax Pb of an intra-texture object is calculated (Step S6), and the modeling data of a UI object stored in the object management unit 25 is read (Step S7). Then, the parallax between the images of the UI object projected on the respective viewports is calculated on a pixel-by-pixel basis by executing the equation: $PS=2p*(Sz-D)/Sz$, and the thus calculated parallax is merged with the depth of a corresponding pixel in the background depth to generate a viewport depth (Step S8).

With reference to the thus generated viewport depth, it is determined whether any UI object will appear further in the back than the intra-texture object (Step S9). If there is any object which will rearward of the background image, the object management unit 25 processes the UI object (UI object position adjustment, texture re-generation, mask pattern re-generation, or object geometry transformation) to correct the depth relationship to make the UI object appear frontward of the background image (Step S10).

Then, the loop between Steps S11 and S12 is executed.

In Step S11, a determination is made as to whether any up, down, left or right arrow key is pressed. In Step S12, a determination is made as to whether an angle change is made.

When navigation in one of up, down, right and left directions is requested (Step S11: Yes), the current viewpoint is set according to the key pressed (Step S13) and then the processing moves onto Step S3.

When an angle key is pressed (Step S12: Yes), the current line-of-sight direction is set (Step S14) and the processing moves onto Step S4. The processing moves onto Step S3 or S5 as the current viewpoint or current line-of-sight direction is changed. This is because moving distance for the object needs to be re-defined.

The process of "re-defining the moving distance for the object" is preformed in response to an event of requesting change in the position of a UI object. In the process of "re-defining the moving distance for the object", the process of adjusting the position of the object is carried out in view of whether any object collision occurs in the depth image, rather than the process of immediately moving the object as requested. Since the rotation or move of an UI object involves change in position of the UI object, it is possible that the object after rotation will collide with another object although there is no collision before the rotation.

Figure 34A:
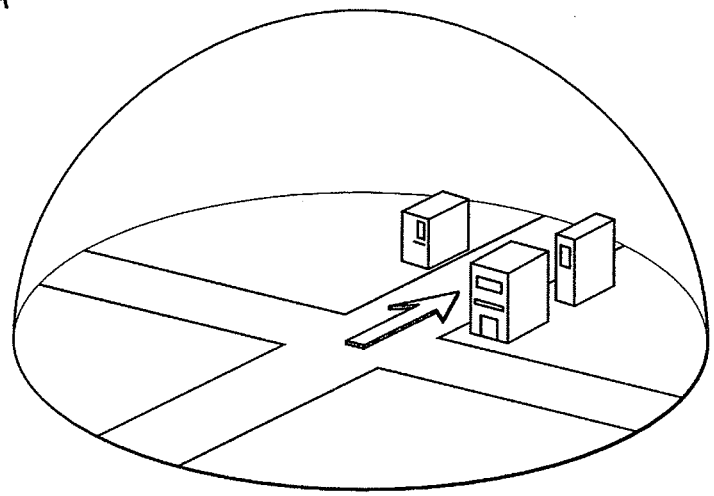
FIGS. 34A, 34B, and 34C illustrate the transition of a depth space occurring at the time of changing the viewpoint and line-of-sight direction.
Figure 34B:
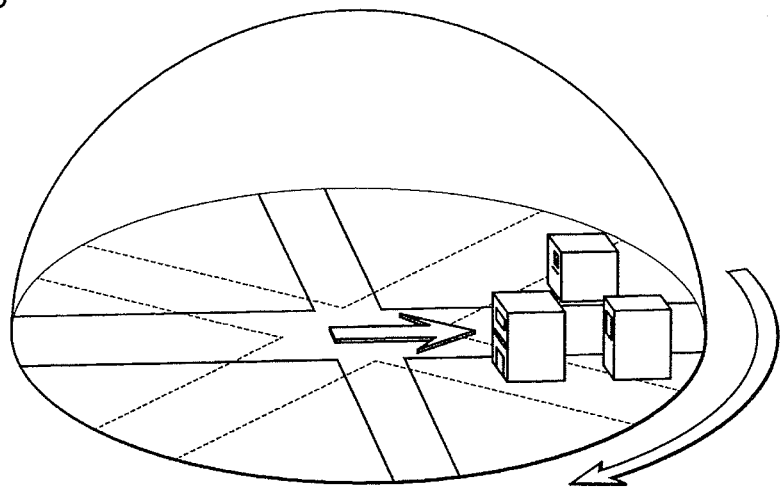
Figure 34C:
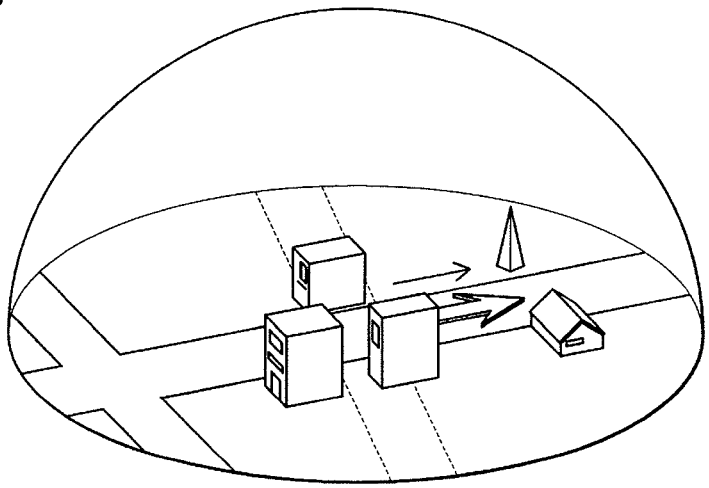

FIGS. 34A, 34B, and 34C illustrate the transition of a depth space occurring at the time of changing viewpoint and line-of-sight direction. In response to a user specification, the angle of a panoramic image is changed from the state illustrated in FIG. 34A. As a result of the angle change, the positional relationship between the intra-texture object and the UI object in the depth image space changes to the state illustrated in FIG. 34B. At this time, the UI object 601 is deformed in conjunction with the angle change in the panoramic image. Then, in response to another user specification, the viewpoint of the panoramic image is changed from the output screen illustrated in FIG. 34B. As a result of the change, the positional relationship between the intra-texture object and the UI object in the depth space changes to the state illustrated in FIG. 34C. According to this embodiment, at the time of changing the current viewpoint, Steps S3-S5 are performed to adjust the object position to avoid the object from colliding with another object.

Figure 35:
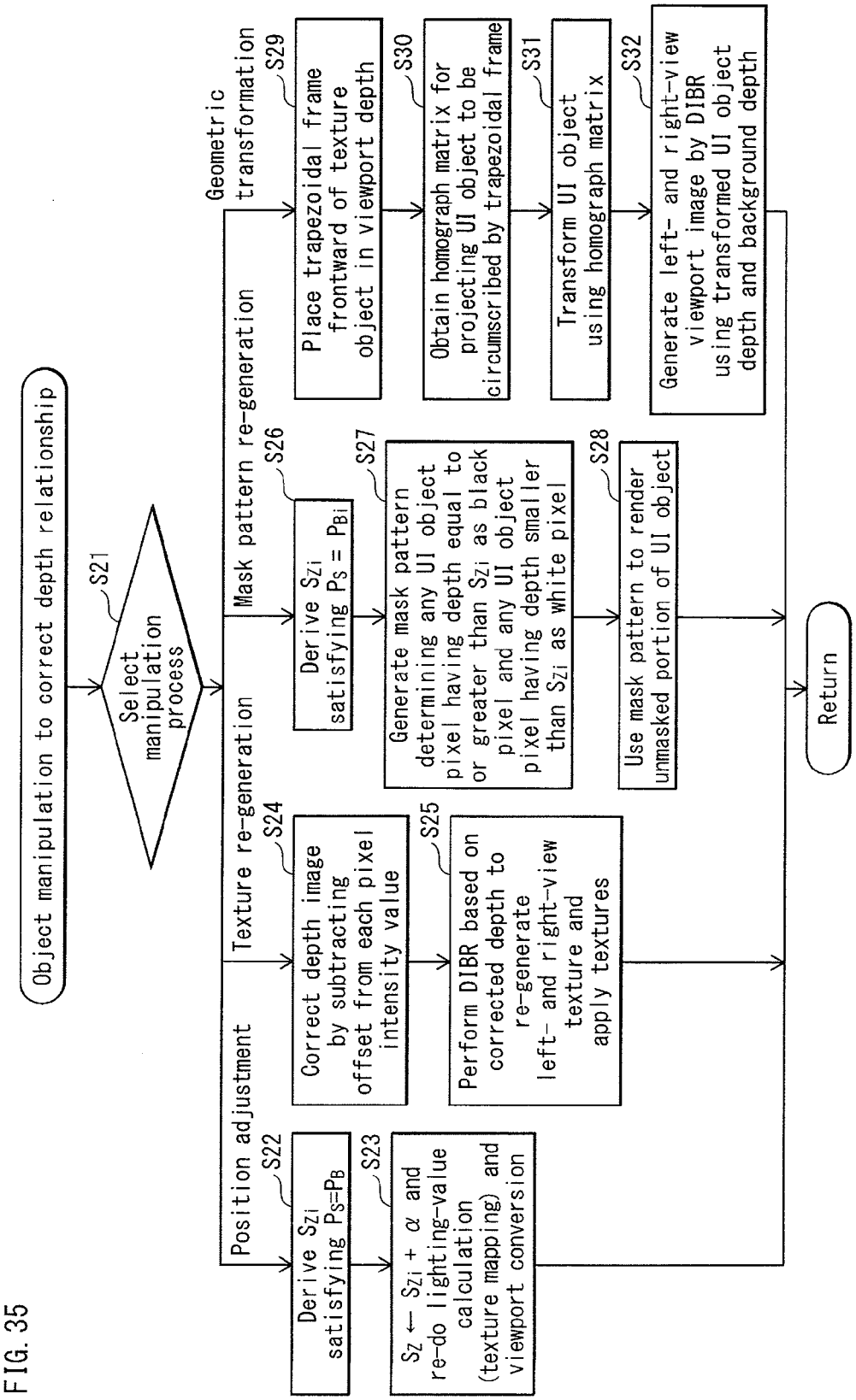
FIG. 35 is a flowchart illustrating processing steps of manipulating a UI object for correcting the depth relationship.

FIG. 35 is a flowchart illustrating processing steps of manipulating the UI object for correcting the depth relationship. In Step S21, the manipulation process to be performed is determined. If the position adjustment of the UI object is selected, the processing moves onto Step S22-S23. In Step S22, SZi satisfying PSi=PB is derived. In Step S23, Sz is set to a value obtained by adding a to Szi, and the lighting-value calculation (texture mapping) and viewport extraction are re-done. As a result, re-rendering of the UI object is carried out.

If the texture re-generation is selected, the depth image is corrected by subtracting the predetermined offset from the intensity value of each pixel of the depth image (Step S24), and DIBR is performed based on the corrected depth image to re-generate a left-view texture and a right-eye texture, and each of the resulting left-view texture and right-eye texture is applied to the inner surface of a corresponding spherical model (Step S25). If the selected manipulation process is mask pattern re-generation, the coordinate Szi is calculated (Step S26). Then, a mask pattern is generated to mask every pixel having a depth equal to Szi or greater as a white pixel (Step S27). A portion of the UI object is rendered by using the mask pattern (Step S28).

If the selected manipulation process is geometry conversion of object, a trapezoidal frame is placed at a location frontward of the intra-texture object in the viewport depth (Step S29), and a transformation matrix for projecting a rectangular frame circumscribing the UI object into the trapezoidal frame is obtained (Step S30). Then, the geometry transformation is performed by using the matrix (Step S31).

Then, through DIBR performed by using the thus transformed UI object depth and the background depth, a left-view viewport image and a right-view viewport are generated (Step S32).

(Modifications)

In the embodiment, it is assumed that the projection screen and the right-view and left-view cameras used for rendering a background image are the same as those used for rendering an UI object. As a modification of the embodiment, however, different projection screens may be used for rendering the background image and for rendering the UI object, or the distance to the right-view camera and the left-view camera may be changed.

For example, the distance to the right-view camera and the left-view camera when rendering the UI object may be set larger than the distance when rendering the background image, thereby relatively increasing the parallax occurring during rendering of the UI object as expressed in Equation (1). Furthermore, the same advantageous effect can be achieved via Equation (2) by positioning the projection screen further back to increase the value of D. When there is a plurality of UI objects, it is clear that a separate camera distance and projection screen may be set for each UI object.

Embodiment 2

In Embodiment 1, the depth determination is made using viewport depth. In this embodiment, the intra-texture object is converted into modeling data for the purpose of collision avoidance. More specifically, the intra-texture object is converted into modeling data and the three-dimensional coordinates defining the geometry of the intra-texture object as converted is stored into the Z buffer, together with the three-dimensional coordinates defining the UI object. Then, the depth testing function is enabled to execute the lighting-value calculation based on the three-dimensional coordinates stored in the Z buffer, so that occurrence of a collision is avoided.

In CG rendering, the depth testing may be enabled. As described above, when the depth test function is enabled, a specified depth is stored in the Z buffer and any pixel having a depth that is greater than the depth stored in the Z buffer is discarded and thus not displayed. After the intra-texture object is converted into modeling data, the Z coordinate B'z of a point B falling on the boundary is calculated and rendering is performed with the depth testing based on the coordinate B'z.

Figure 36:
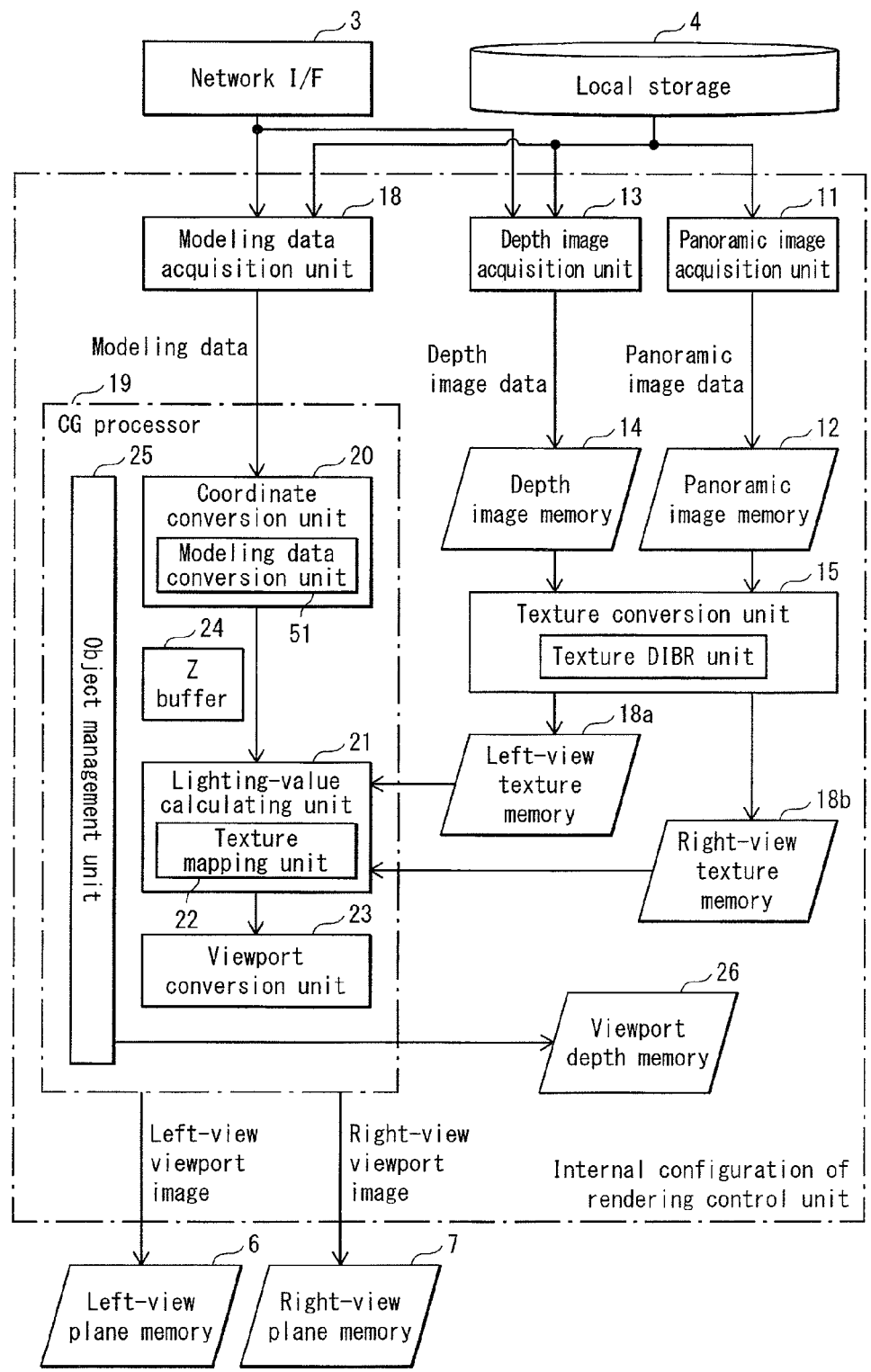
FIG. 36 is a block diagram of the internal configuration of a rendering control unit according to Embodiment 2.

FIG. 36 is a block diagram of the internal configuration of a rendering control unit according to Embodiment 2. This figure is drawn based on FIG. 14 illustrating the internal configuration of Embodiment 1 and the difference with the base configuration is found in an additional component. Specifically, the component bearing a 50 number as a reference sign (namely, texture conversion unit 51) is a component specific to the configuration shown in the figure. The following now describes this new component.

The texture conversion unit 51 performs coordinate conversion, which is one stage of the CG process. The texture conversion unit 51 converts the depth image acquired by the depth image acquisition unit 15 and generate vertex data describing the vertices of the intra-texture object placed in the three-dimensional modeling space. This concludes the description of the texture conversion unit 51.

As the supplemental description for the additional component, the relation with the existing component (viewport conversion unit 23) is described.

The viewport conversion unit 23 extracts viewport images to be presented in the three-dimensional modeling space, from the vertex data generated through the conversion by the texture conversion unit 51, the intra-texture object contained in the panoramic image, and the modeling data of each UI object stored in the object management unit 25. Note that the viewport images extracted include a left-view image and a right-view image. Each of the left-view image and the right-view image is obtained by applying the panoramic image data to the inner surface of a corresponding sphere and overlaying GUI thereon. The respective viewport images are written into the left-view plane memory 26 and the right-view plane memory 27.

The Z coordinate of each pixel of the modeling data converted from the intra-texture object is calculated based on the parallax PB between the left-view texture and the right-eye texture calculated for a corresponding pixel. Next, the following describes the method of generating vertex data of modeling data that is obtained by converting the intra-texture object.

When a point B belonging to an intra-texture object contained in a panoramic image falls inside a viewport, the parallax PB between the right-view background image and the left-view background image to be output is given by Equation (1) as described previously. Suppose that when an intra-texture object is converted into modeling data, the point B'(B'x, B'y, B'z) that belongs to the modeling data converted from the intra-texture object will have a parallax that is equivalent in amount to the parallax PB, in the three-dimensional modeling space view coordinate system. From Equation (1), the following are given.

$$PB=2p^*(B'z-D)/B' \qquad \text{Equation (3)}$$

$$B'zPB=2p^*(B'z-D) \qquad \text{Equation (4)}$$

$$B'z=2pD/(2p-PB) \qquad \text{Equation (5)}$$

According to Equation (5), the coordinates of every point I(x, y, z) on the intra-texture object constituting the panoramic image mapped on the spherical surface 401 are re-mapped to a corresponding point at the coordinates (x, y, 2pD/(2p−PI)) in the three-dimensional modeling space, and the depth testing is enabled to perform lighting-value calculation and viewport image extraction. As a result, among the pixels stored in the depth buffer, only pixels located closer toward the front with respect to 2pD/(2p−PI) are displayed, whereas pixels located further in the back than 2pD/(2p−PI) are discarded and not displayed. Thus, it is avoided that the UI object on display appears to stick into the background image. In this way, the display quality is maintained.

Embodiment 3

According to Embodiment 1 of the present invention, two or more viewpoint images are generated through the various computer graphics processes including the coordinate conversion, lighting-value calculation (texture mapping), and viewport conversion, with the use of a panoramic image and an associated depth image. Each of the thus generated viewpoint images is then applied to a spherical surface. Different from this, Embodiment 3 is directed to providing prompt display update in response to a change in the current line-of-sight direction or current viewpoint. More specifically, when the current line-of-sight direction is changed, a viewpoint image corresponding to the new current line-of-sight direction is re-extracted from the UI object and the spherical model mapped with one of the viewpoint textures. By performing DIBR of the re-extracted viewport image using the depth image, viewport images corresponding to two or more viewpoints (left-view image and right-view image) are obtained.

Figure 37:
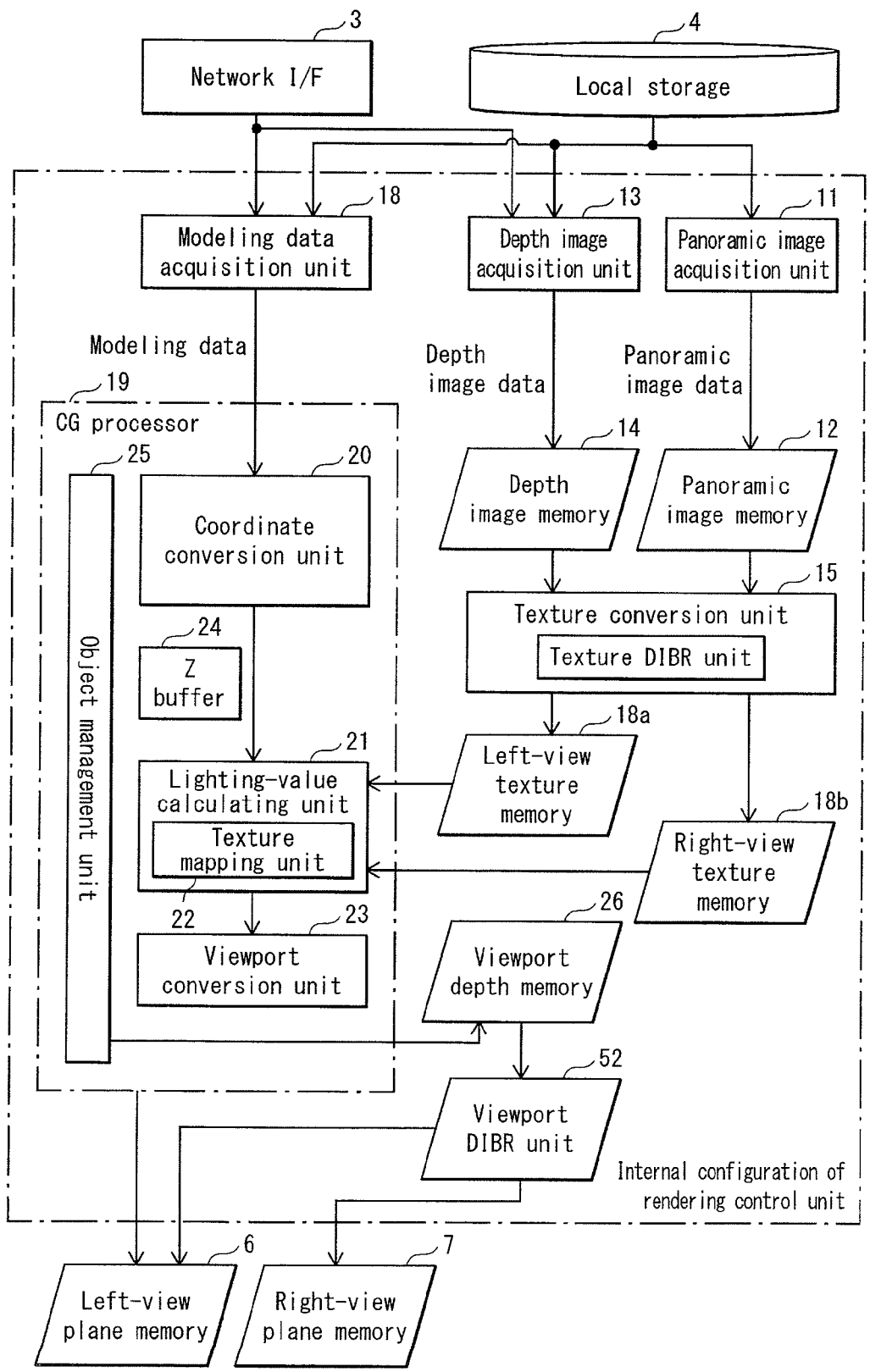
FIG. 37 is a block diagram of the internal configuration of a rendering control unit according to Embodiment 3.

FIG. 37 is a block diagram of the internal configuration of a rendering control unit according to Embodiment 3. This figure is drawn based on the figure illustrating the internal configuration of Embodiment 1 and the difference with the base configuration is found in an additional component. Specifically, the component bearing a 50 number as a reference sign (namely, viewport DIBR unit 52) is a component specific to the configuration shown in the figure. To give preliminary description before a description of the additional component, the following describes the operations of the existing components (the rendering control unit 5, CG processor 19, viewport conversion unit 23, and viewport depth generation unit 35) performed at the time of a change in the line-of-sight direction or in the viewport location.

Based on the position on the map indicated by the position and direction determination unit 2 and also on the panoramic image and depth image acquired from the network interface 3 or from the local storage 4, the rendering control unit 5 generates panoramic images each applied on a spherical surface in the three-dimensional modeling space. Then, the rendering control unit 5 composites a UI object with each panoramic image applied on the inner spherical surface. The rendering control unit 5 then: extracts viewport images as seen from the spherical center in the line-of-sight direction specified by the position and direction determination unit 2; writes the extracted left-view viewport image and right-view viewport image into the left-view plane memory right-view plane memory 6 and the right-view plane memory 7, respectively; calculates depths of each pixel in the viewport images; and writes the viewport depth into the viewport depth memory 26. This concludes the description of the rendering control unit 5.

The CG processor 19 skips the texture mapping process, if an instruction given by the position and direction determination unit 2 to the rendering control unit 5 is for changing the current line-of-sight direction without changing the current viewpoint. Therefore, the CG processor 19 operates to re-do the process of extracting viewport images in order to reflect the change in the line-of-sight direction and also the process of writing of the results to the right-view plane memory 6 and the left-view plane memory 7. At this time, the unit 21 and the texture mapping unit 22 places the spherical surfaces textured with the panoramic image and the UI object in the three-dimensional modeling space.

The viewport conversion unit 23 extracts images to be displayed as images seen from the spherical center in the current line-of-sight direction specified by the position and direction determination unit 2 and outputs the extracted images to the left-view plane memory 6 and the right-view plane memory 7.

The viewport depth generation unit 35 generates viewport depth associated with a composite image in which the UI object is composited with a panoramic image mapped on the inner spherical surface and writes the viewport depth in the viewport depth memory 26. The viewport depth is generated based on information provided by the depth image acquisition unit and the object management unit.

This concludes the preliminary description of the operation of the existing components (the rendering control unit 5, CG processor 19, viewport conversion unit 23, and viewport depth generation unit 35). The following now describe the new component (viewport DIBR unit 52) specific to this embodiment.

The viewport DIBR unit 52 applies pixel shifting to the viewport image in which UI object is composited with the panoramic image applied to the inner spherical surface. Through the pixel shifting, the viewport DIBR unit 52 generates two or more viewpoint images, namely left-view image and right-view image. The pixel shifting is carried out based on a viewport image stored in the left-view plane memory 26 or the right-view plane memory 27 and on the viewport depth stored in the viewport depth memory 26. The method for generating two or more viewpoint images through pixel shifting has already described in Embodiment 1. Thus, no description is given here.

Figure 38:
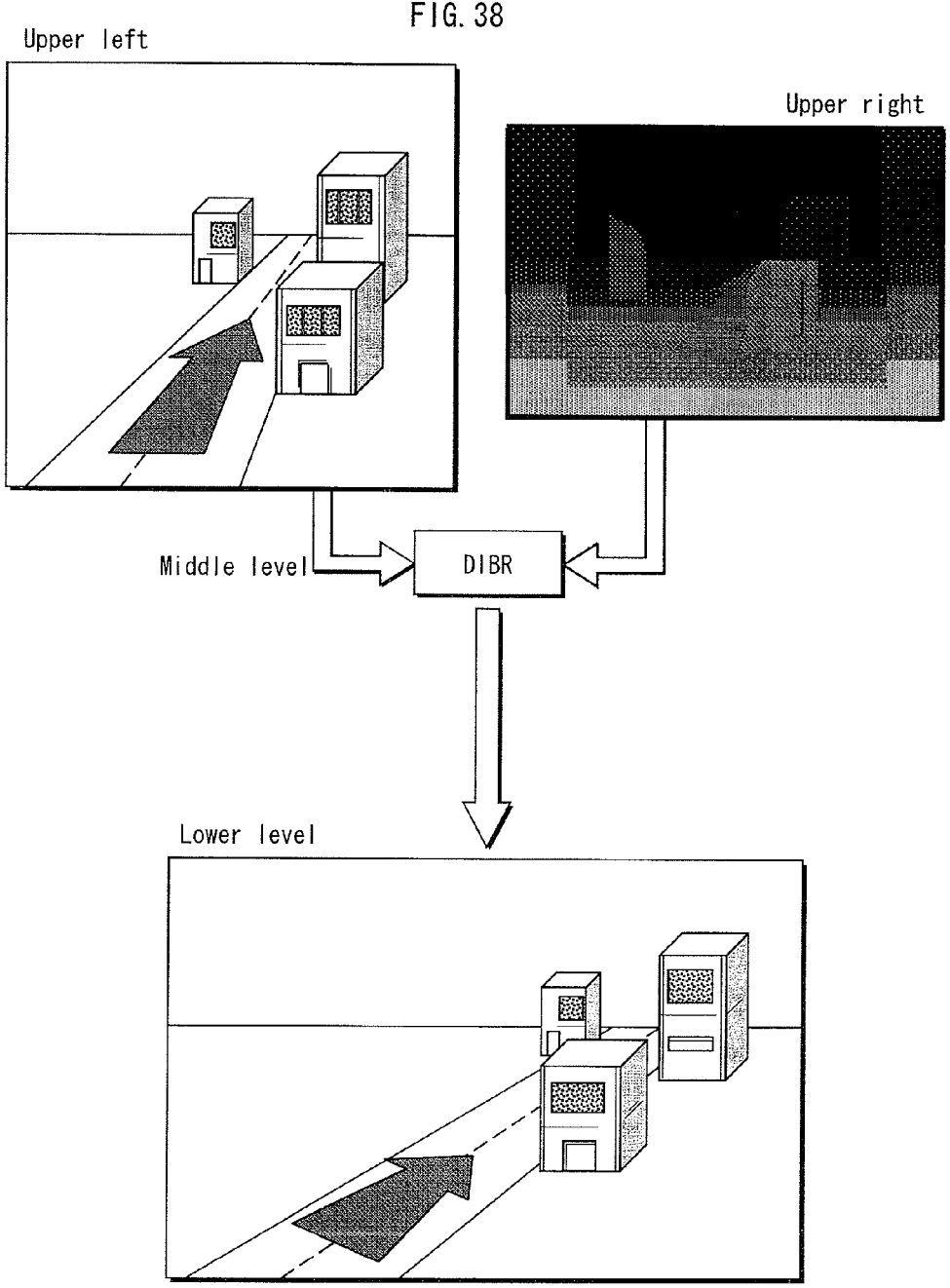
FIG. 38 illustrates the process of generating a right-view viewport image by performing DIBR based on a left-view viewport image and an associated viewport depth.

FIG. 38 illustrates the process of generating a right-view viewport image by performing DIBR based on a left-view viewport image and an associated viewport depth. The upper left of the figure illustrates the left-view viewport image, the upper right illustrates the viewport depth, and the lower level illustrates the right-view viewport image. As illustrated in the upper left of the figure, the viewport image obtained has been already composited with a UI object. Thus, by performing DIBR of the viewport image based on the viewport depth, a right-view viewport composited with the UI object is obtained.

As described above, according to this embodiment, pixel shifting is applied to a viewport image in which a panoramic image is applied on the inner spherical surface and a UI object is already composited. Thus, the direction of the parallax between the images to be presented to the user is always kept horizontal without being affected by transformation such as rotation in the three-dimensional modeling space.

Re-extraction of viewport images are performed in response to a change in the current viewpoint in the three-dimensional modeling space. Consequently, collision between an UI object and an intra-texture object resulting from the current viewpoint change is avoided. In the case where the current viewpoint is change, it is not necessary to re-do the coordinate conversion and lighting-value calculation. Thus, viewport images can be promptly changed in response to a user operation.

Re-extraction of viewport images may also be performed in response to a change in the current viewpoint in the three-dimensional modeling space. Consequently, collision between an UI object and an intra-texture object resulting from the current viewpoint change is avoided. In the case where the current viewpoint is change, it is not necessary to re-do the coordinate conversion and lighting-value calculation. Thus, viewport images can be promptly changed in response to a user operation.

Embodiment 4

This embodiment discloses hardware implementation of the image rendering device described in the above embodiment.

Figure 39:
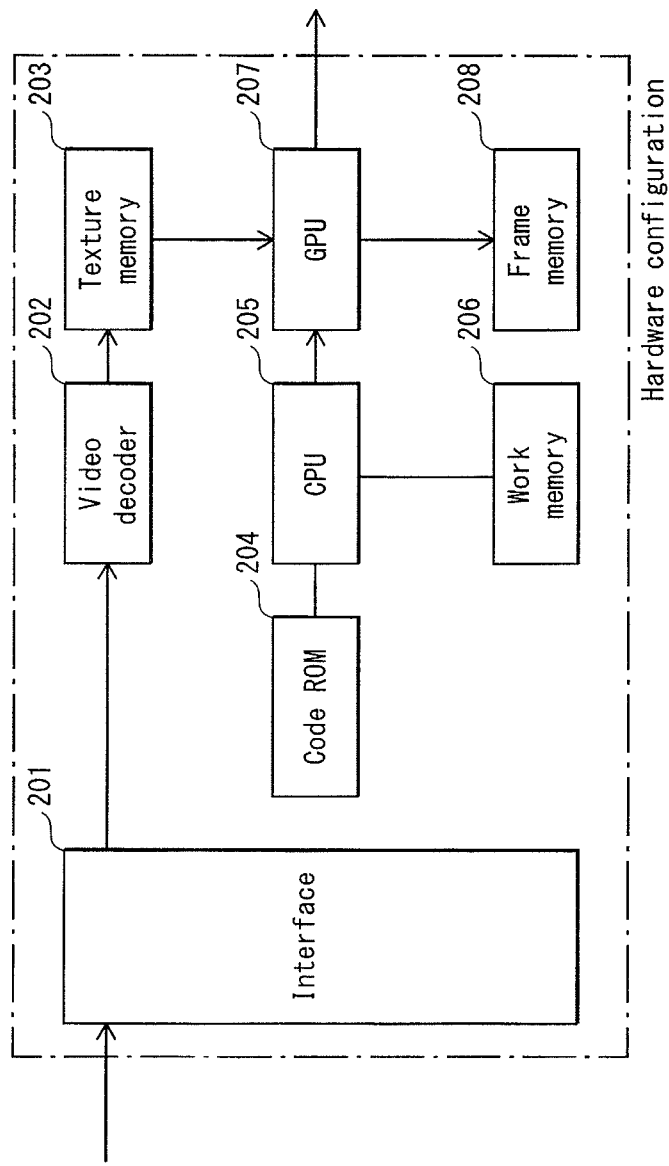
FIG. 39 illustrates the hardware configuration of the image rendering device.

First, the hardware configuration of the CG processor is described. FIG. 39 illustrates the hardware configuration of the CG processor. As illustrated in the figure, the image rendering device includes an interface 201, a video decoder circuit 202, a texture memory 203, a code ROM 204, a CPU 205, a work memory 206, a GPU 207, and a frame memory 208.

The interface 201 interfaces with a drive for a built-in medium or for a removable medium.

The video decoder 202 is a circuit dedicated for decoding background images and depth images read via the interface 201.

The texture memory 203 stores uncompressed background images decoded by the video decoder circuit 202.

The code ROM 204 stores a sequence of code of a program for realizing the processing steps shown in the above flowcharts.

The CPU 205 reads and executes a sequence of code stored on the code ROM 204 to realize the processing steps described in the above embodiment.

The work memory 206 is used as a memory area for variables and arrays used by the code ROM 204 during processing.

The GPU 207 is a circuit dedicated for graphics processing, such as texture mapping.

The frame memory 208 is memory used by the GPU 207 during processing.

Figure 40:
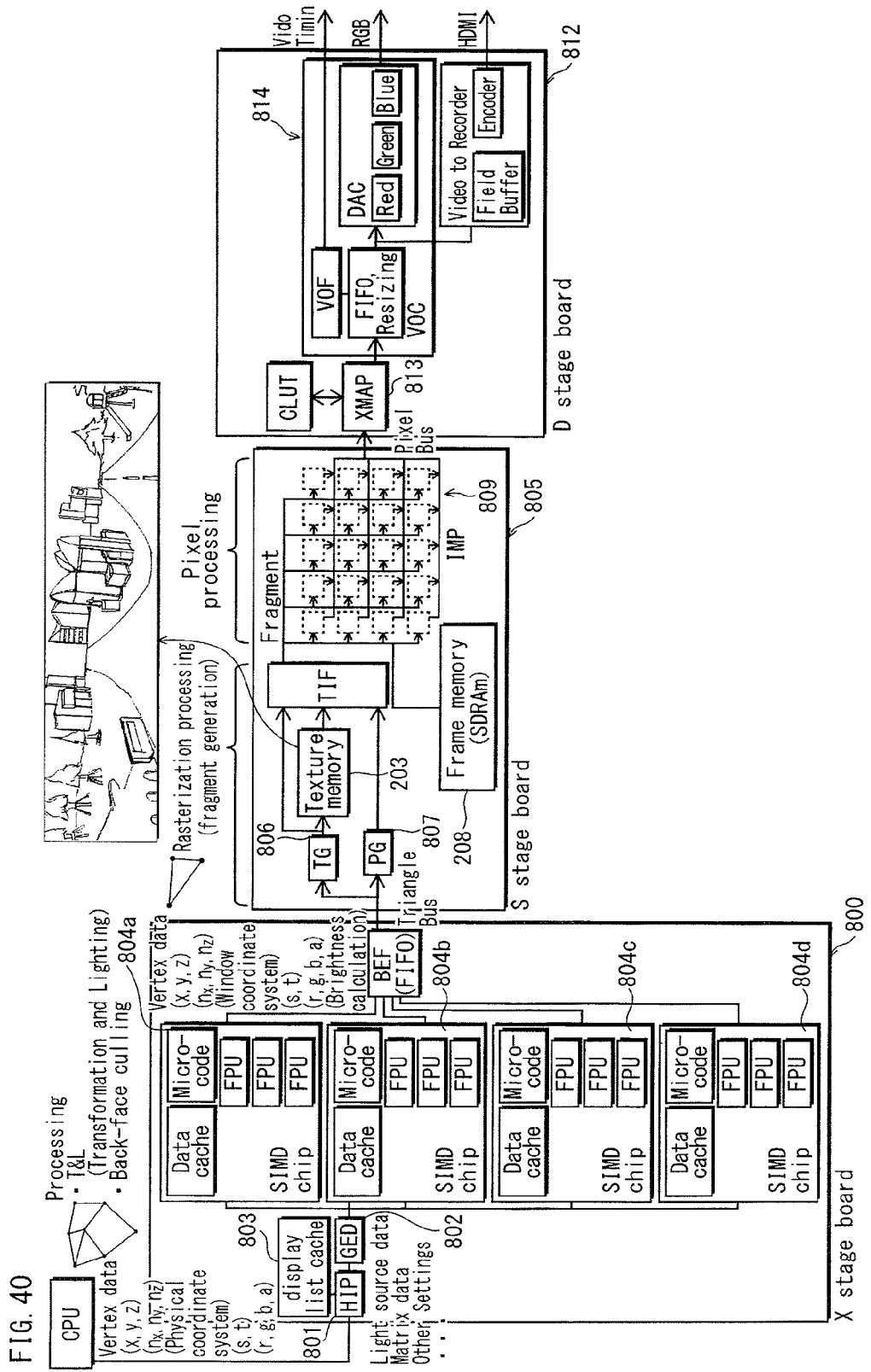
FIG. 40 illustrates the internal configuration of a GPU.

FIG. 40 illustrates the internal configuration of the GPU.

An X stage board 800 realizes processing in X (Transformation, Xformation) stage and includes an HIP 801, a GED 802, a display list cache 803, and SIMD chips 804a, 804b, 804c, and 804d. The processing of X (Transformation) stage roughly includes two processes. One is the transformation process of converting the coordinates (x, y, z) of each vertex in the three-dimensional space to the coordinates on a two dimensional screen. The other is the lighting computation process for computing the brightness (color) and light casted on each vertex based on the information about the light source and texture. These two processes (Transformation and Lighting) are collectively referred to as "T & L process" or "TnL" process.

The HIP (Host Interface Processor) 801 is an ASIC (Application Specific Integrated Circuit) that interprets an OpenGL API call received as input and converts the call into a format suitable for computation.

The GED (Geometry Element Distributor) 802 plays the role of appropriately distributing the pieces of vertex data to the subsequent four SIMD chips by finding the chips in the standby state.

The display list cache 803 is cache memory for storing a display list in which OpenGL API calls are grouped. By preparing a series of, frequently used OpenGL API calls in a display list, the amount of data transferred from the CPU to the X stage board can be reduced significantly.

The SIMD chips 804a, 804b, 804c, and 804d are each a single-chip processor realized as ASIC having three FPUs (floating-point units), a cache for storing microcode and a data cache. One FPU includes the following two arithmetic units. One is a common floating-point ALU (Arithmetic Logic Unit), and the other is a floating-point multiplier. The board in this embodiment is equipped with the four SIMD chips described above. In the FPU, 12 systems operate in parallel. Thus, 12 pieces of vertex data (x, y, z) can be simultaneously processed in parallel.

The details of the processing to be performed by the SIMD chips (i.e., algorithms for the coordinate conversion and lighting computation) are described in the form of microcode. Each arithmetic circuit operates according to the microcode stored on the cache on the chip. The microcode is loaded to the cache upon system activation. The arithmetic results by the SIMD chips are collected to FIFO (First-In First-Out) memory and transferred to a bus called Triangle Bus as output of the overall X stage board. Each piece of vertex data includes coordinates (x, y) and depth information z in the screen coordinate system, lighting computation result (r, g, b), transparency information a, normal vector (nx, ny, nz), and texture coordinates (s, t).

In addition, this board also performs pre-processing for improving the computation efficiency in the subsequent S stage. One typical pre-processing is back-face culling. Back-face culling refers to a process of detecting any triangle that appears as facing away from the viewpoint when converted into the window coordinate system. Any piece of vertex data relating to such a triangle is caused not to output to the Triangle Bus. This concludes the description of the X stage board.

The following now describes the S stage board 805. The S stage board 805 is composed of four different types of ASIC chips (TG806, PG807, TF808, and IMP809). The processes performed in the S (Scan conversion) stage include rasterization to color each pixel located inside a triangle, hidden surface removal, stencil masking, and fogging.

One important function in the rasterization process is texture mapping of applying a panoramic image onto the spherical strips. In the texture mapping, the address within a texture image stored in the texture memory is specified not by interpolating the brightness (r, g, b) but by interpolating the texture coordinates (s, t) to read an appropriate pixel. The brightness (r, g, b) of the read pixel is determined as the brightness data of the fragment.

Input to the S stage board is fragments of each vertex of a triangle received from the X stage board via the Triangle Bus. Each fragment is a piece of data including the screen coordinates (x, y, z), texture coordinates (s, t), brightness (r, g, b), transparency a, and nominal vector (nx, ny, nz).

The TG (Texture Generator) chip 806 fills a triangle, outputs the interpolation result of the texture coordinates (s, t) for each pixel, specifies an address in the texture memory, and passes the texture pixel (called texel) to the TF (Texture Filter).

The PG (Pixel Generator) chip 807 performs the rasterization process, i.e., fills the triangle, and interpolates the brightness (r, g, b) for each pixel.

The TF (Texture Filter) chip 808 composites the output of the PG (i.e., the brightness modified for shading) with the output from the texture memory (i.e., texle), and passes a fragment for each pixel to the IMP (Image Memory Processor).

The IMP (Image Processor) 809 is a processor for realizing a flow of pixel processing, involving fogging, anti-aliasing, alpha test, stencil test, depth test, blending, masking, and selection of a write buffer. The IMP 809 then writes the resultant data to the frame memory 208.

The D stage board 812 is for performing D-stage processes and provided with XMAP 813 and VOC 814.

The XMAP (Pixel Mapping Asic) 813 receives image data from the Pixel Bus, applies conversion with the use of a look-up table as necessary, and displays a cursor. Then, the XMAP 813 sends the resulting image data on to the Video Packet Bus. Each VOC picks up an image according to the VOF data describing a rectangular region to be processed by the respective VOC and converts the data into a video signal by a DA converter.

The VOC (Video Output Channel) circuit 814 includes an output circuit for magnifying an image, and a filtering circuit for improving the image quality of the magnified image.

When the processing load increases, the VOC circuit 814 renders an image at dynamically lowered resolution and enlarges the rendered image by a hardware function to restore the initial image. The stage board has eight output channels at maximum and also has an HDMI output encoder.

Next, a description is given of controls of the GPU, which is a hardware component, to be instructed by software.

Figure 41:
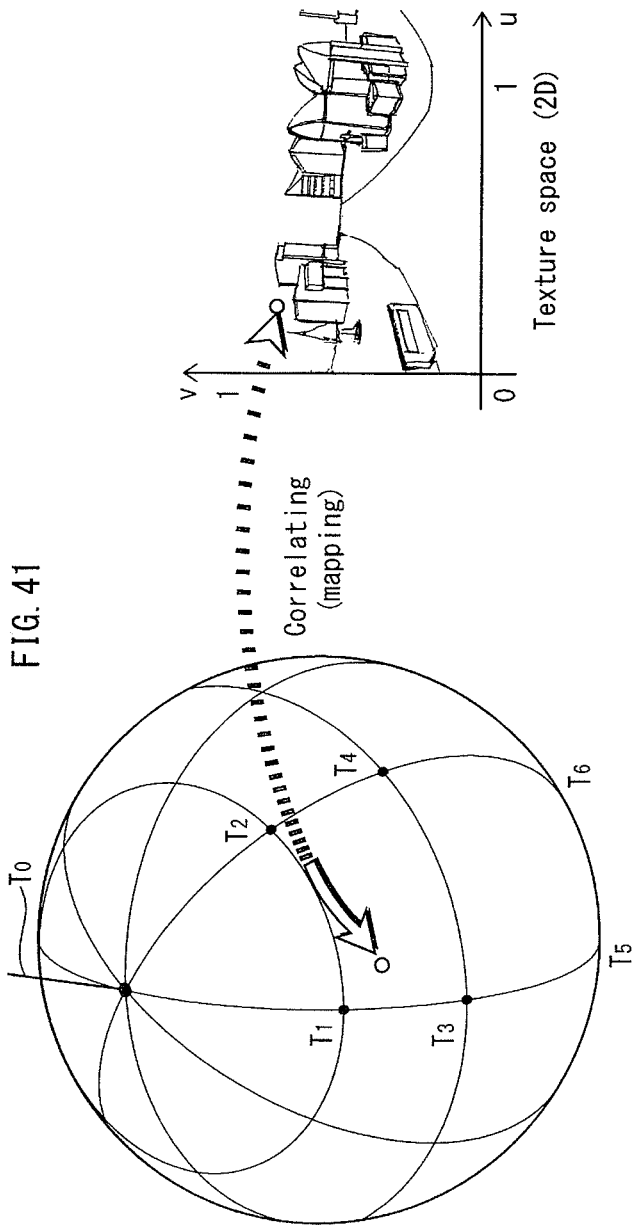
FIG. 41 illustrates mapping between a spherical model and a texture and also illustrates an example description of an API call for realizing texture mapping.

FIG. 41 illustrates, at the top portion, the mapping between the spherical model and texture. In left hand side of the figure illustrates the grid of the spherical model, and the right hand side shows the stored content (i.e., textures) of the texture buffer. The spherical model illustrated on the left hand side is divided into W regions along a lateral direction and a texture is to be applied to each region. In the present embodiment, a geometry subjected to texture mapping is a triangle strip. The entire or a portion of a triangle strip is subjected to texture mapping. The entire or portion of triangle strip is defined by a vertex grid. More specifically, a grid defined by points T1, T2, and T3 is subjected to texture mapping, and a grid defined by points T3, T4, T5, and T6 is subjected to another texture mapping. The coordinates describing each point defining the grids are designated as indices used in texture mapping.

The bottom portion of FIG. 41 is an example description of an OPEN-GL API call for realizing texture mapping.

The statement "glVertexPointer (3, GL#FLOAT, 0, g#v);" is for storing the series of coordinates describing the points of a grid in the three-dimensional modeling space as vertices. The argument "3" is the number indicating the dimensions of the three-dimensional modeling space, and "GL#FOLAT" indicates that each coordinate is floating-point type data.

The statement "glTexCoordPointer(2, GL#FLOAT, 0, g#uv):" is an API call for storing a series of texture coordinates g#uv corresponding vertices of the grid in the three-dimensional modeling space as texture coordinate values.

The statement "for(I=0;i<W;i++)" defines a loop of repeating "glDrawElements" for each of W coordinates in the lateral direction.

The following describes the statement "glDrawElements (GL#TRIANGLE#STRIP, (H+1) *2, GL#UNSIGNED#SHORT, getStaticData( )>g#index[i]);". The first argument in this API call indicates that the geometry of the 3D model is a triangle strip (GL#Triangle#Stirp). The second argument specifies the number of vertices. Here, the number is specified as (the vertical division number H+1)×2. The statement "GL#UNSIGNED#SHORT" specifies that the type of index sorting vertices is of a short format, which is without a sign. The statement "g#index[W]" is an index array determining the order of rendering and the coordinates describing each intersection of the grid is stored as an element of the array. Through rendering by following the coordinates of vertices stored as the array elements of "g#index", texture mapping is carried out.

First, the following describes the hardware configuration for realizing DIBR (that is, the hardware configuration of the panoramic image memory 13 and the texture DIBR unit is described).

The panoramic image memory 13 is composed of a plurality of line memories each of which is in turn composed of a plurality of 32-bit memory elements. Panoramic image data is stored in the 32-bit memory elements. The coordinates of panoramic image data on a screen are defined, for example, by pairs each made up of a ROW address and a COLUMN address in the panoramic image memory 13. A ROW address specifies a line memory in the panoramic image memory 13, and a COLUMN address specifies a memory element in the related line memory. This concludes the description of the panoramic image memory 13. The following describes the hardware configuration of the texture DIBR unit.

The texture DIBR unit applies pixel shift to the panoramic image data using the depth image data thereby to generate a texture as seen from a different viewpoint.

To generate a left-view texture by modifying the X coordinate of each pixel of a panoramic image, the panoramic image is copied from the panoramic image memory 13 to the left-view texture memory 18*a*. At the time of copying, the COLUMN address specifying the memory element used to store the copy of the panoramic image needs to be adjusted to an address that is closer to the top by the number of pixels X. By copying the panoramic image to the address adjusted in the above manner, the resulting left-view texture is shifted to the left. Thus, the texture DIBR unit can generate a left-view texture through the copying involving the address adjustment.

Similarly, to generate a right-view texture by changing the X coordinate of each pixel, the panoramic image is copied from the panoramic image memory 13 to the right-view texture memory 18*b* after adjusting the COLUMN address specifying the memory element used to store the copy of the street view to an address that is closer to the bottom by the number of pixels X. By copying the panoramic image to the address adjusted in the above manner, the resulting right-view texture is shifted to the right. Thus, the texture DIBR unit can generate a right-view texture through the copying involving the address adjustment. This concludes the description of hardware implementation of the texture DIBR unit.

DIBR may also be realized by line scanning. Line scanning involves reading a set of pixels (1920×1080) for one screen from the frame memory in units of 1920 pixels and converting the read pixels into a video signal. The line scanning is realized by a line-pixel memory for storing pixel data for one line of an image, a filter circuit, and a conversion circuit for parallel/serial conversion. As described above, DIBR refers to processing for converting the intensity value of each pixel in a depth image into a corresponding parallax to shift the pixel. The coordinates of each pixel constituting one line of a panoramic image read to the line memory are shifted by the number of pixels represented by the depth of a corresponding line in the depth image of the panoramic image. As a result, a viewpoint image as seen from a different viewpoint is created in a manner to appropriately reflect the depths shown by the depth image.

<Supplemental>

Up to this point, the best mode embodiments known to the applicant at the time of filing the present application have been described. With respect to the following technical topics, further improvements and modifications may be made. Each embodiment is practiced as described above and whether or not to make these improvements and modifications are optional and up to discretion of those who practice the embodiments.

(Increasing or Decreasing Angle of Panoramic Images)

In each embodiment, the description is directed to a panoramic image prepared by stitching seven background images in the row direction. However, the number of background images stitched together in the row direction may be reduced, which results in a change in the angular range that can be seen from the viewpoint. In the above embodiments, a panoramic image covers the 360° field of view with seven background images arranged in the row direction. Thus, the angle covered by one background image is 52° ($\approx$360°/7). That is, by combining two images, the resultant image provides the field of view angle of 104° ($\approx$52°×2), and by combining three images, the resultant combined image provides the field of view angle of 156° ($\approx$52°×3). In this manner, by changing the number of images combined in the row direction by a street view collection server or image rendering device, the field of view angle covered by the resultant panoramic image can be changed to reduce the processing load of texture mapping, computation of parallaxes in texture, and so on.

In the present embodiment, pixel shift occurs for each rendering. Thus, it is preferable to employ a system LSI for performing the process of generating two or more viewpoint images by applying pixel shifting to a viewport image using depth information.

(Variations of Depth Images)

A compressed Mercator depth image has been described as PNG data prepared by compressing an image representing depths of a Mercator image. Since noise in depth data compression tends to be noticeable, lossless compression such a PNG format is preferable. Data of the compressed Mercator depth image in the street view file is redundant. Therefore, in addition to compressed data resulting from PNG compression, the street view file may additionally be provided with: surrounding terrain data; and data indicating the relationship between the compressed Mercator image and the surrounding terrain data.

(Embodiments of Integration Circuit)

Regarding the hardware configuration of the image rendering device described in Embodiment 1, portions other than mechanical portions (such as the drive unit of a recording medium and the connectors to external sources) may be implemented as a system LSI. That is, portions corresponding to logic circuits and memory elements, i.e., cores of the logic circuits may be implemented as a system LSI. A system LSI refers to a package of bare chips mounted on a high-density substrate. A multi-chip module is a package of a plurality of bare chips mounted on one high-density substrate and thus has an external appearance like a single LSI. Such a multi-chip module is also encompassed within the scope of a system LSI.

Focusing on the types of packages, system LSIs include the following two types: QFP (Quad Flat Package) and PGA (pin grid array). QFP refers to a system LSI package having pins extending from each of the four sides. PGA refers to a system LSI package having a number of pins attached to the entire underside of the package.

These pins play the role of power feed, ground, and an interface with other circuits. Since the pins of the system LSI functions as an interface, by connecting other critics to the pins, the system LSI acts as the core of the image rendering device.

(Technical Significance of Processing Either of Left- or Right-View Images)

Note that in the DIBR processing for a stereoscopic picture, the stereoscopic picture may be positioned frontward so that the stereoscopic picture stands out. This allows the past-experience image to be even more eye-pleasing.

Although the present embodiment has been described with an example of stereoscopic pictures, the present invention is also applicable to moving images in the same manner as in stereoscopic pictures. In the case of a moving image, processing may be performed while one frame of the moving image is regarded as a still image.

(Specifics of Arithmetic Based on Formulas)

In the embodiments above, the arithmetic operations are disclosed based on the specific formulas. These formulas represent numeric operations executed on a computer, rather than mathematical concepts. It is therefore naturally appreciated that revisions are made as necessary for rendering the formula executable by a computer. For example, it is an appropriate to perform a saturation calculation for handling numeric values appropriately as integer type, fixed-point type, or floating-point type values or to perform a positive conversion. In addition, among the arithmetic operations based on the formulas shown in the above embodiments, a multiplication by a constant may be implemented with a ROM multiplier that uses a constant ROM. In the constant ROM, the products of possible multiplicands and the constant are calculated and stored in advance. Suppose, for example, that a possible multiplicand is 16-bit long at maximum. In this case, the multiplicand is divided into four 4-bit data pieces and the product of a multiplication by the constant is calculated for each four-bit data piece and stored in the constant ROM. That is, multiples of the constant by each numeral from 0 to 15 are stored in the constant ROM. Since a product of a 4-bit data piece and a 16-bit constant is 20 bits and four constants are stored at the same address, one word will be 80 bit-long (20×4=80). As described above, as an "arithmetic operation" used in the present disclosure can be implemented by a ROM multiplier and therefore the term "arithmetic operation" used in the present disclosure refers not only to a pure mathematical operation. Rather, the term encompasses reading of an appropriate one of arithmetic results from a recording medium such as ROM, according to the value of a multiplication.

(Embodiments of Programs)

The programs shown in the above embodiments may be made in the following way. First, a software developer describes in a programming language a source program for realizing flowcharts or functional components described above. When describing the source program for realizing the flowcharts or functional components, the software developer follows the syntax of the program language and uses class structures, variables, array variables, and external function calls.

The source program thus described is then supplied in a file to a complier. The complier interprets the source program into an object program.

The interpretation by the complier involves processes, such as parsing, optimization, resource allocation, and code generation. In the process of parsing, the lexical analysis, syntactic analysis, and semantic analysis are performed to convent the source program into an intermediate program. In the process of optimization, the intermediate program is subjected to partitioning into basic blocks, control flow analysis, and data flow analysis. In the process of resource allocation, variables used in the intermediate program are allocated to the registers or memories of a processor targeted for execution of the resulting program to for adaptation to instruction sets for the targeted processor. In the process of code generation, intermediate instructions in the intermediate program are converted into program code to obtain an object program.

The object program thus generated is composed of one or more lines of program code for causing execution of a step or a procedure of a functional component described in the above embodiments. The program code may be of various types, including native code of a processor and JAVA(registered trademark) bytecode. The program code may realize the steps in various manners. In the case where each step may be realized by using an external function, then a call instruction to involve the external function servers as the program code. In another case, lines of program code for realizing a single step may be included in separate object programs. In the case of a RISC processor that uses only limited types of instructions, each step of the flowchart may be realized by a combined uses of an arithmetic instruction, a logical instruction, a branching instruction, and the like.

Once such an object program is ready, a programmer activates a linker for the object program. The linker allocates the object program and related library programs to memory spaces and combines all the programs into a single load module. The load module thus generated is to be read and executed by a computer to realize the processing steps shown in the flowcharts or the procedures of the functional components. Such a computer program may be stored on a non-transitory computer readable recording medium and provided to users.

(Variations of Stereoscopic Playback)

To realize stereoscopic playback, a left-view texture and a right-view texture are described to be generated from one panoramic mage. Alternatively, the panoramic image as-is may be used as the left-view texture and only the right-view texture may be newly generated. Conversely, the panoramic image as-is may be used as the left-view texture and the right-view texture may be newly generated. In this alternative, the right-view camera position is assumed to be offset by 2×p from the camera position of the stereoscopic playback. It is then suffice to perform the coordinate conversion, texture mapping, and viewport conversion based on the assumed camera position in the above described manner.

INDUSTRIAL APPLICABILITY

The image rendering device in the present invention can, from the standpoint of industrial management, be manufactured and sold continually and repeatedly. In particular, the image rendering device is useful in the consumer product industry related to creation and reproduction of panoramic stereoscopic images.

REFERENCE SIGNS LIST

101 rendering device
102 remote control
104 liquid crystal shutter glasses
103 stereoscopic compatible display
1 UO detection unit
2 position and direction determination unit
3 network interface
4 local storage
5 rendering control unit
6 left-view plane memory
7 right-view plane memory
8 output interface

The invention claimed is:

1. An image rendering device for realizing stereoscopic viewing of composite images generated by compositing background three-dimensional models and foreground three-dimensional models each defined in a three-dimensional modeling space, the image rendering device comprising:

a coordinate converter that performs a coordinate conversion on modeling data defining a geometry of a background three-dimensional model and a geometry of a foreground three-dimensional model, so that coordinates describing vertices of the modeling data are converted into three-dimensional coordinates describing corresponding points in the three-dimensional modeling space;

a texture mapper that converts background image data into two or more viewpoint textures and maps each viewpoint texture to a background three-dimensional model in the three-dimensional modeling space;

a viewport converter that extracts, for each of the two or more viewpoint textures, a viewport image from the background three-dimensional model mapped with the viewpoint texture and from the foreground three-dimensional model; and a manager that manages the foreground three-dimensional model and the background three-dimensional model, wherein the two or more viewpoint textures include an intra-texture object, the manager determines a depth relationship between the foreground three-dimensional model and the intra-texture object, by comparing a parallax of the foreground three-dimensional model occurring in stereoscopic playback with a parallax of the intra-texture object occurring in stereoscopic playback and adjusts a positional relationship between the foreground three-dimensional model and the intra-texture object based on a result of the determination, and the parallax of the foreground three-dimensional model refers to a parallax PS between points SL and SR on a precondition that a point S in the foreground three-dimensional model corresponds to a set of coordinates SL on a left-view viewport and to a set of coordinates SR on a right-view viewport, and is expressed by $$PS=2p*(Sz-D)/Sz,$$

where
Sz denotes a coordinate in a depth direction of a foreground image in a view coordinate system,
D denotes a distance between a camera position and a display, and
2p denotes a distance between a left-view camera and a right-view camera.

2. The image rendering device according to claim 1, wherein
the adjustment of positional relationship is carried out by causing the coordinate converter to change a position of the foreground three-dimensional model in the three-dimensional modeling space to a position further away from the background three-dimensional model.

3. The image rendering device according to claim 1, wherein
the conversion of the background image data into the two or more viewpoint textures is carried out by acquiring a depth image associated with the background image data and performing depth image based rendering based on the acquired depth image, and
the adjustment of positional relationship is carried out by correcting the depth image and performing depth image based rendering based on the corrected depth image to newly generate two or more viewpoint textures.

4. The image rendering device according to claim 1, wherein
the adjustment of positional relationship is carried out by masking, among pixels of the foreground three-dimensional model projected in each viewport image, every pixel having a depth greater than a depth of the intra-texture object and rendering unmasked pixels of the foreground three-dimensional model.

5. The image rendering device according to claim 1, wherein
the two or more viewpoint textures are generated by acquiring background depth image data and performing depth image based rendering based on the acquired background depth image data, and the adjustment of positional relationship is carried out by:
  converting the intra-texture object into modeling data;
  storing, into a depth buffer, three-dimensional coordinates describing a geometry of modeling data converted from the intra-texture object, along with three-dimensional coordinates describing the foreground three-dimensional model; and
  enabling a depth testing function to calculate lighting values based on the sets of three-dimensional coordinates stored in the depth buffer.

6. The image rendering device according to claim 5, wherein
of the three-dimensional coordinates describing the modeling data converted from the intra-texture object, a Z coordinate is calculated based on a parallax between a pixel in one of the two or more viewpoint textures and a corresponding pixel in another one of the two or more viewpoint textures.

7. The image rendering device according to claim 1, wherein
when a line-of-sight direction is changed, the viewport converter:
  newly extracts a viewport image corresponding to the new line-of-sight direction from the background three-dimensional model mapped with one of the two or more viewpoint textures and from the foreground three-dimensional model; and
  newly acquires two or more viewport images by performing depth image based rendering of the newly extracted viewport image based on background depth image data.

8. The image rendering device according to claim 1, wherein
the adjustment of positional relationship refers to a geometry transformation applied to the foreground three-dimensional model by manipulating the coordinates describing vertices defining the geometry of the foreground three-dimensional model.

9. The image rendering device according to claim 1, wherein
the extraction of viewport images is carried out according to a viewpoint position in the three-dimensional modeling space, and
the adjustment of positional relationship is carried out by changing the viewpoint position.

10. The image rendering device according to claim 1, wherein
the parallax of the intra-texture object refers to a parallax PB between points BL and BR on a precondition that a point B in the intra-texture object applied to an inner surface of the background three-dimensional model corresponds to a set of coordinates (BLx, BLy, BLz) on a left-view viewport and to a set of coordinates (BRx, BRy, BRz) on a right-view viewport, and is expressed by $PB=\{(D*BRx+p*(BRz-D))/BRz\}-\{(D*BLx-p*(BLz-D))/BLz\}.$ 11. The image rendering device according to claim 1, further comprising:
a position and direction determiner that determines, in accordance with a user operation, a current viewpoint location on a map and a current line-of-sight direction; and
a downloader that generates an image acquisition request using geographic information corresponding to the current viewpoint location on the map and transmits the image acquisition request to an image collection server, to download a street view file, wherein
the street view file transmitted from the image collection server has a location attribute matching the geographic information included in the image acquisition request, and
the background image data is contained in the downloaded street view file.

12. The image rendering device according to claim 11, wherein
the background image data is a panoramic viewpoint image representing a view of surroundings as seen from a geographic location corresponding to the geographic information included in the image acquisition information.

13. An image rendering method for realizing stereoscopic viewing of composite images generated by compositing background three-dimensional models and foreground three-dimensional models each defined in a three-dimensional modeling space, the image rendering method comprising:
performing a coordinate conversion on modeling data defining a geometry of a background three-dimensional model and a geometry of a foreground three-dimensional model, so that coordinates describing vertices of the modeling data are converted into three-dimensional coordinates describing corresponding points in the three-dimensional modeling space;
converting background image data into two or more viewpoint textures and mapping each viewpoint texture to a background three-dimensional model in the three-dimensional modeling space;
extracting, for each of the two or more viewpoint textures, a viewport image from the background three-dimensional model mapped with the viewpoint texture and from the foreground three-dimensional model; and
managing the foreground three-dimensional model and the background three-dimensional model, wherein
the two or more viewpoint textures include an intra-texture object,
in the managing, a depth relationship between the foreground three-dimensional model and the intra-texture object is determined, by comparing a parallax of the foreground three-dimensional model occurring in stereoscopic playback with a parallax of the intra-texture object occurring in stereoscopic playback and a positional relationship between the foreground three-dimensional model, and the intra-texture object is adjusted based on a result of the determination, and
the parallax of the foreground three-dimensional model refers to a parallax PS between points SL and SR on a precondition that a point S in the foreground three-dimensional model corresponds to a set of coordinates SL on a left-view viewport and to a set of coordinates SR on a right-view viewport, and is expressed by $PS=2p*(Sz-D)/Sz,$ where
Sz denotes a coordinate in a depth direction of a foreground image in a view coordinate system,
D denotes a distance between a camera position and a display, and
2p denotes a distance between a left-view camera and a right-view camera.

14. A non-transitory computer-readable recording medium that stores an image rendering program that causes a computer to execute processing of realizing stereoscopic viewing of composite images generated by compositing background three-dimensional models and foreground three-dimensional models each defined in a three dimensional modeling space, the image rendering program causing the computer to perform:

performing a coordinate conversion on modeling data defining a geometry of a background three-dimensional model and a geometry of a foreground three-dimensional model, so that coordinates describing vertices of the modeling data are converted into three-dimensional coordinates describing corresponding points in the three-dimensional modeling space;

converting background image data into two or more viewpoint textures and mapping each viewpoint texture to a background three-dimensional model in the three-dimensional modeling space;

extracting, for each of the two or more viewpoint textures, a viewport image from the background three-dimensional model mapped with the viewpoint texture and from the foreground three-dimensional model; and managing the foreground three-dimensional model and the background three-dimensional model, wherein the two or more viewpoint textures include an intra-texture object, in the managing, a depth relationship between the foreground three-dimensional model and the intra-texture object is determined, by comparing a parallax of the foreground three-dimensional model occurring in stereoscopic playback with a parallax of the intra-texture object occurring in stereoscopic playback and a positional relationship between the foreground three-dimensional model, and the intra-texture object is adjusted based on a result of the determination, and wherein the parallax of the foreground three-dimensional model refers to a parallax PS between points SL and SR on a precondition that a point S in the foreground three-dimensional model corresponds to a set of coordinates SL on a left-view viewport and to a set of coordinates SR on a right-view viewport, and is expressed by $$PS=2p*(Sz-D)/Sz,$$

where

Sz denotes a coordinate in a depth direction of a foreground image in a view coordinate system, D denotes a distance between a camera position and a display, and 2p denotes a distance between a left-view camera and a right-view camera.

* * * * *